US012449428B2

(12) United States Patent
Yan et al.

(10) Patent No.: US 12,449,428 B2
(45) Date of Patent: Oct. 21, 2025

(54) ON-DEMAND ELECTROCHEMICAL REACTIONS IN NANO-ELECTROSPRAY IONIZATION MASS SPECTROMETRY FOR BIOMOLECULAR ANALYSIS

(71) Applicant: THE TEXAS A&M UNIVERSITY SYSTEM, College Station, TX (US)

(72) Inventors: Xin Yan, College Station, TX (US); Shuli Tang, College Station, TX (US); Heyong Cheng, College Station, TX (US)

(73) Assignee: The Texas A&M University System, College Station, TX (US)

( * ) Notice: Subject to any disclaimer, the term of this patent is extended or adjusted under 35 U.S.C. 154(b) by 820 days.

(21) Appl. No.: 17/769,409

(22) PCT Filed: Oct. 23, 2020

(86) PCT No.: PCT/US2020/057037
§ 371 (c)(1),
(2) Date: Apr. 15, 2022

(87) PCT Pub. No.: WO2021/081313
PCT Pub. Date: Apr. 29, 2021

(65) Prior Publication Data
US 2023/0333124 A1    Oct. 19, 2023

Related U.S. Application Data

(60) Provisional application No. 62/924,889, filed on Oct. 23, 2019.

(51) Int. Cl.
*G01N 33/92*    (2006.01)

(52) U.S. Cl.
CPC .......... *G01N 33/92* (2013.01); *G01N 2560/00* (2013.01)

(58) Field of Classification Search
CPC ... G01N 33/92; G01N 2560/00; Y10T 436/24
USPC ............................................. 436/71, 84, 173
See application file for complete search history.

(56) References Cited

U.S. PATENT DOCUMENTS

2014/0005118 A1    1/2014  Verdine et al.
2017/0117124 A1*   4/2017  Baba ................... H01J 49/4225

OTHER PUBLICATIONS

Ma et al. Angewandte Chemie International Edition, vol. 53, 2014, pp. 2592-2596.*
Kuo et al. Analytical Chemistry, vol. 91, Aug. 13, 2019, pp. 11905-11915.*
Feng et al. Analytical Chemistry, vol. 91, Jan. 4, 2019, pp. 1791-1795.*
Tang et al. Journal of the American Society for Mass Spectrometry, vol. 32, Nov. 24, 2020, pp. 2288-2295.*
Sengupta et al. International Journal of Mass Spectrometry, vol. 494, 117137, Sep. 13, 2023, pp. 1-9.*

(Continued)

*Primary Examiner* — Maureen Wallenhorst
(74) *Attorney, Agent, or Firm* — Barnes & Thornburg LLP

(57) ABSTRACT

Methods for identifying a structural feature of a lipid include: (a) conducting at least one voltage-controlled electrochemical reaction that converts the lipid to a first derivatized lipid; and (b) fragmenting the first derivatized lipid to generate at least one diagnostic ion indicative of a first structural feature of the lipid.

19 Claims, 60 Drawing Sheets

(56) References Cited

OTHER PUBLICATIONS

Tang et al. Analytical Chemistry, vol. 94, Sep. 10, 2022, pp. 12750-12756.*
PCT Search Report and Written Opinion prepared for PCT Application No. PCT/US2020/057037, completed Dec. 23, 2020.
Tangs, et al., "On-Demand Electrochemical Epoxidation in Nano-Electrospray Ionization Mass Spectrometry to Locate Carbon-Carbon Double Bonds", 2019, Angewandte Chemie-International Edition, vol. 59, issue 1, pp. 209-214.
Wan L., et al., "In situ Analysis of Unsaturated Fatty Acids in Human Serum by Negative-ion Paper Spray Mass Spectrometry", 2019, Analytica Chimica Acta, vol. 1075, pp. 120-127.
Koola J. D., et al., "Cobalt-catalyzed Epoxidation of Olefins. Dual Pathways for Oxygen-atom Transfer", 1987, The Journal of Organic Chemistry, vol. 52, issue 20, pp. 4545-4553.
Pulfer M., et al., "Electrospray Mass Spectrometry of Phospholipids", 2003, Mass Spectrometry Reviews, vol. 22, issue 5, pp. 332-364.

* cited by examiner (a) CID-MS/MS of PS 18:1(9)-18:1(9) at m/z 619

(b) CID-MS/MS of PS 18:1(9)-18:1(9) at m/z 804

(c) CID-MS/MS/MS of PS 18:1(9)-18:1(9) at m/z 619

(d) CID-MS/MS of PS 18:1(9)-18:1(9) at m/z 826

(e) CID-MS/MS/MS of PS 18:1(9)-18:1(9) at m/z 841

ON-DEMAND ELECTROCHEMICAL REACTIONS IN NANO-ELECTROSPRAY IONIZATION MASS SPECTROMETRY FOR BIOMOLECULAR ANALYSIS

CROSS-REFERENCE TO RELATED APPLICATIONS

This application is a national stage entry under 35 USC § 371 (b) of PCT International Application No. PCT/US2020/057037, filed Oct. 23, 2020, which the benefit of U.S. Provisional Application No. 62/924,889, filed Oct. 23, 2019. The entire contents of this priority document are incorporated herein by reference, except that in the event of any inconsistent disclosure or definition from the present specification, the disclosure or definition herein shall be deemed to prevail.

TECHNICAL FIELD

The present teachings relate generally to methods for the structural characterization of lipids and, more particularly, to methods for the structural characterization of lipids using mass spectrometry.

BACKGROUND

Lipids are principal components of biological membranes and play vital roles in maintaining cellular functions. Recent studies have recognized the dysregulated lipid metabolism in the pathogenesis of many diseases including but not limited to obesity, diabetes, cancers, cardiovascular diseases, and neurodegenerative disorders. Full characterization of lipid compositions is significant for identifying lipid networks and understanding disease mechanisms.

Complete lipid structural elucidation has proven to be quite difficult since lipids are structurally diverse and often contain various types of isomers. As the major components of eukaryotic membranes and significant molecules in cell signaling, glycerophospholipids (GPLs) are found to have numerous structural isomers due to the variations in their head-groups, fatty acyl chain lengths, degree of unsaturation, sn-positions (relative positions of fatty acyls esterified on the glycerol backbone), as well as the positions and configurations of double bonds. Such small variations in structures could result in unique roles in lipid homeostasis and pathology and may be used as biomarkers in disease diagnosis. For example, changes in relative concentrations of lipid double bond and sn-positional isomers reflect cell-specific enzyme activities. In addition, subtypes of breast cancer cells display different compositions of double bond and sn-positional isomer, and human lung cancerous tissues may be distinguished from normal tissues only by using both kinds of isomers. These results highlight the importance of structure characterization of lipids at the isomer level in disease diagnosis and in understanding their pathologies.

SUMMARY

The scope of the present invention is defined solely by the appended claims, and is not affected to any degree by the statements within this summary.

By way of introduction, a method for identifying a structural feature of a lipid embodying features of the present teachings includes: (a) conducting at least one voltage-controlled electrochemical reaction that converts the lipid to a first derivatized lipid; and (b) fragmenting the first derivatized lipid to generate at least one diagnostic ion indicative of a first structural feature of the lipid.

A method for identifying a positional isomer of a double bond containing lipid embodying features of the present teachings includes: (a) conducting a voltage-controlled electrochemical epoxidation reaction that converts the double bond-containing lipid to an epoxide-containing lipid; and (b) fragmenting the epoxide-containing lipid via tandem mass spectrometry (MS/MS) to generate at least one diagnostic ion indicative of a positional isomer of at least one double bond of the double bond-containing lipid.

A method for identifying an sn-position of a lipid embodying features of the present teachings includes: (a) conducting a voltage-controlled anodic corrosion of an electrospray ionization (ESI) electrode to produce $Co^{2+}$ ion in situ; (b) complexing the in situ-produced $Co^{2+}$ ion to the lipid at one or a plurality of sn-positions to form a $Co^{2+}$-lipid complex; and (c) fragmenting the $Co^{2+}$-lipid complex via tandem mass spectrometry (MS/MS) to generate at least one diagnostic ion indicative of the sn-position of the lipid.

A method for identifying a structural feature of a double bond-containing lipid embodying features of the present teachings includes: (a) conducting a voltage-controlled electrochemical epoxidation reaction that converts the double bond-containing lipid to an epoxide-containing lipid; (b) fragmenting the epoxide-containing lipid via tandem mass spectrometry (MS/MS) to generate at least one diagnostic ion indicative of a positional isomer of at least one double bond of the double bond-containing lipid; (c) conducting a voltage-controlled anodic corrosion of an electrospray ionization (ESI) electrode to produce $Co^{2+}$ ion in situ; (d) complexing the in situ-produced $Co^{2+}$ ion to the lipid at one or a plurality of sn-positions to form a $Co^{2+}$-lipid complex; and (e) fragmenting the $Co^{2+}$-lipid complex via tandem mass spectrometry (MS/MS) to generate at least one diagnostic ion indicative of the sn-position of the lipid.

BRIEF DESCRIPTION OF THE DRAWINGS

FIG. 6(c) shows a chronogram of the MS intensity ratio of BGT to GT upon varying the ESI voltage between 2 kV and 3 kV, showing the rapid switchable electrochemical derivatization in the microreactor.

FIG. 12(d) shows a mass spectrum of the electro-oxidative coupling of PTA with DMA in a small ESI emitter (3 μm orifice). TMB is the DMA dimer.

FIG. 46(e) shows the MS/MS spectrum of 80 nM PC 18:1(9)-18:1(9) with 10 mM HCl.

[M−Na+2H+2O]⁺ at m/z 820; (b) precursor ion at m/z 820, the protonated mono-epoxidized PS 18:1 (9)-18:1 (9) [M−Na+2H+2O]⁺; (c) MS/MS/MS spectrum of ions at m/z 635 generated by the headgroup loss from CID fragmentation of ions [M−Na+2H+2O]⁺ at m/z 820; (d) MS/MS spectrum of ions at m/z 842, the protonated di-epoxidized PS 18:1 (9)-18:1 (9) ([M+H+2O]⁺); (e) MS/MS/MS spectrum of ions at m/z 657 generated by the headgroup loss from CID fragmentation of ions [M+H+2O]⁺ at m/z 842. The stars indicate the diagnostic ions.

Figure 57:
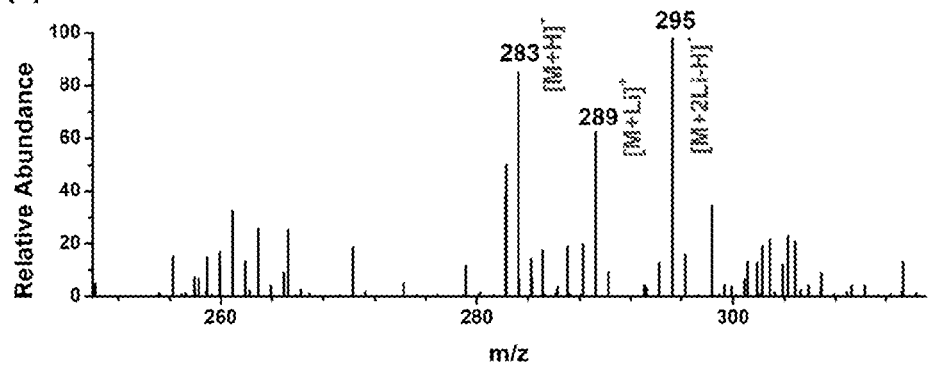
Figure 57:
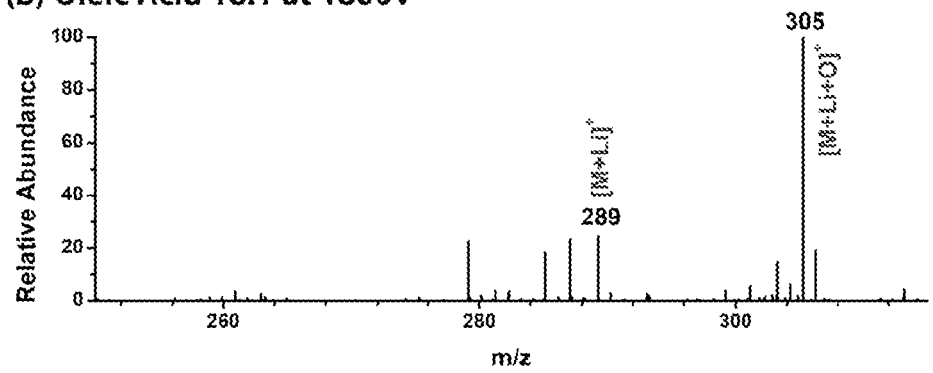

FIG. 57 shows (a) the mass spectrum of oleic acid (18:1) collected at the spray voltage of 3.0 kV without epoxidation; and (b) the mass spectrum of electro-epoxidized oleic acid (18:1) collected at the spray voltage of 1.8 kV.

Figure 58:
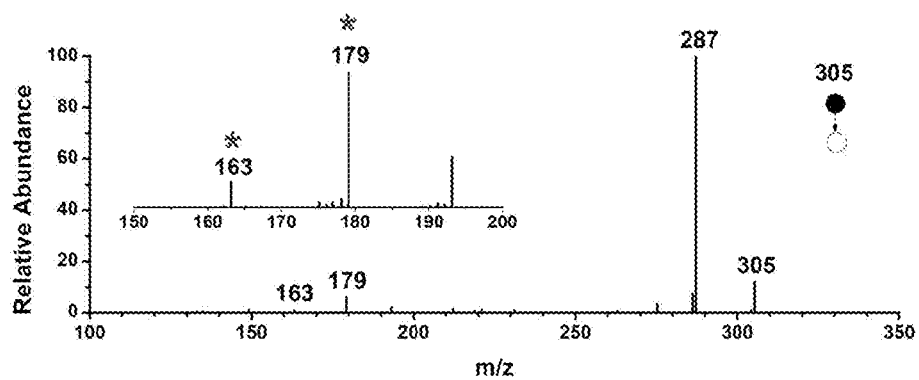

FIG. 58 shows the MS/MS spectrum of the lithiated epoxidized products of oleic acid (18:1) at m/z 305. The stars indicate the diagnostic ions.

Figure 59:
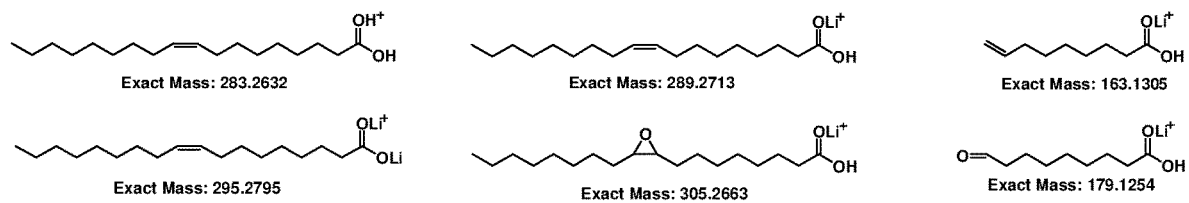

FIG. 59 shows chemical structures of ions in the analysis of oleic acid (18:1).

Figure 60:
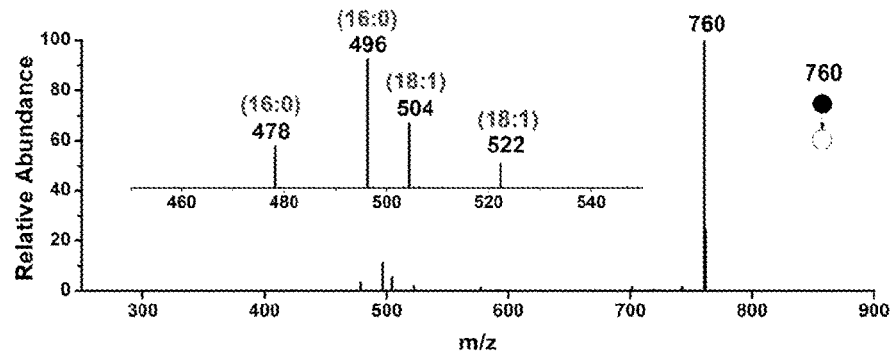
Figure 60:
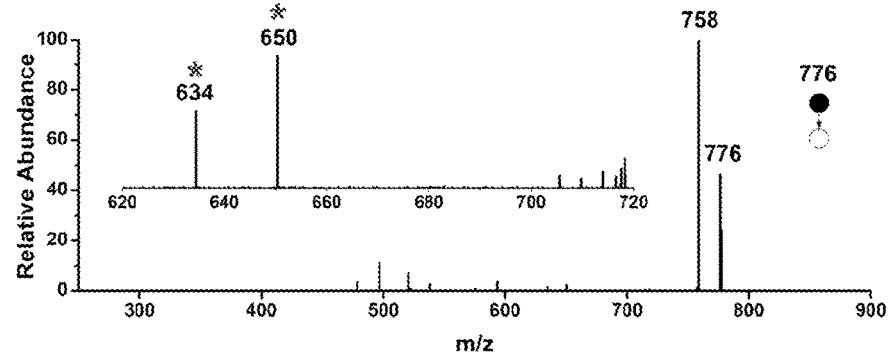

FIG. 60 shows the MS/MS spectra of (a) PC (34:1); and (b) its mono-epoxidized product. The stars indicate the diagnostic ions.

Figure 61:
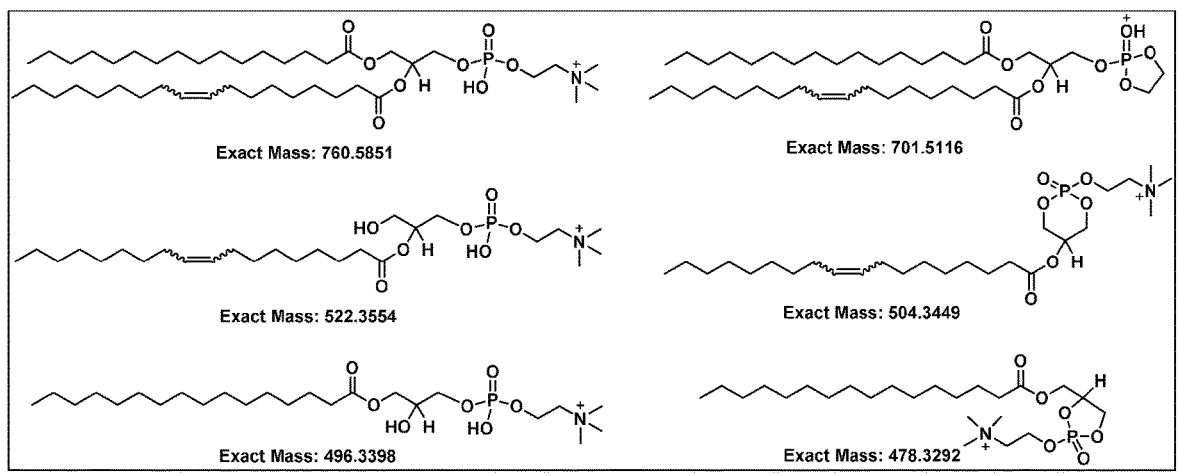

FIG. 61 shows the chemical structures of important fragments of PC 16:0_18:1.

Figure 62:
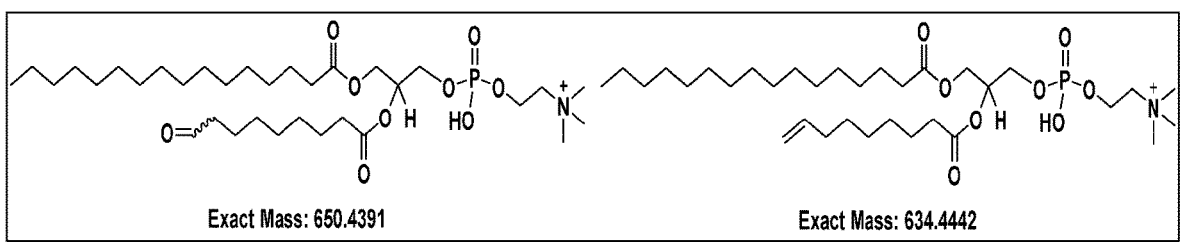

FIG. 62 shows the chemical structures of the diagnostic ions of PC 16:0_18:1 (9).

Figure 63:
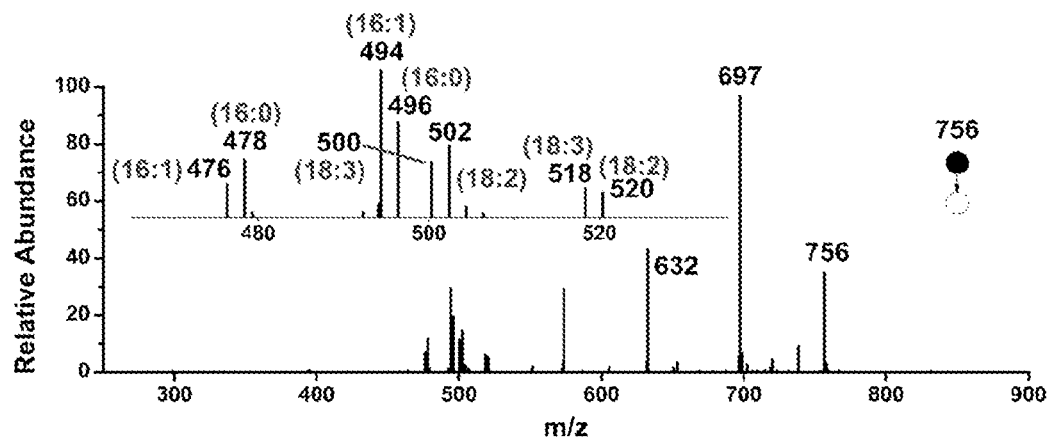
Figure 63:
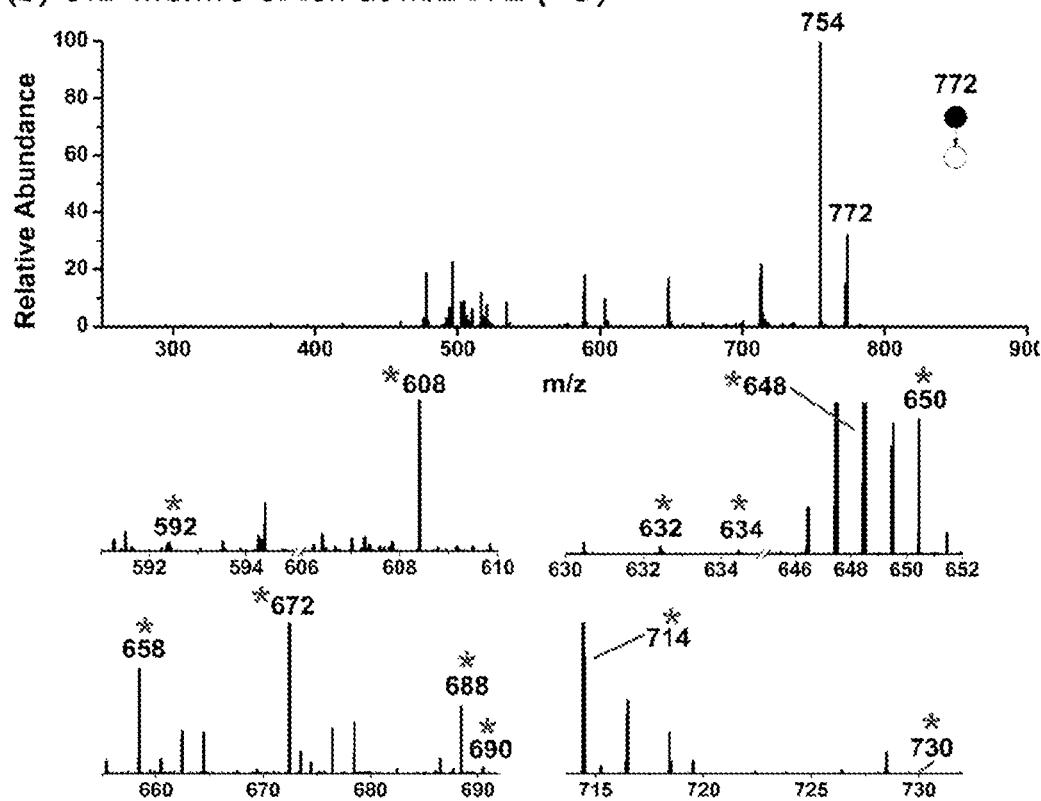

FIG. 63 shows the MS/MS spectra of (a) PC (34:3) and (b) its mono-epoxidized product. The stars indicate the diagnostic ions.

Figure 64:
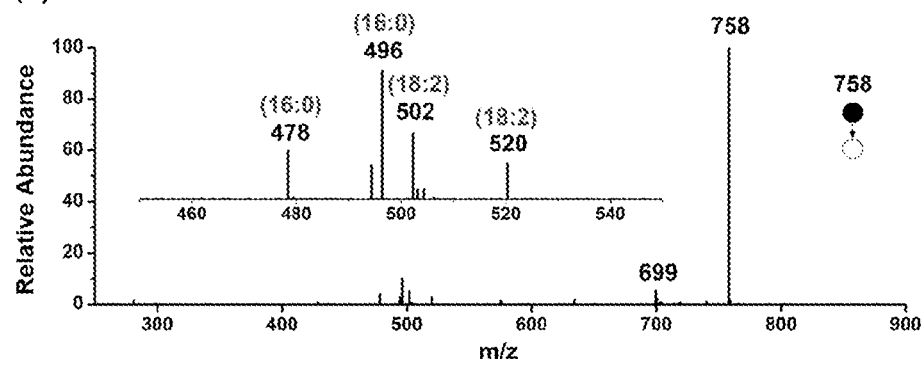
Figure 64:
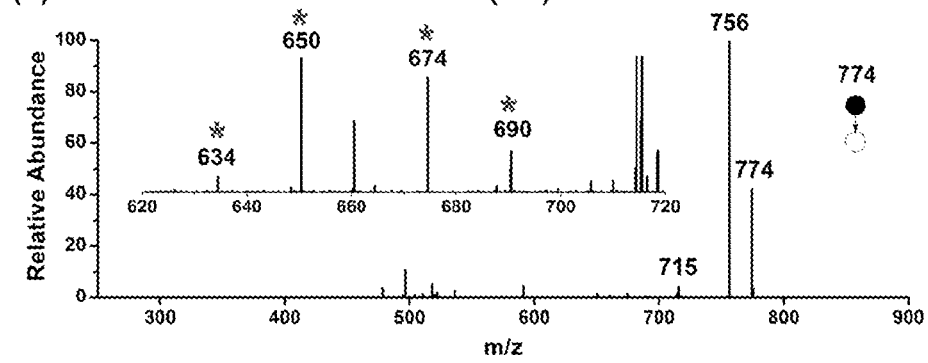

FIG. 64 shows the MS/MS spectra of (a) PC (34:2) and (b) its mono-epoxidized product. The stars indicate the diagnostic ions.

Figure 65:
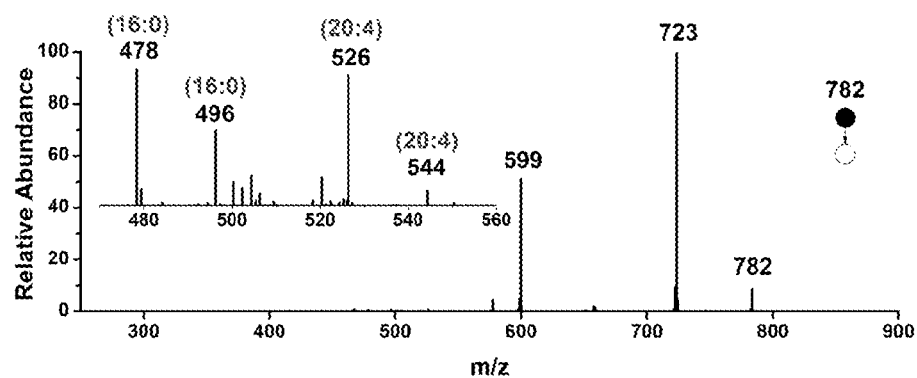
Figure 65:
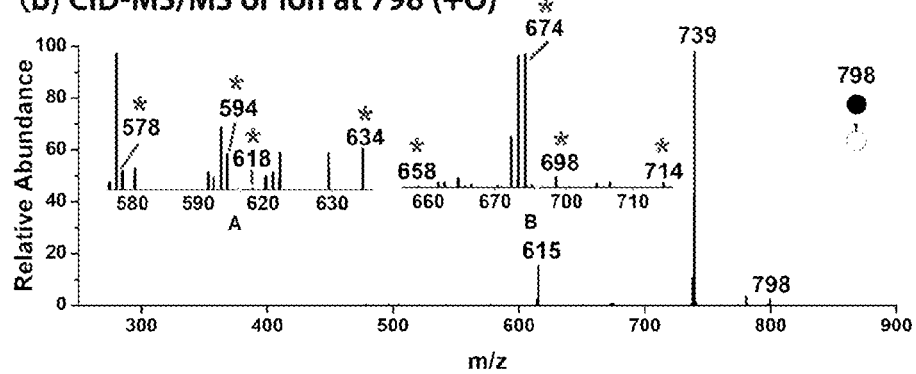

FIG. 65 shows the MS/MS spectra of the (a) PC (36:4) and (b) its mono-epoxidized product. The stars indicate the diagnostic ions.

Figure 66:
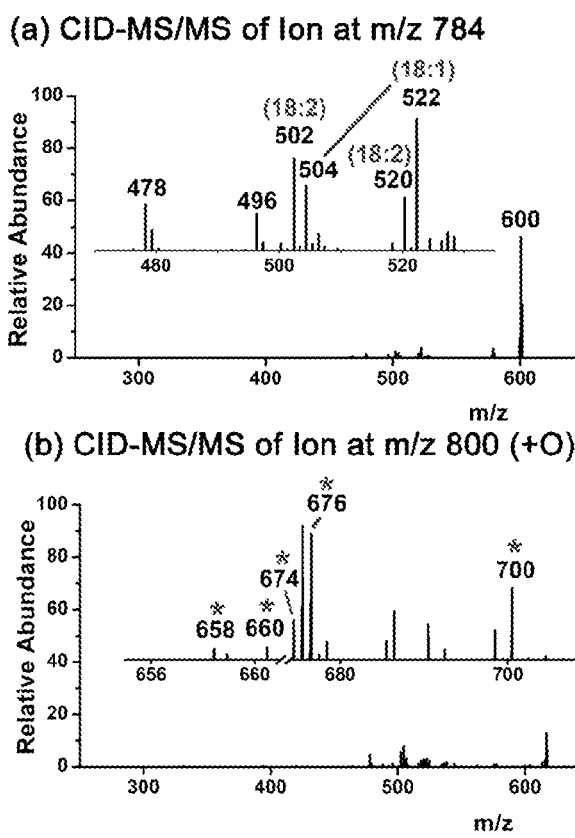

FIG. 66 shows the MS/MS spectra of the (a) PC (36:3) and (b) its mono-epoxidized product. The stars indicate the diagnostic ions.

Figure 67:
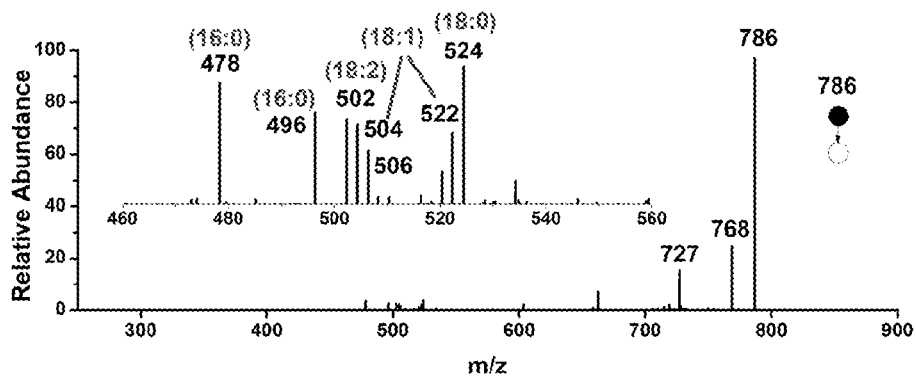
Figure 67:
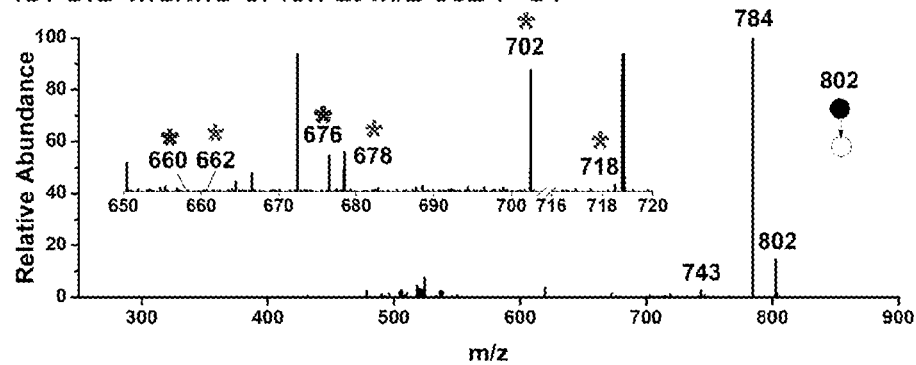

FIG. 67 shows the MS/MS spectra of (a) PC (36:2) and (b) its mono-epoxidized product. The stars indicate two groups of diagnostic ions (662, 678, 702, and 718; 660 and 676).

Figure 68:
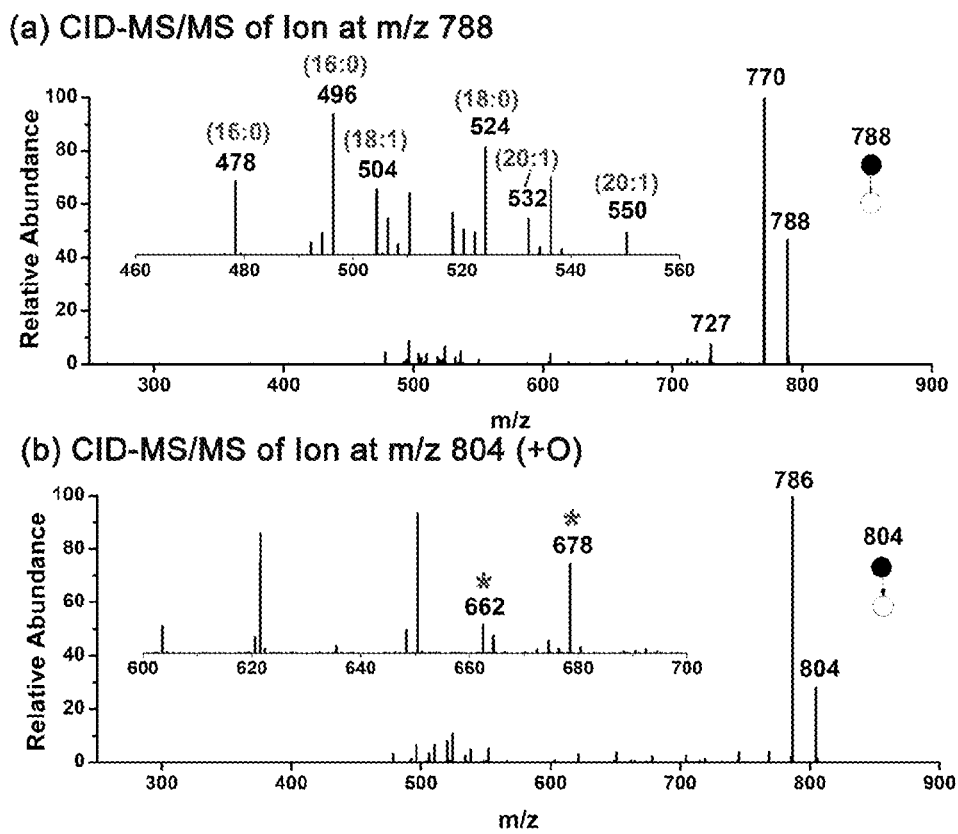

FIG. 68 shows the MS/MS spectra of (a) PC (36:1) and (b) its mono-epoxidized product. The stars indicate the diagnostic ions.

Figure 69:
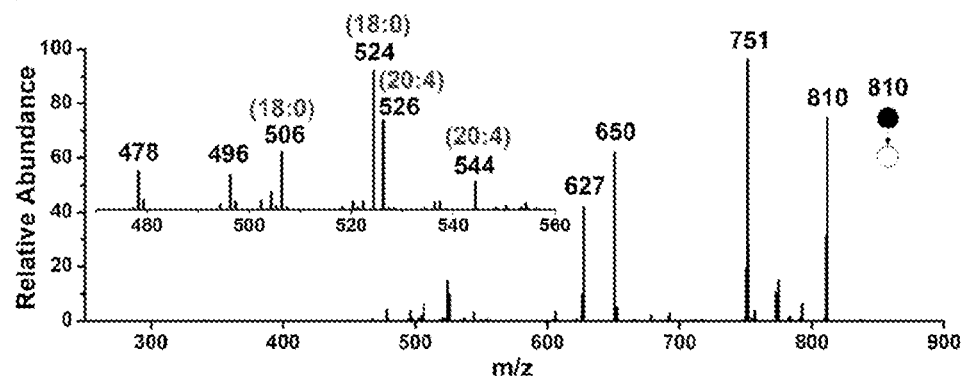
Figure 69:
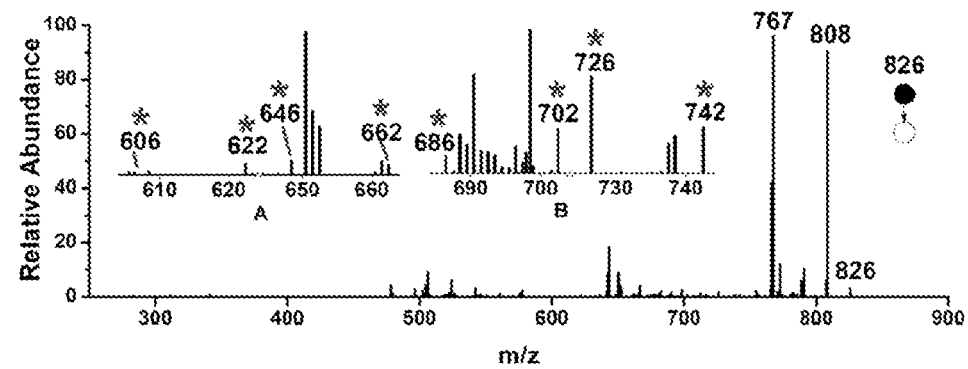

FIG. 69 shows the MS/MS spectra of (a) PC (38:4) and (b) its mono-epoxidized product. The stars indicate the diagnostic ions.

Figure 70:
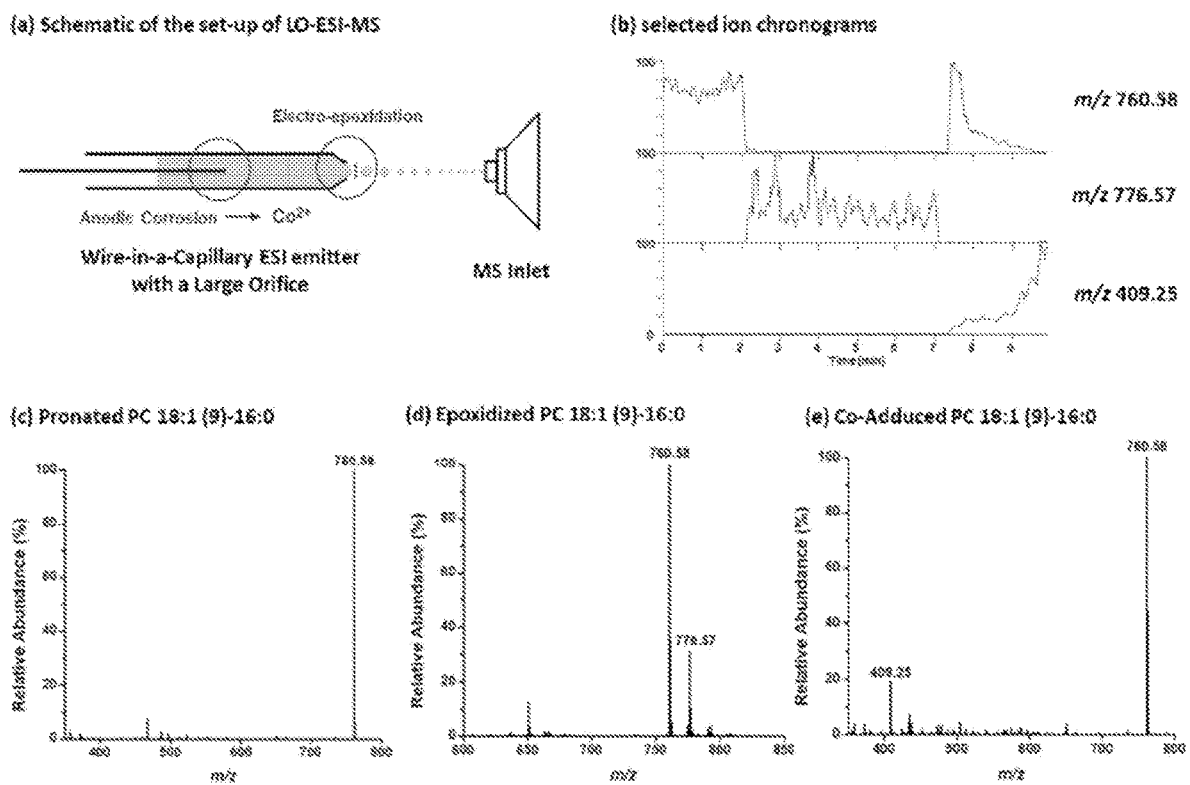

FIG. 70 shows (a) a schematic of the set-up of LO-ESI used in the on-demand EC-MS-based workflow; (b) selective ion chronograms of the protonated native lipid PC 18:1(9)-16:0 at m/z 760.58, the product ions of electro-epoxidation of double bonds at m/z 776.57 and the Co-adducted lipid ions at m/z 409.25; and mass spectra of (c) protonated, (d) epoxidized, and (e) Co-adducted PC 18:1 (9)-16:0.

Figure 71:
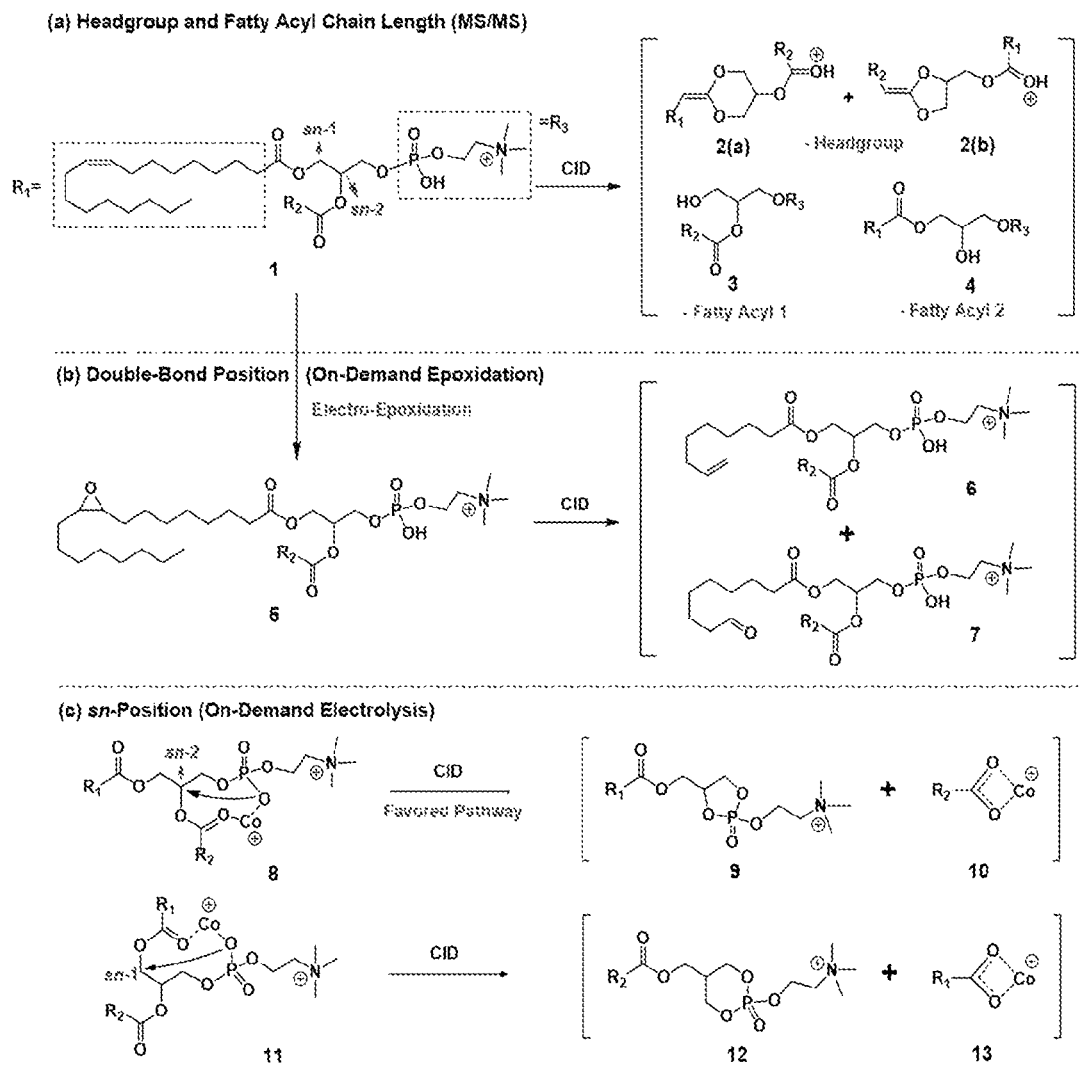

FIGS. 71 (a), 71 (b), and 71 (c) show a structure characterization of PC 18:1 (9)-16:0 using the on-demand EC-MS-based workflow (R2=n-C15H31).

Figure 72:
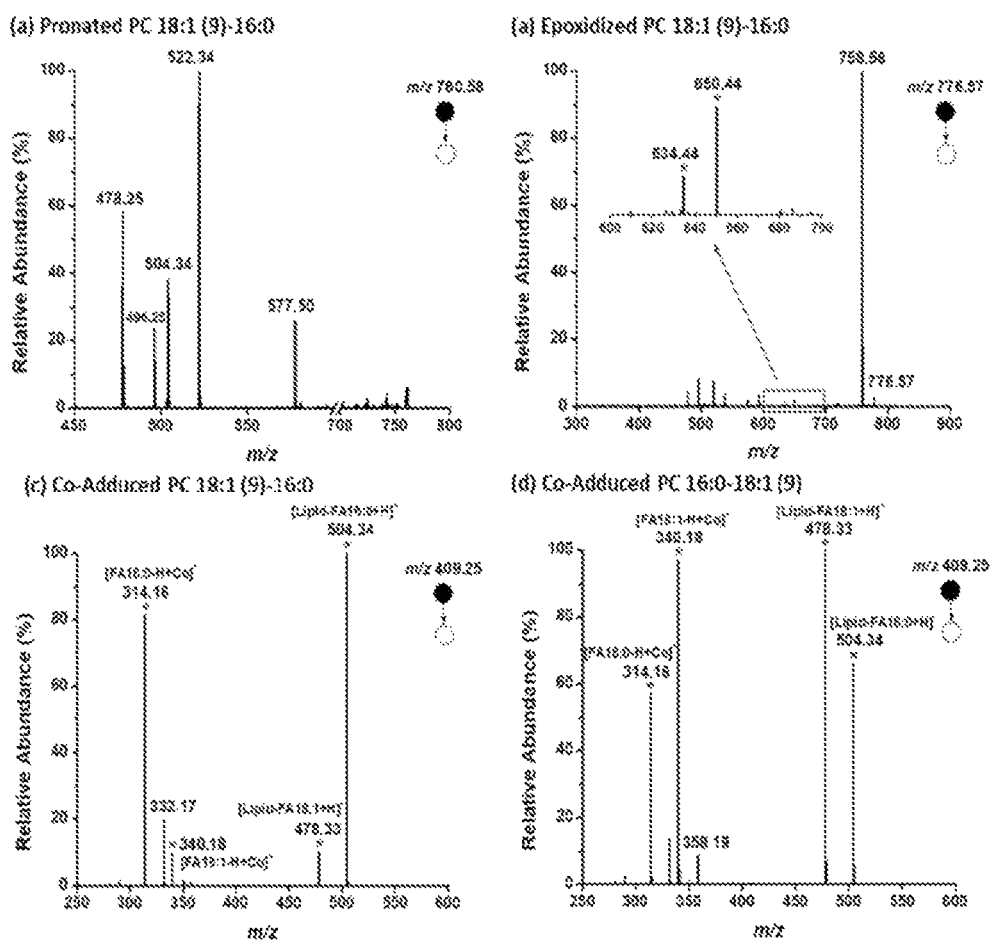

FIG. 72 shows tandem mass spectra of (a) protonated PC 18:1 (9)-16:0; (b) electro-epoxidized PC 18:1 (9)-16:0; (c) Co-adducted protonated PC 18:1 (9)-16:0; and (d) Co-adducted protonated PC 16:0-18:1 (9).

Figure 73:
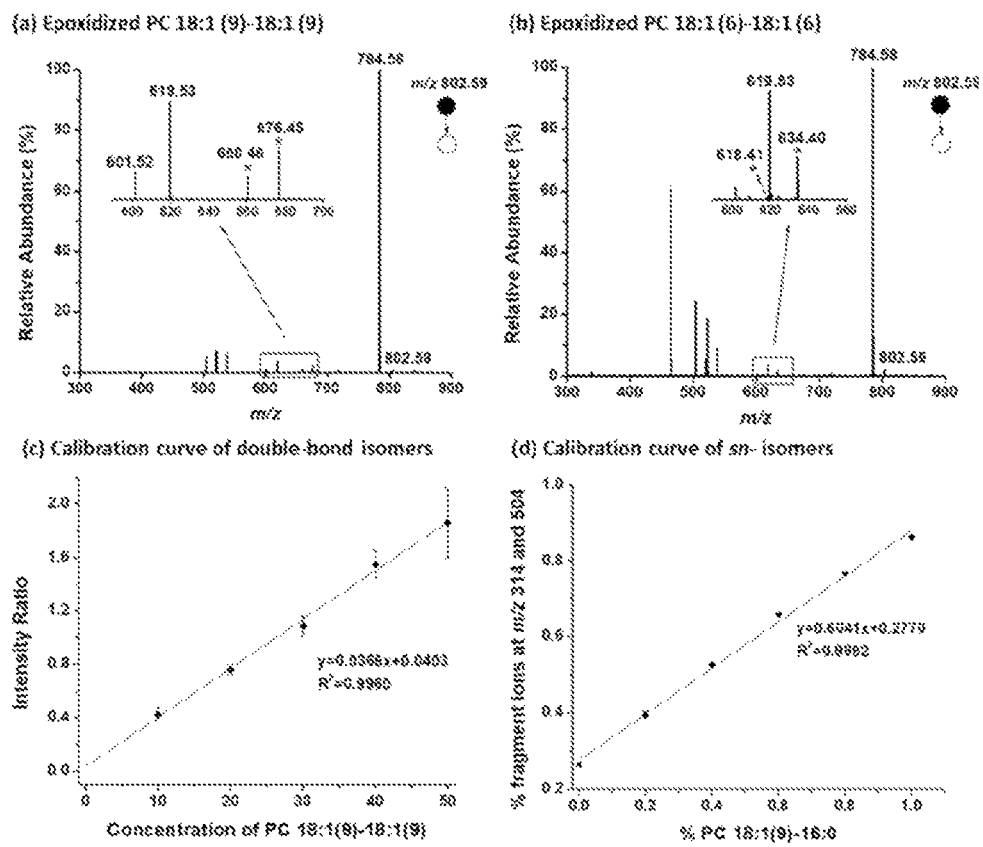

FIG. 73 shows mass spectra of mono-epoxidized (a) PC 18:1 (9)-18:1 (9) and (b) PC 18:1 (6)-18:1 (6); and the calibration curves of (c) double bond positional isomers and (d) sn-positional isomers.

Figure 74:
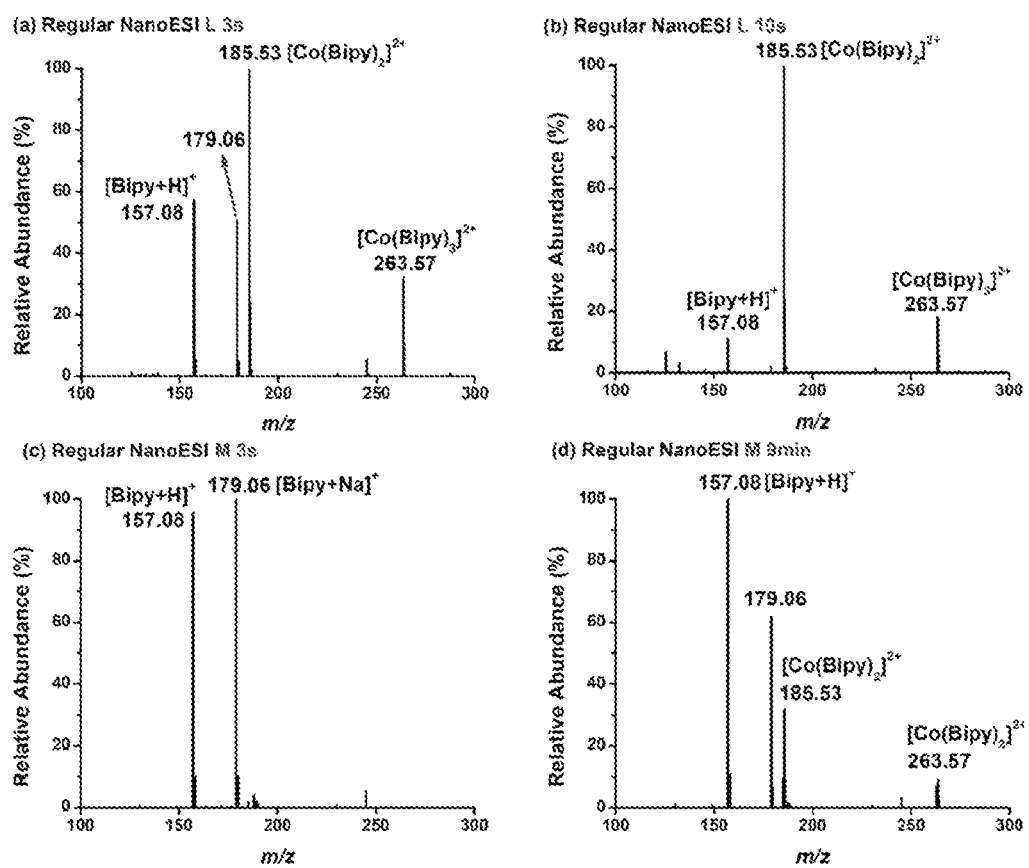

FIG. 74 shows full mass spectra collected (a) at 3 s with Co electrode positioned in the middle of a regular nanoESI emitter; (b) at 10 s with Co electrode positioned in the middle of a regular nanoESI emitter; (c) at 3 s with Co electrode positioned at the end of a regular nanoESI emitter; and (d) at 9 min with Co electrode positioned at the end of a regular nanoESI emitter when the applied spray voltage is 1.5 kV.

Figure 75:
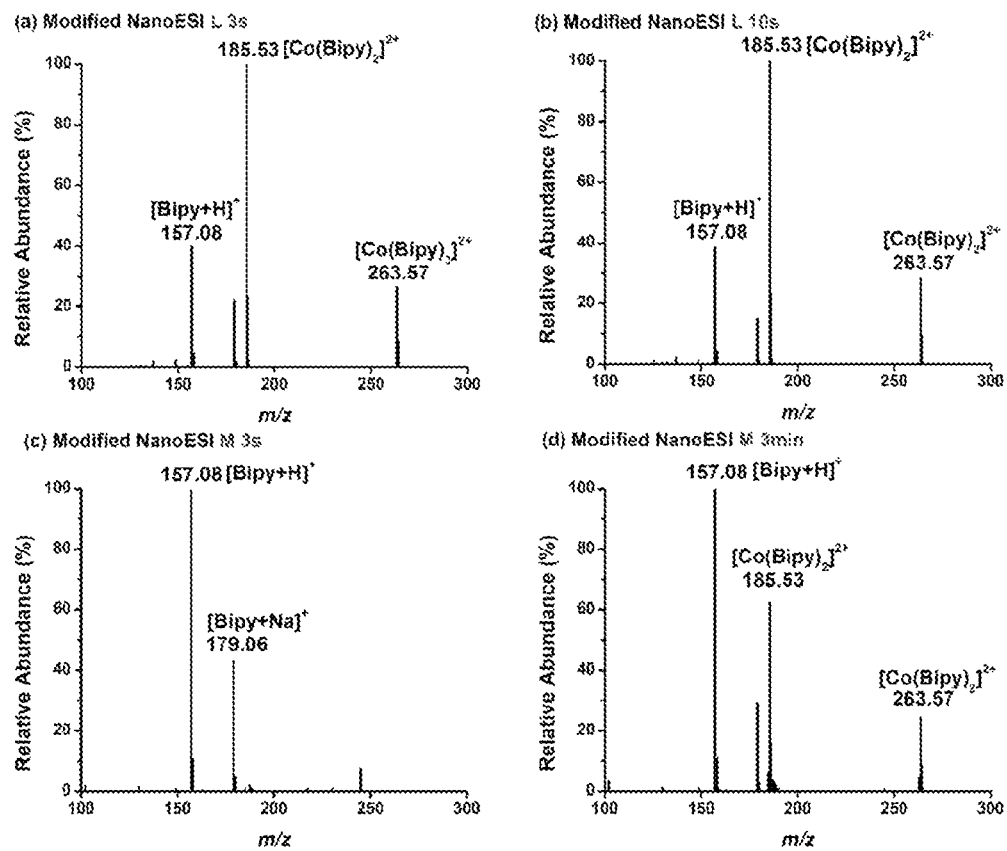

FIG. 75 shows full mass spectra collected (a) at 3 s with Co electrode positioned in the middle of a LO-ESI emitter; (b) at 10 s with Co electrode positioned in the middle of a LO-ESI emitter; (c) at 3 s with Co electrode positioned at the end of a modified LO-ESI emitter; and (d) at 3 min with Co electrode positioned at the end of a modified nanoESI emitter when the applied spray voltage is 1.5 kV.

Figure 76:
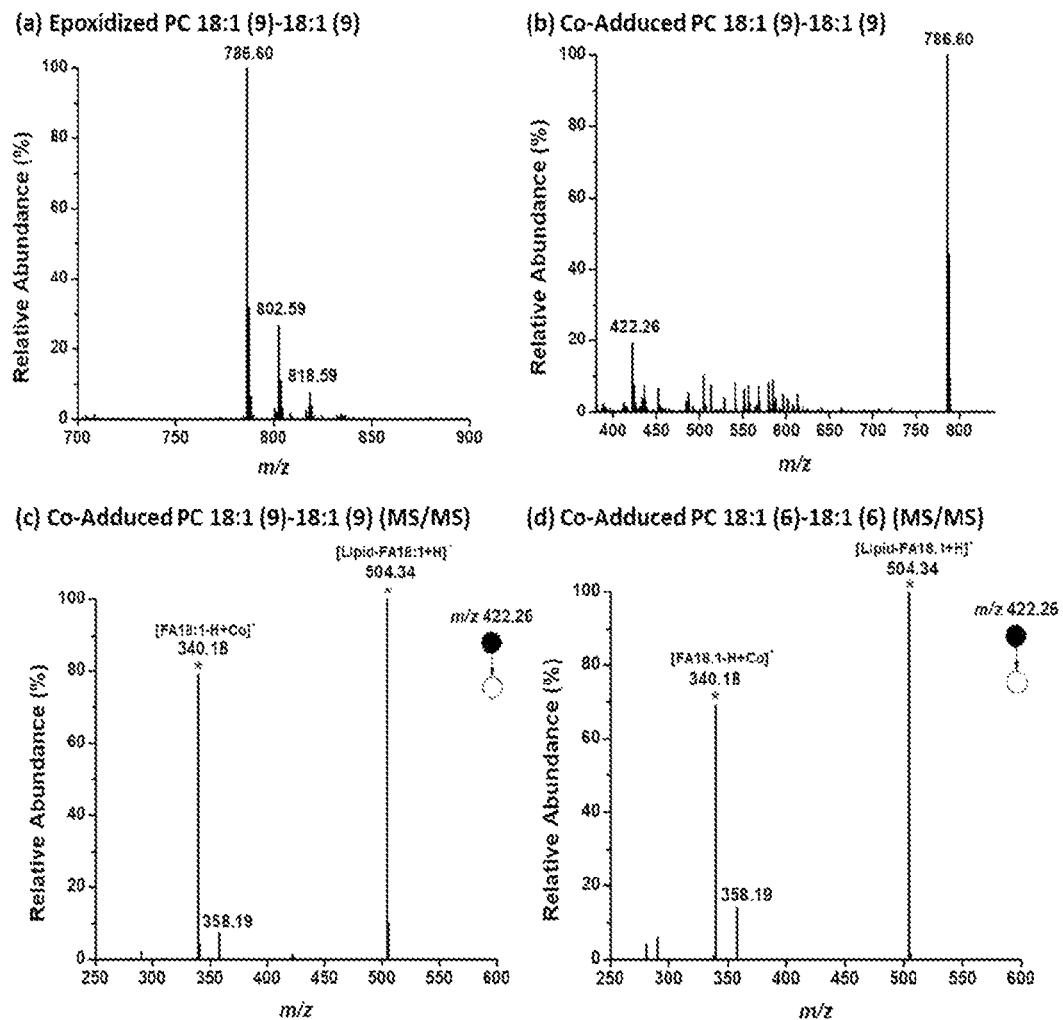

FIG. 76 shows full mass spectra of (a) epoxidized PC 18:1 (9)-18:1 (9) and (b) Co-adducted PC 18:1 (9)-18:1 (9); and tandem spectra of (c) [PC 18:1 (9)-18:1 (9)+Co]²⁺ ions (m/z 409.26) and (d) [PC 18:1 (9)-18:1 (9)+Co]²⁺ ions (m/z 409.26).

Figure 77:
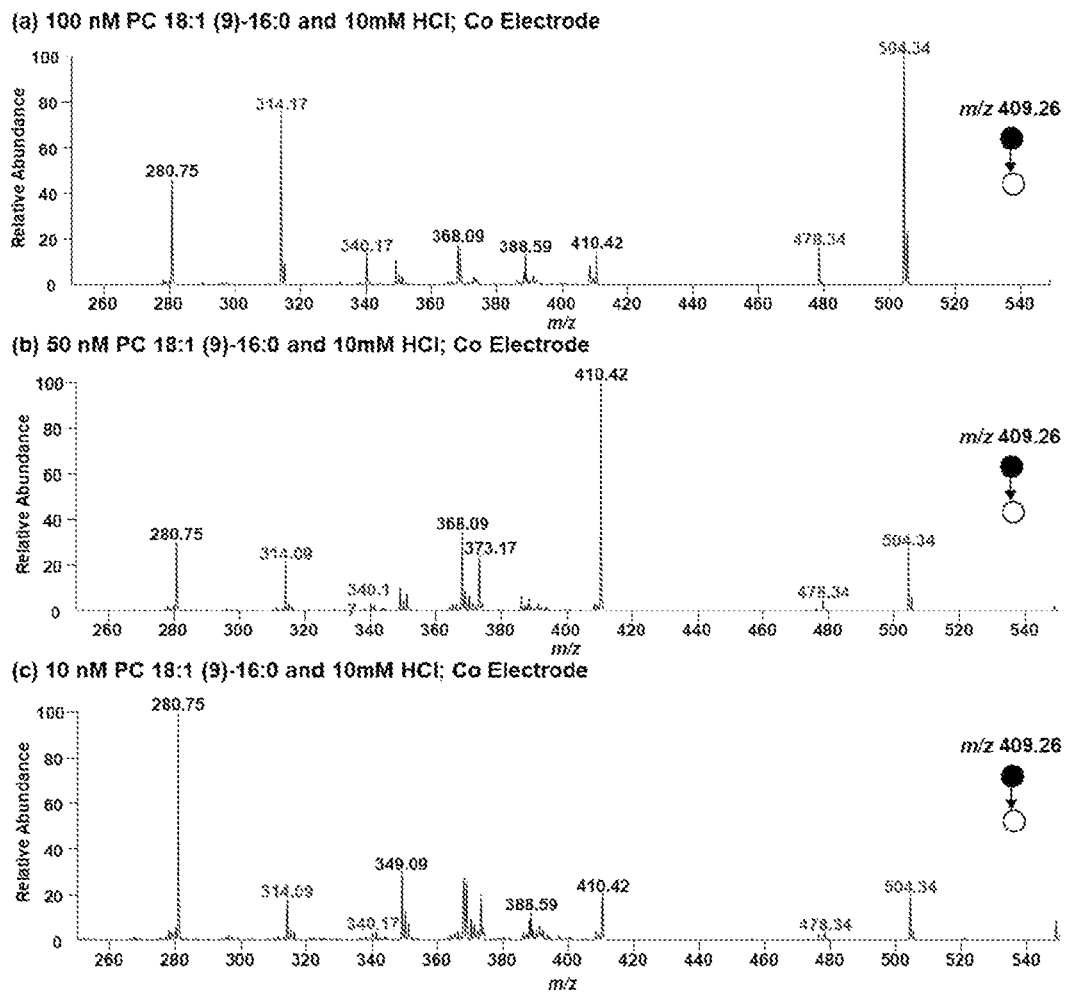

FIG. 77 shows tandem spectra of [PC 18:1 (9)-16:0+Co]²⁺ ions (m/z 409.26) when the concentration of PC 18:1 (9)-16:0 is decreasing from (a) 100 nM; (b) 50 nM; to (c) 10 nM in the presence of 10 mM HCl. Peaks in (a) at 314.17, 340.17, 478.34, and 504.34, peaks in (b) at 314.09, 340.17, 478.34, and 504.34, and peaks in (c) at 314.09, 340.17, 478.34, and 504.34 are assigned to the two pairs of diagnostic ions indicating the sn-positions of lipids.

Figure 78:
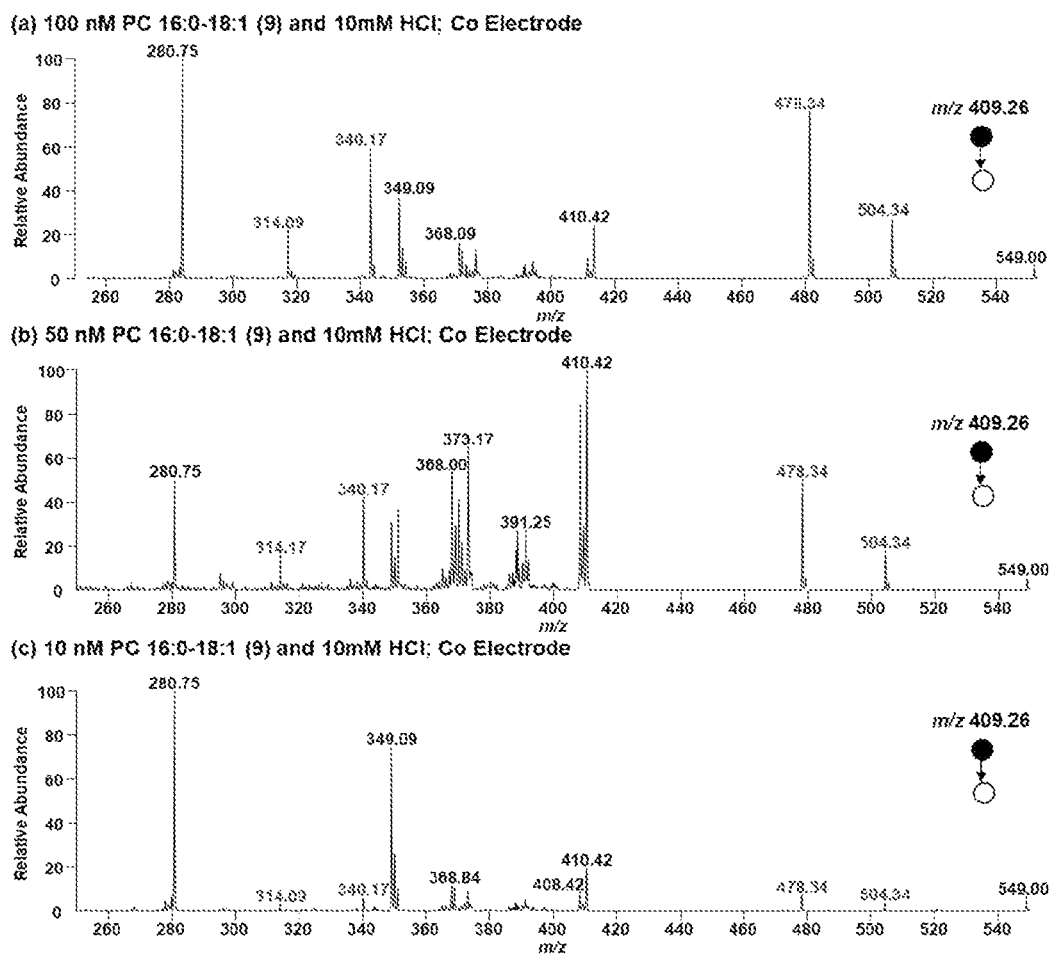

FIG. 78 shows tandem spectra of [PC 16:0-18:1 (9)+Co]²⁺ ions (m/z 409.26) when the concentration of PC 16:0-18:1 (9) is decreasing from (a) 100 nM; (b) 50 nM; to (c) 10 nM in the presence of 10 mM HCl. Peaks in (a) at 314.09, 340.17, 478.34, and 504.34, peaks in (b) at 314.17, 340.17, 478.34, and 504.34, and peaks in (c) at 314.09, 340.17, 478.34, and 504.34 are assigned to the two pairs of diagnostic ions indicating the sn-positions of lipids.

Figure 79:
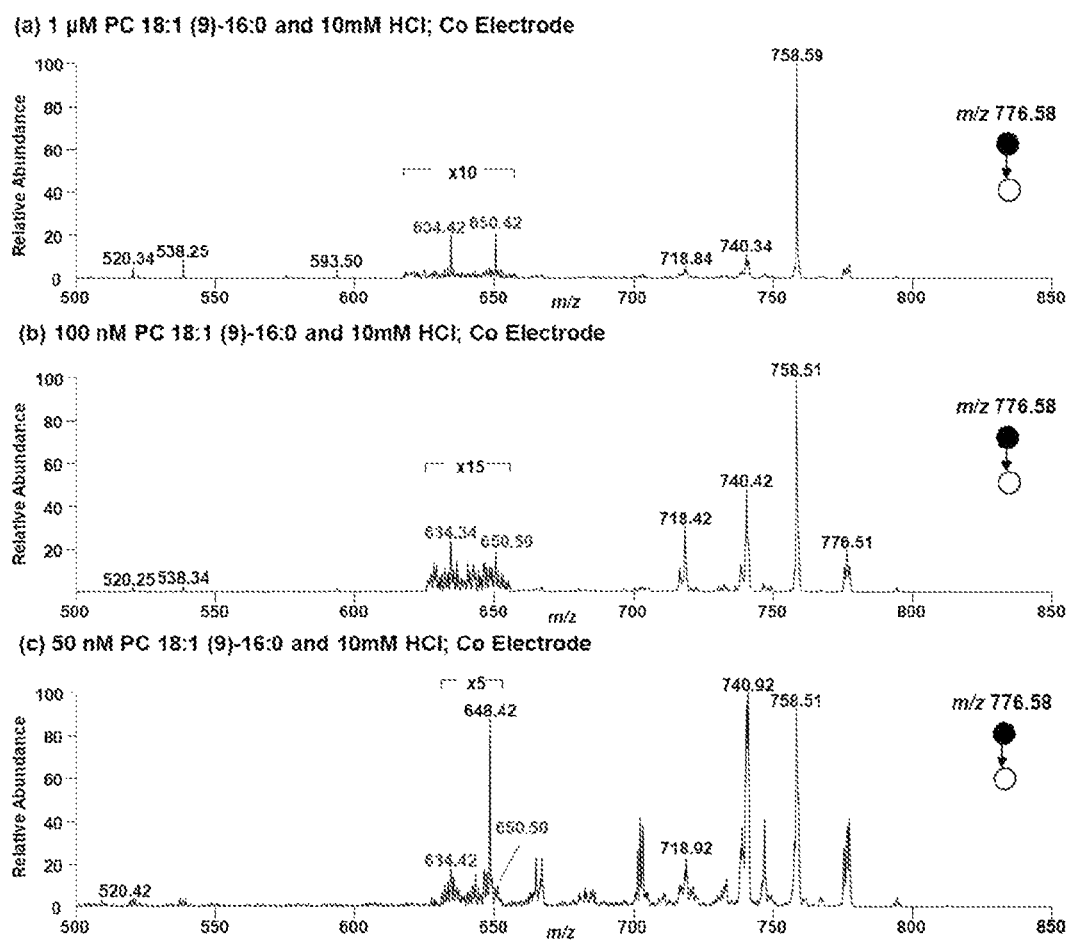

FIG. 79 shows tandem spectra of [PC 18:1 (9)-16:0+O]⁺ ions (epoxidized products, m/z 776.58) when the concentration of PC 18:1 (9)-16:0 is decreasing from (a) 1 µM; (b) 100 nM; to (c) 50 nM in the presence of 10 mM HCl. Peaks in (a) at 634.42 and 650.42, peaks in (b) at 634.34 and 650.50, and peaks in (c) at 634.42 and 650.50 are assigned to the diagnostic ions which indicate lipids double bond positions.

Figure 80:
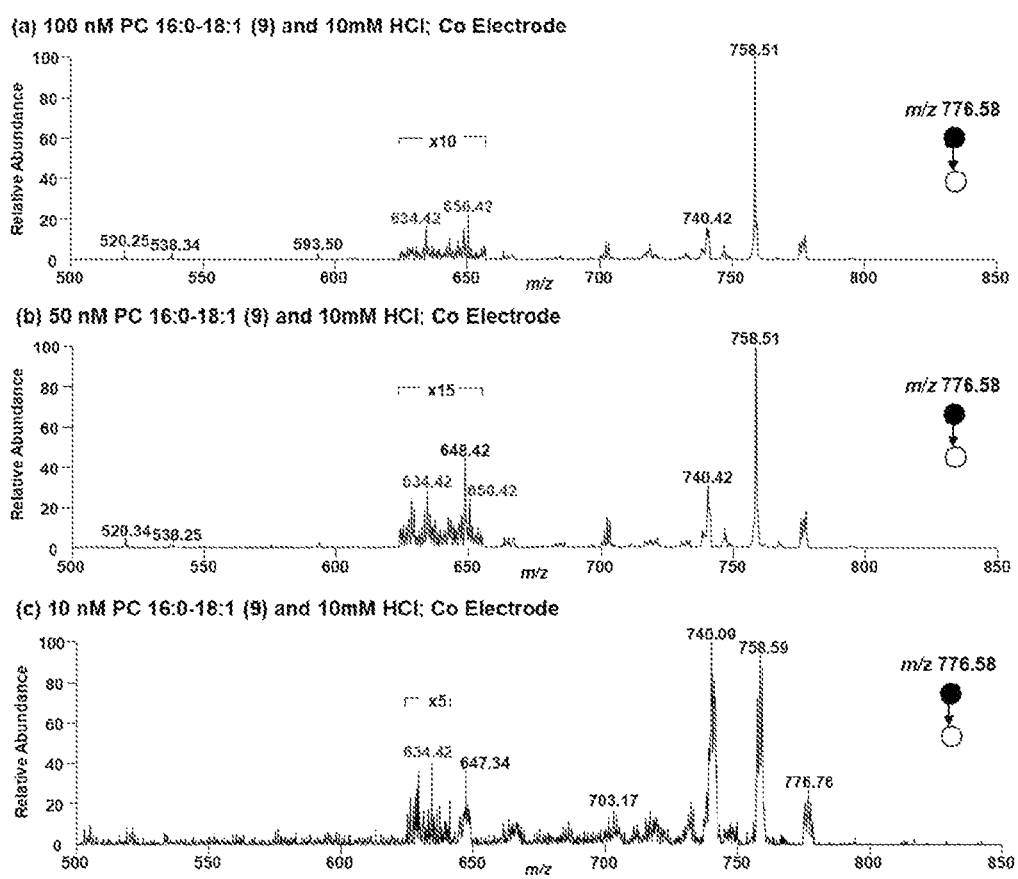

FIG. 80 shows tandem spectra of [PC 16:0-18:1 (9)+O]⁺ ions (epoxidized products, m/z 776.58) when the concentration of PC 16:0-18:1 (9) is decreasing from (a) 100 nM; (b) 50 nM; to (c) 10 nM in the presence of 10 mM HCl. Peaks in (a) at 634.42 and 650.42, peaks in (b) at 634.42 and 650.42, and peaks in (c) at 634.42 are assigned to the diagnostic ions which indicate lipids double bond positions.

DETAILED DESCRIPTION

Methods for identifying structural features of lipids have been discovered and are described hereinbelow, including but not limited to methods for identifying a positional isomer of a double bond in a lipid, methods for identifying an sn-position of a lipid, and methods for identifying both a double bond positional isomer and an sn-position of a lipid. In illustrative embodiments, as further described below, methods in accordance with the present teachings make advantageous use of interfacial microreactors and mass spectrometry techniques.

Microdroplet chemistry may be used to accelerate reactions at the air/solution interface. In accordance with the present teachings, a novel voltage-controlled interfacial microreactor is provided, which allows acceleration of electrochemical reactions that is not observed in bulk or conventional electrochemical cells. The microreactor is formed at the interface of the Taylor cone in an electrospray emitter with a large orifice. This allows continuous contact of the electrode and the reactants at/near the interface. The electrochemical microreactor in accordance with the present teachings has unique features that, in some embodiments, allow (i) voltage-controlled acceleration of electrochemical reactions achieved by voltage-dependent formation of the interfacial microreactor; (ii) "reversible" electrochemical derivatization; and/or (iii) in situ mechanistic study and capture of key radical intermediates when coupled with mass spectrometry.

In some embodiments, an on-demand electrochemical epoxidation may be incorporated into the standard nano-electrospray ionization mass spectrometry (nanoESI MS) workflow for double bond identification. This unique capability results from Applicant's discovery of a novel tunable electro-epoxidation of double bonds, where onset of the reaction may be controlled by simply tuning the spray voltage. On-demand formation of mono-/multiple epoxides may be achieved at different voltages demonstrated in the unsaturated lipid analysis. The electro-epoxidized products may then be fragmented (e.g., by tandem MS) to generate diagnostic ions indicating the position of one or more double bonds. The whole process may be completed within seconds and holds great promise for high-throughput analysis. This method may be used to great advantage in lipid-related biological studies in view of the rapid switch-on/off electro-epoxidation of a single sample, the low sample consumption, the demonstrated applicability to complex lipids containing multiple double bonds, and/or the fact that no extra apparatus is required.

In some embodiments, an on-demand electrochemical mass spectrometry workflow for lipid structural characterization is provided that has the capability of identifying both double bond and sn-positional isomers. Two voltage-controlled electrochemical reactions, interfacial electro-epoxidation and anodic corrosion of a cobalt electrode, may be cascaded in this strategy. The epoxidized products and Co-adducted ions of lipids may be fragmented in tandem MS to generate structure characteristic fragments that indicate both double bond and sn-positions. The unique feature of this workflow lies in the sequential localization of double bonds, elucidation of sn-positions, and collection of native lipid information in a single system and simply by tuning ESI voltages. This method will be widely applicable in the lipidomic field in view of the low sample consumption, the fact that extra apparatus is not required, and/or the ability to perform quantitative analysis.

After an introductory description of general methods in accordance with the present teachings, a more detailed description will be provided in turn for each of the following aspects: (i) accelerating electrochemical reactions in a voltage-controlled interfacial microreactor; (ii) on-demand electrochemical epoxidation in nano-electrospray ionization mass spectrometry to locate carbon-carbon double bonds; and (iii) simultaneous characterization of lipid sn-positional and double bond positional isomers using on-demand electrochemical mass spectrometry.

It is to be understood that elements and features of the various representative embodiments described below may be combined in different ways to produce new embodiments that likewise fall within the scope of the present teachings.

By way of general introduction, a method for identifying a structural feature of a lipid in accordance with the present teachings includes: (a) conducting at least one voltage-controlled electrochemical reaction that converts the lipid to a first derivatized lipid; and (b) fragmenting the first derivatized lipid to generate at least one diagnostic ion indicative of a first structural feature of the lipid.

As used herein, the phrase "derivatized lipid" refers to a reaction product derived from a chemical reaction involving a lipid. Solely by way of illustration, a representative derivatized lipid in accordance with the present teachings may include but is not limited to an epoxide-containing lipid (e.g., a reaction product derived from a double bond-containing lipid through an epoxidation reaction), a metal-lipid complex (e.g., a reaction product derived from a lipid through complexation with a metal ion), and/or the like, and combinations thereof.

In some embodiments, the at least one voltage-controlled electrochemical reaction is performed in an interfacial microreactor coupled with nano-electrospray ionization (nanoESI) mass spectrometry. In some embodiments, the interfacial microreactor is formed at an interface of a Taylor cone in an electrospray emitter which, in some embodiments, has an orifice of at least about 60 (in some embodiments, at least about 61 µm, 62 µm, 63 µm, 64 µm, 65 µm, 66 µm, 67 µm, 68 µm, 69 µm, 70 µm, 71 µm, 72 µm, 73 µm, 74 µm, or 75 µm).

In some embodiments, a method in accordance with the present teachings further includes applying a first voltage to a nanoESI working electrode. The first voltage may be configured to initiate the at least one voltage-controlled electrochemical reaction and/or to generate an electrospray containing the first derivatized lipid. In some embodiments, a method in accordance with the present teachings further includes applying a second voltage to the nanoESI working electrode. The second voltage may be configured to terminate the at least one voltage-controlled electrochemical reaction.

In accordance with the present teachings, the fragmenting of the first derivatized lipid to generate at least one diagnostic ion indicative of the first structural feature of the lipid may be achieved via tandem mass spectrometry (MS/MS). In some embodiments, the fragmenting includes collision-induced dissociation (CID). In some embodiments, methods in accordance with the present teachings utilize nano-electrospray ionization mass spectrometry (nanoESI MS) coupled with tandem mass spectrometry (MS/MS).

As described above, methods in accordance with the present teachings may be used to identify a positional isomer of a double bond in a lipid. In such embodiments, the lipid contains at least one double bond, and the at least one voltage-controlled electrochemical reaction may include an epoxidation reaction. The first structural feature of the lipid as determined by such methods includes a positional isomer of the at least one double bond.

Methods in accordance with the present teachings may also be used to identify an sn-position of a lipid. Methods for identifying an sn-position of a lipid in accordance with the present teachings may be used independently of—or in conjunction with—methods for identifying a double bond positional isomer in accordance with the present teachings. In some embodiments of a method for identifying an sn-position of a lipid in accordance with the present teachings, the at least one voltage-controlled electrochemical reaction may include producing in situ a $Co^{2+}$ ion by anodic corrosion of an electrospray ionization (ESI) electrode (which, in some embodiments, includes a cobalt wire), and complexing the in situ-produced $Co^{2+}$ ion to the lipid at one or a plurality of sn-positions to form a $Co^{2+}$-lipid complex. In such embodiments, the first structural feature comprises an sn-position of the lipid.

As described above, methods for identifying an sn-position of a lipid in accordance with the present teachings may be used in combination with methods for identifying a double bond positional isomer in accordance with the present teachings. In such embodiments, the method includes (a) conducting at least one voltage-controlled electrochemical reaction that converts the lipid to a first derivatized lipid; (b) fragmenting the first derivatized lipid to generate at least one diagnostic ion indicative of a first structural feature of the lipid; (c) conducting at least one additional voltage-controlled electrochemical reaction to form a second derivatized lipid; and (d) fragmenting the second derivatized lipid to generate at least one diagnostic ion indicative of a second structural feature of the lipid. In such embodiments, the at least one voltage-controlled electrochemical reaction may include an epoxidation reaction, the first structural feature may include a positional isomer of the at least one double bond, the at least one additional voltage-controlled electrochemical reaction may include producing in situ a $Co^{2+}$ ion by anodic corrosion of an electrospray ionization (ESI) electrode and complexing the $Co^{2+}$ ion to the lipid, and the second structural feature may include an sn-position of the lipid.

In some embodiments, the at least one additional voltage-controlled electrochemical reaction is performed in an interfacial microreactor coupled with nano-electrospray ionization (nanoESI) mass spectrometry. In some embodiments, the interfacial microreactor is formed at an interface of a Taylor cone in an electrospray emitter which, in some embodiments, has an orifice of at least about 60 µm (in some embodiments, at least about 61 µm, 62 µm, 63 µm, 64 µm, 65 µm, 66 µm, 67 µm, 68 µm, 69 µm, 70 µm, 71 µm, 72 µm, 73 µm, 74 µm, or 75 µm.

For embodiments in which the at least one voltage-controlled electrochemical reaction includes an electrochemical epoxidation, the method may further include applying a first voltage to a nanoESI working electrode, wherein the first voltage is configured to initiate the epoxidation reaction and/or generate an electrospray containing the epoxide-containing lipid, and wherein the first voltage ranges from about 1.5 kV to about 2.3 kV. In some embodiments, the product of the electro-epoxidation of a lipid is fragmented when the voltage is about 1.8 kV. For embodiments in which the at least one voltage-controlled electrochemical reaction includes the in situ production of $Co^{2+}$ ion and formation of a $Co^{2+}$-lipid complex, the method may further include applying a second voltage to the nanoESI working electrode, wherein the second voltage is configured to initiate the in situ production of the $Co^{2+}$ ion and the formation of the $Co^{2+}$-lipid complex and/or generate an electrospray containing the $Co^{2+}$-lipid complex, and wherein the second voltage ranges from about 2.5 kV to about 3.0 kV In some embodiments, the $Co^{2+}$-lipid complex is fragmented when the voltage is switched to about 3.0 kV.

In some embodiments, a method for identifying a structural feature of a double bond-containing lipid in accordance with the present teachings includes: (a) conducting a voltage-controlled electrochemical epoxidation reaction that converts the double bond-containing lipid to an epoxide-containing lipid; (b) fragmenting the epoxide-containing lipid via tandem mass spectrometry (MS/MS) to generate at least one diagnostic ion indicative of a positional isomer of at least one double bond of the double bond-containing lipid; (c) conducting a voltage-controlled anodic corrosion of an electrospray ionization (ESI) electrode to produce $Co^{2+}$ ion in situ; (d) complexing the in situ-produced $Co^{2+}$ ion to the lipid at one or a plurality of sn-positions to form a $Co^{2+}$-lipid complex; and (d) fragmenting the $Co^{2+}$-lipid complex via tandem mass spectrometry (MS/MS) to generate at least one diagnostic ion indicative of the sn-position of the lipid.

Additional detailed description will now be provided in turn to illustrate each of the following aspects of the present teachings: (i) accelerating electrochemical reactions in a voltage-controlled interfacial microreactor; (ii) on-demand electrochemical epoxidation in nano-electrospray ionization mass spectrometry to locate carbon-carbon double bonds; and (iii) simultaneous characterization of lipid sn-positional and double bond positional isomers using on-demand electrochemical mass spectrometry. Additional aspects of the acceleration of electrochemical reactions in a voltage-controlled interfacial microreactor in accordance with the present teachings are described in *Angew. Chem.*, 2020, 59, 1-7 and the references cited therein. Additional aspects of on-demand electrochemical epoxidation in nano-electrospray ionization mass spectrometry to locate carbon-carbon double bonds are described *Angew. Chem.*, 2020, 132, 215-220 and the references cited therein.

Accelerating Electrochemical Reactions in a Voltage-Controlled Interfacial Microreactor Microdroplets are a unique form of chemical reactor in which the interfacial chemistry produces reaction acceleration. Many studies have shown that reactions in microdroplets exhibit acceleration of reaction rates by one or more orders of magnitude compared to the corresponding bulk reactions. This effect is associated with reactions at the solution-air interface, where partial solvation of the reagents is one factor that reduces the critical energy for reaction. These findings have stimulated the applications of microdroplet chemistry in chemical derivatization, reaction mechanistic studies, high-throughput reaction screening, and rapid small-scale, green and sustainable synthesis.

Microdroplets may be readily generated by various spray methods, drop-casting thin film, ultrasonic nebulization, and Leidenfrost levitation. Electrospray ionization (ESI)-based microdroplets are most commonly used in performing accelerated reactions, where electrostatic force is applied to a solution of reaction mixture. The jet of finite conductivity, known as the Taylor cone, breaks up into a plume of charged droplets where increased surface areas of microdroplets allow the acceleration of reactions. It is worth noting that such spray-based microdroplet reactors may be directly coupled with a mass spectrometer. Therefore, microdroplet reactions may be monitored in real time, and structures of intermediates and products as well as reaction kinetics may be analyzed in situ.

Reactions that have been studied in microdroplets include C—C, C—N, and C—O bond formation. However, up to now, a large and significant category of reactions not demonstrated in microdroplets is the electrochemical reaction. Modern electrochemistry has undergone a revival during the last few decades that results in many benefits over traditional reagent-based transformations. For example, electricity is used instead of stoichiometric amounts of redox reagents for chemical conversions; oxidizing and reducing potentials may be precisely controlled to enable highly chemoselective transformations. In spite of these benefits, electrochemical reactions often suffer from long reaction times, typically around 2-38 hours. Such an obstacle prevents them from enjoying wide and efficient use. Thus, there is a need to develop a microreactor that may be used to accelerate electrochemical reactions.

The challenge of developing spray-based microdroplet reactors applicable to electrochemical reactions is clear. In the ESI process, electrochemical reactions are terminated in microdroplets, because reactants in the electrosprayed microdroplets lose contact with the ESI electrode when droplets are formed.

ESI may be coupled with a separate electrochemical (EC) flow reactor or directly used as an electrochemical cell for various studies, such as identification of reaction intermediates, examination of electrochemical reactions, and to mimic biologically relevant electrochemical reactions. However, the electrochemical reactions occurring in such electrochemical cells or ESI emitters reflect the reaction behavior in the bulk phase and do not possess the acceleration phenomenon. Molecules that are easy to oxidize or reduce by one-electron transfer can quickly form a predictable species in the ESI process, and the scope of such reactions is very limited. This approach does not apply to a broad range of slower reactions such as the transformations of $Csp^3$-H, $Csp^2$-H, C=C, —OH, and C=O groups.

Figure 32:
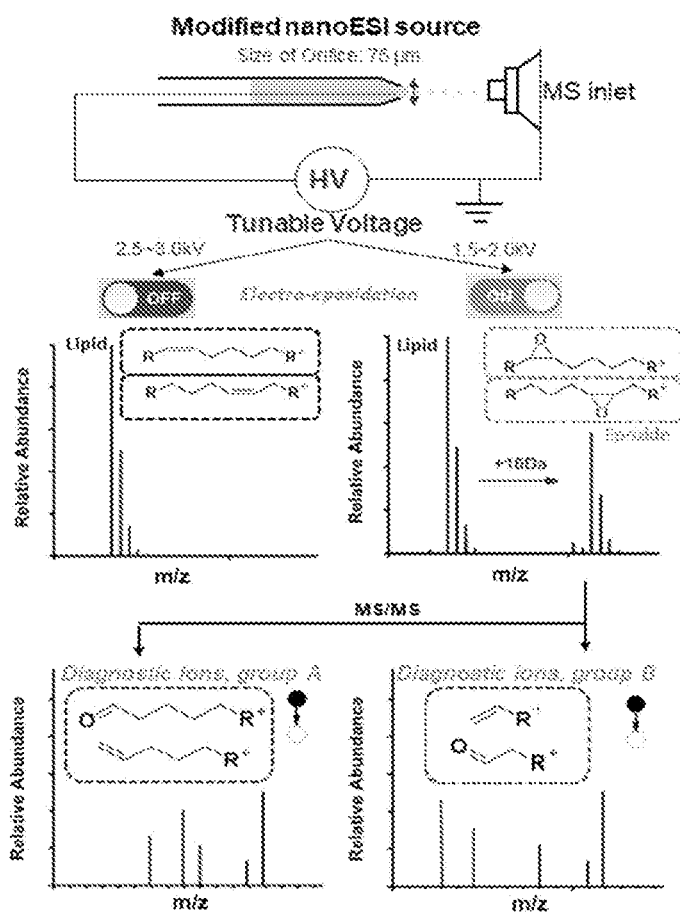
FIG. 32 shows a schematic representation of the experimental setup for the switchable electrochemical epoxidation of lipid double bonds and formation of diagnostic ions of the double bond position in CID fragmentation.

In this work, a novel electrochemical interfacial microreactor was developed that allows continuous contact of the electrode and reactants, and acceleration of electrochemical reactions in a confined volume (FIG. 32). The unique microreactor is formed at the solution-air interface of the Taylor cone in the ESI emitter with a large (139 μm) orifice, when the spray voltage is tuned to form a meniscus that has a large surface area (4500 μm$^2$) using a low ESI flow rate (a few tens of nL min$^{-1}$). The reactants at or near the meniscus may receive or lose electrons from/to the electrode upon the application of voltage, and the reaction products are immediately formed at the interface. This feature is not found in the standard ESI source with a small orifice (less than 10 μm) nor in conventional EC-MS. Moreover, the electrochemical interfacial reactor is voltage-dependent, and the occurrence of reactions may be controlled by tuning voltages.

Figure 1:
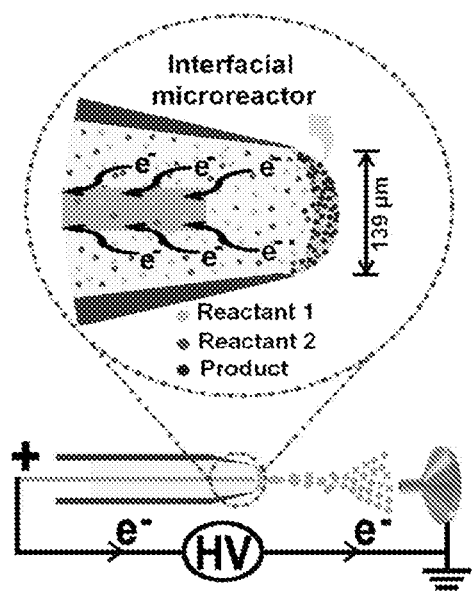
FIG. 1 shows a schematic diagram of an interfacial microreactor for accelerating electrochemical reactions. The microreactor is formed at the solution-air interface of the Taylor cone in an ESI emitter with a large (139 μm) orifice, when the spray voltage (2 kV) is tuned to form a meniscus that has a large surface area (4500 μm²) using a low ESI flow rate (a few tens of nL min$^{-1}$).
Figure 2:
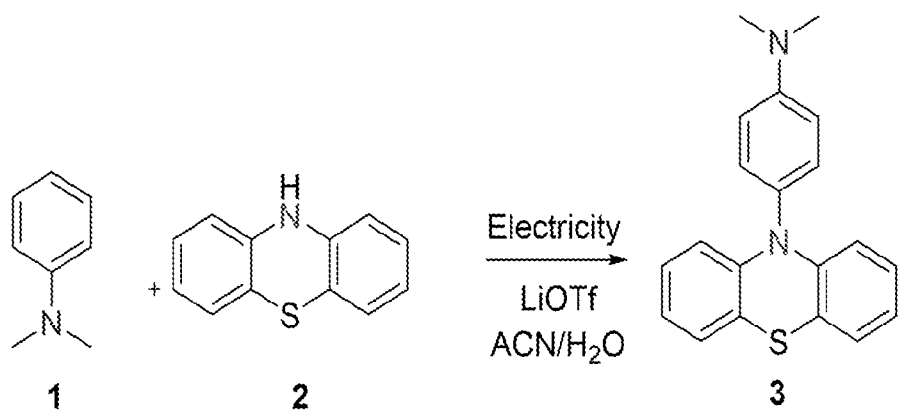
FIG. 2 shows a scheme for electro-oxidative C—H/N—H coupling of DMA (1) with PTA (2).

The feasibility of this electrochemical interfacial microreactor is demonstrated using the electro-oxidative C—H/N—H cross-coupling of N,N'-dimethylaniline (DMA) and phenothiazine (PTA) (FIG. 2) as a proof-of-concept. The electro-oxidative C—H/N—H coupling and electro-oxidation of benzyl alcohol was shown to be accelerated by more than an order of magnitude compared to the corresponding bulk reactions. Such a method of construction of aryl C—N bonds provides green and sustainable synthesis of various natural products, pharmaceuticals, agrochemicals, and materials.

Figure 3:
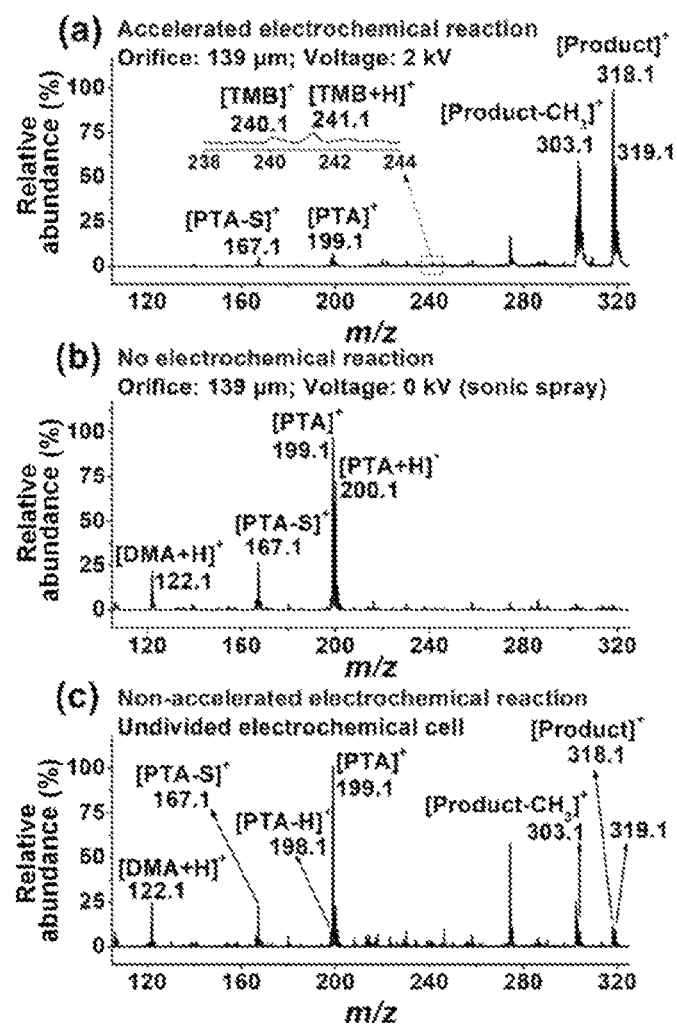
FIG. 3 shows mass spectra of the electro-oxidative coupling of PTA with DMA (a) in the interfacial microreactor at 7 sec reaction time; (b) by sonic spray; and (c) in bulk at 7 sec reaction time. The bulk reaction was performed in an undivided electrochemical cell (see Example 4 for the bulk reaction conditions and mass spectra collected at 5 min and 30 min reaction times). [Product-CH$_3$]$^+$ and [PTA-S]$^+$ are the in-source fragments. TMB is the DMA dimer.
Figure 12:
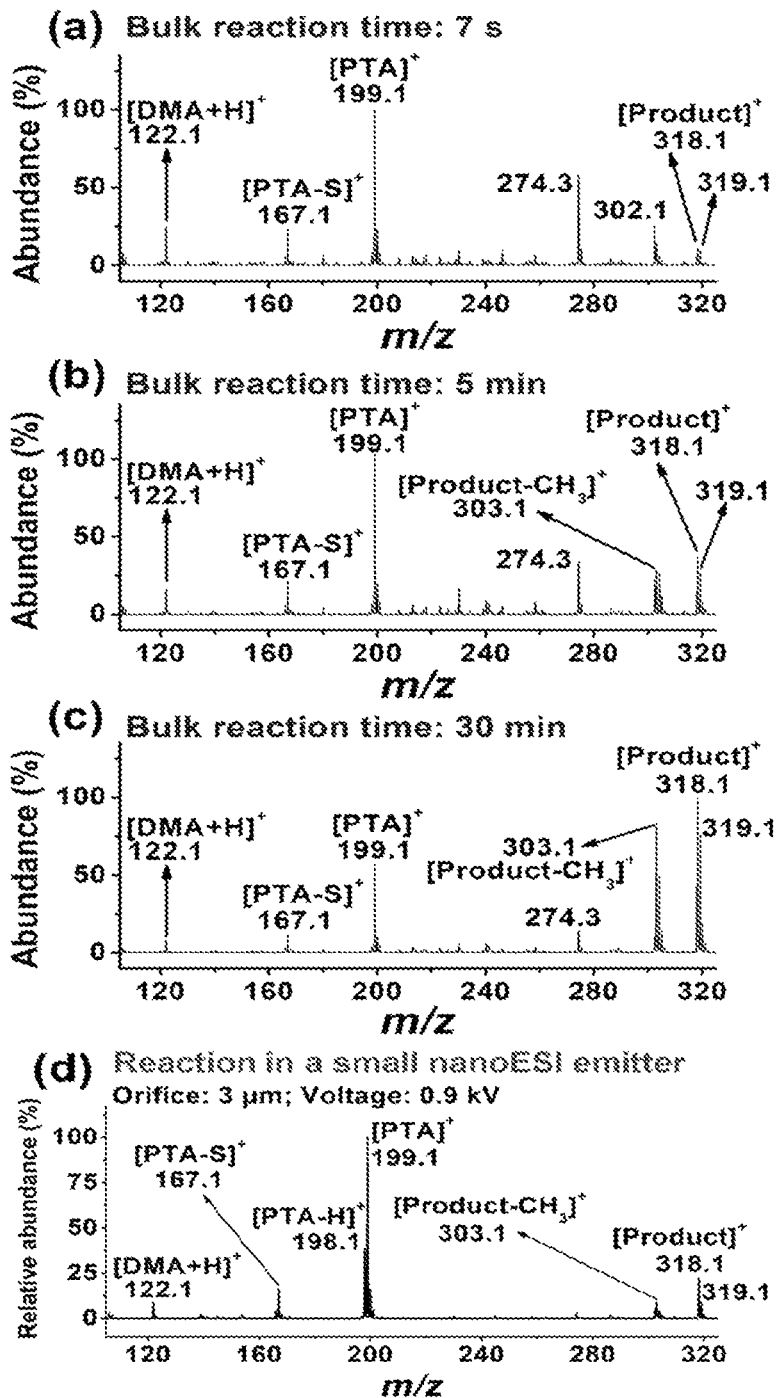
FIG. 12 shows mass spectra of the electro-oxidative coupling of PTA with DMA in the undivided electrochemical cell at the reaction time of (a) 7 sec; (b) 5 min; and (c) 30 min.

DMA (1) (400 μM), PTA (2) (100 μM), and the electrolyte lithium triflate (LiOTf) (100 μM) were dissolved in acetonitrile and water (1:1, v:v). The mixed solution was immediately loaded into the modified ESI emitter (orifice diameter of 139 μm) that was coupled with a mass spectrometer. Upon the application of a voltage of 2 kV to the ESI electrode (Pt), the large surface of meniscus was observed to be formed. A very fine spray of droplets was formed at the front of the meniscus and carried the reaction mixture to the MS inlet. The radical species of the coupling product (3) at m/z 318.1, and its in-source fragment ion at m/z 303.1 by the loss of methyl (FIG. 3a) were observed immediately. The structures were confirmed by high resolution (FIG. 9) and tandem mass spectra (FIG. 10a) in comparison with the spectra of the purified product (Example 15). The signals of reactants PTA at m/z 199.1 and DMA dimer (N,N,N',N'-tetramethylbenzidine, TMB) at m/z 240 were less than 5% of the dominant product peak (m/z 318.1) after 7 s and remains constant. Two control experiments were performed. When no voltage was applied to the electrode, and the spray was initiated by pneumatic force (sonic spray), the reactants, PTA (m/z 199.1), its in-source fragment by the loss of sulfur (m/z 167.1), and DMA (m/z 122.1) were the major signals in the mass spectrum and no products were observed (FIG. 3b). This result indicates that the C—H/N—H coupling was voltage-dependent. The corresponding bulk reaction was performed in an undivided electrochemical cell (Example 4) using the same concentrations of the reactants and electrolytes, which led to the formation of product in a much lower intensity (FIG. 3c and FIG. 12). A large amount of PTA (m/z 199.1), its in-source fragment (m/z 167.1), and DMA (m/z 122.1) remained in the solution. The apparent acceleration factor (AAF, defined as the conversion ratio of products and reactants in microdroplet reaction versus that in bulk at the same reaction time) was calculated to be 67. The above experiments demonstrate the acceleration of electro-oxidative C—H/N—H coupling in the newly developed electrochemical interfacial microreactor.

Figure 4:
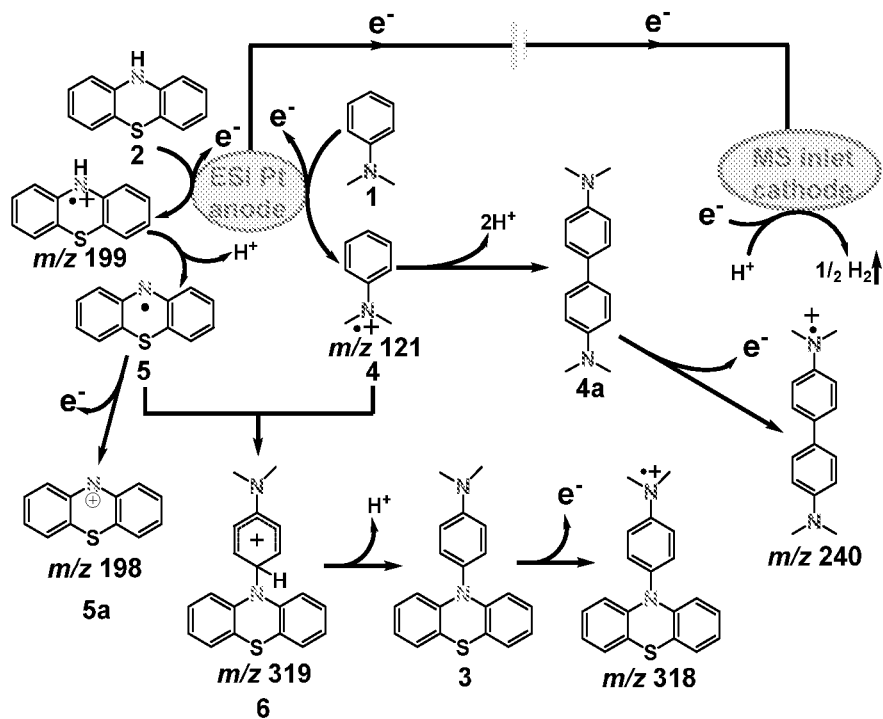
FIG. 4 shows a possible mechanism of electro-oxidative C—H/N—H coupling of DMA and PTA. The m/z of each intermediate and product observed in the mass spectra (FIG. 2) is shown under its structure.

The fact that the electrochemical interfacial microreactor is coupled with MS facilitates the study of reaction mechanisms by detecting transient intermediates. In previous work on the mechanism of electro-oxidative C—H/N—H coupling of PTA and DMA, an electron paramagnetic resonance experiment was carried out to show reactant oxidation during electrolysis, while no further evidence was provided to demonstrate the reaction pathway. In the present study, the key intermediates in accelerated electro-oxidative C—H/N—H coupling were captured by MS, and the mechanism is shown in FIG. 4. DMA (1) was first oxidized to generate a radical cation (4). Homo-coupling of radical cation (4) could lead to the formation of its dimer TMB (4a). At the same time, 2 was also oxidized to generate a nitrogen radical (5) that can further lose one electron to form a nitrogen radical cation (5a). C—N bond was formed by radical/radical cross-coupling of radical cation (4) and nitrogen radical (5). Subsequent deprotonation of intermediate (6) afforded the final amination product (3). The present results demonstrate the power of the electrochemical microreactor with the capability of reaction mechanistic study.

Encouraged by the accelerated electro-oxidative C—H/N—H coupling of DMA and PTA in the electrochemical microreactor, other applications were found, and the unique features of this microreactor were demonstrated in an on-demand chemical derivatization and in situ characterization of analytes that cannot be ionized and so cannot be studied by conventional mass spectrometry. The electrochemical reactions performed in the microreactor may be switched on/off by applying different ESI voltages.

Derivatization has been widely used in the analysis of chemicals that have no/low responses to mass analyzers due to their un-ionizable properties or low ionization efficiencies. Derivatization is commonly irreversible and it is not possible to switch between derivatized molecules and native molecules during a single analysis. The switchable feature of the present microreactor makes the derivatization "reversible," which allows the native and derivatized compounds to be observed in the same run. This might be beneficial to a mixture analysis in which some analytes need to be derivatized while others do not. The switchable feature was realized by performing accelerated and non-accelerated electrochemical reactions during different voltages.

To prove this concept, direct MS analysis of benzyl alcohol in the new electrochemical microreactor was tested.

Figure 5:
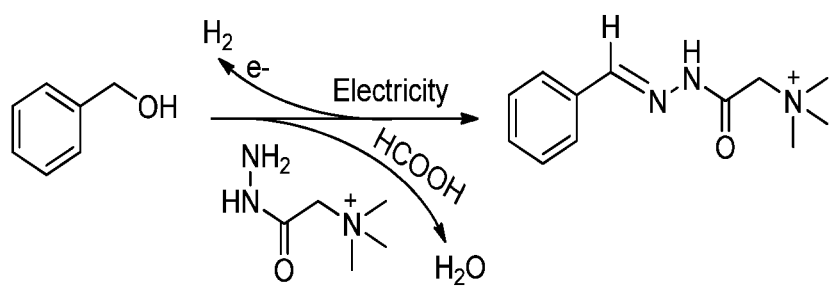
FIG. 5 shows a scheme for electrochemical derivatization of benzyl alcohol with GT reagent in an electrochemical interfacial microreactor.
Figure 6:
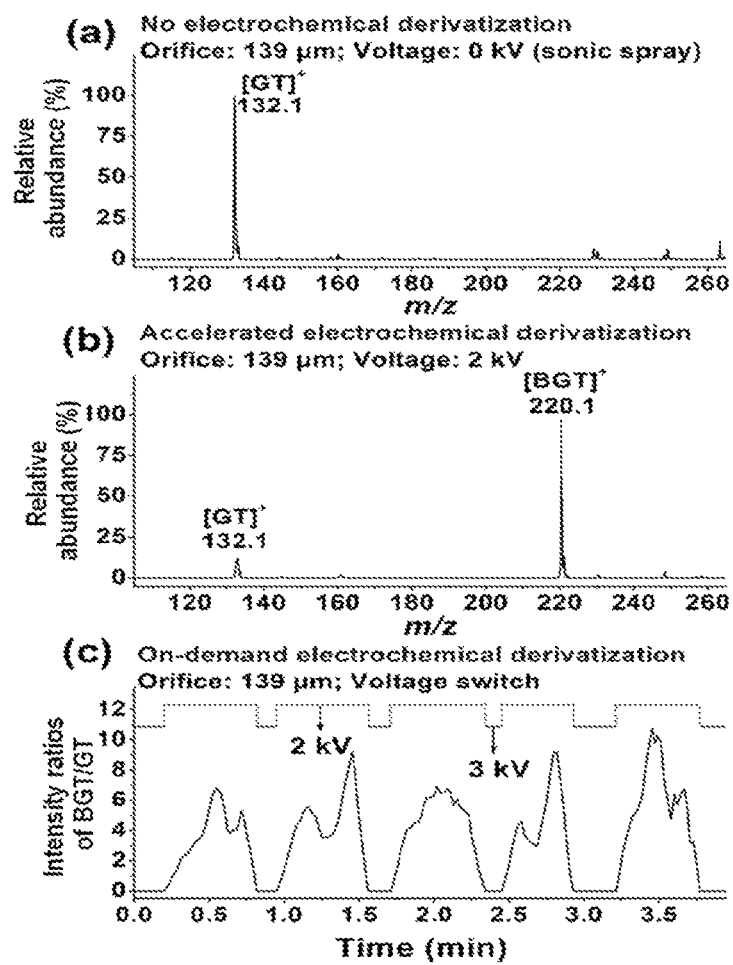
FIG. 6 shows mass spectra for a one-step electrochemical derivatization of benzyl alcohol in the presence of GT reagent (a) by sonic spray without applying voltage; and (b) in the interfacial microreactor.
Figure 13:
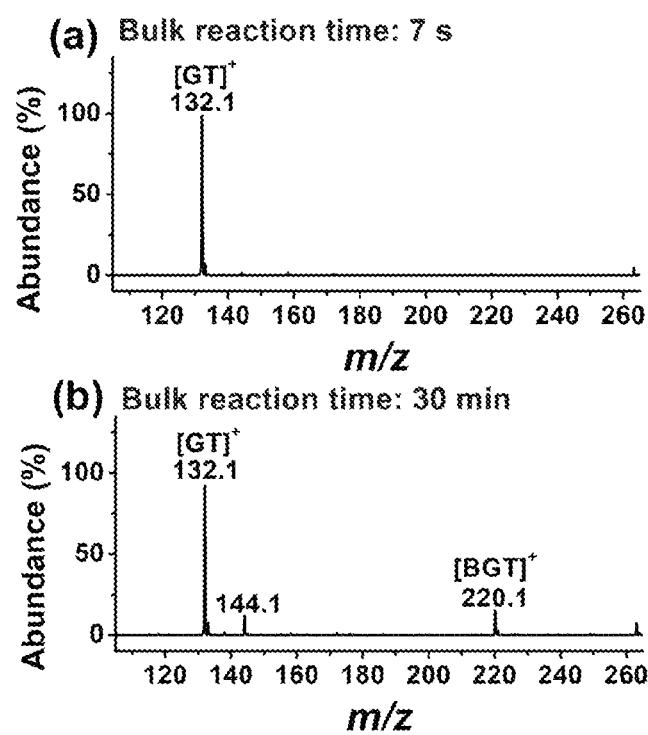
FIG. 13 shows mass spectra of the one-step electrochemical derivatization of benzyl alcohol with GT in the undivided electrochemical cell at the reaction time of (a) 7 s; and (b) 30 min. The peak at m/z 144.1 corresponds to the one-step electrochemical derivatization of methanol with GT.

Alcohols are not well-detected using standard ESI-MS. The present strategy is to enable a one-step electro-oxidation of benzyl alcohol and couple it with Girard T (GT, a quaternary ammonium hydrazine salt) for in-situ formation of the charged hydrazone (BGT) (FIG. 5). Without performing the electrochemical reaction, benzyl alcohol was not detectable by MS with or without added GT reagent (FIG. 6a). After the voltage was set to 2 kV, the derivatized benzyl alcohol in the form of the charged hydrazone (BGT) was detected immediately in the spectrum (FIG. 6b). Compared with the bulk reaction (FIG. 13), the electrochemical derivatization in the interfacial microreactor showed an apparent acceleration factor of 111. Then the switchable feature was tested by quickly changing the voltage between 2 kV (with interfacial reactor) and 3 kV (normal ESI without interfacial reactor) (FIG. 6c). The chronogram of MS intensity ratio of derivatized benzyl alcohol (BGT) to GT reagent vs. time shows that the electrochemical derivatization of benzyl alcohol was turned on at 2 kV and turned off at 3 kV. This result further confirms that electrochemical reactions may be significantly accelerated in the interfacial microreactor, and provides an example of switchable electrochemical derivatization for chemical analysis as well.

Figure 7:
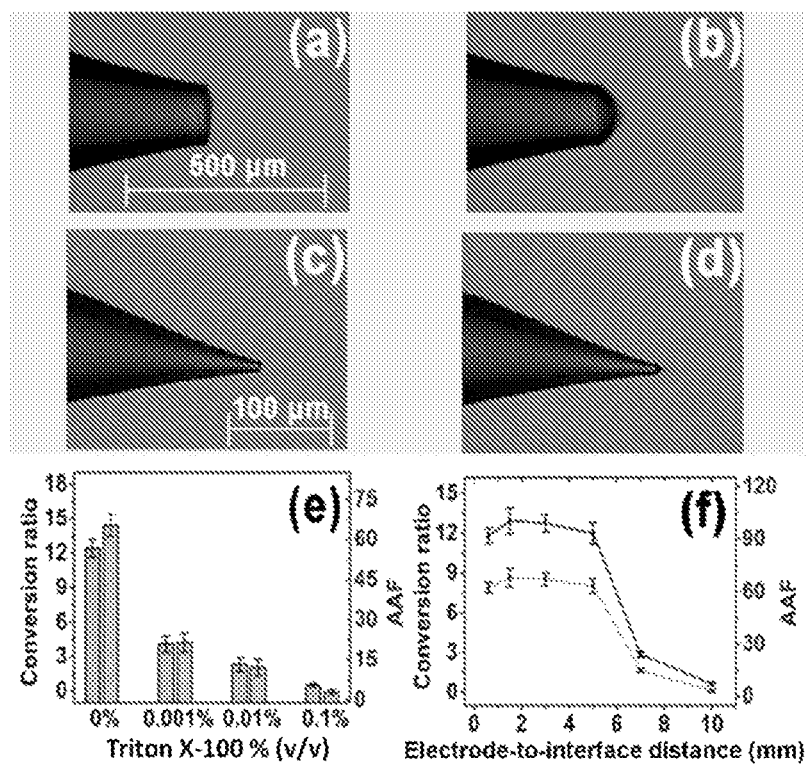
FIG. 7 shows microscopic images of the ESI tip shapes of a 139 μm-emitter (a) before spraying; (b) in the microdripping mode; the ESI tip shapes of a 3 μm-emitter (c) before spraying and (d) in the cone-jet mode; (e) effects of Triton X-100 (% represents volume of Triton X-100/volume of reaction solution) on the conversion ratios and apparent acceleration factors (AAF) of the electrochemical coupling of PTA with DMA in the interfacial microreactor; and (f) effects of the electrode-to-interface distance on the conversion ratios and AAF of the electrochemical coupling of PTA with DMA in the interfacial microreactor. The measurement of each accelerated reaction was repeated 5 times. The error bars represent the standard deviation of five measurements.
Figure 21:
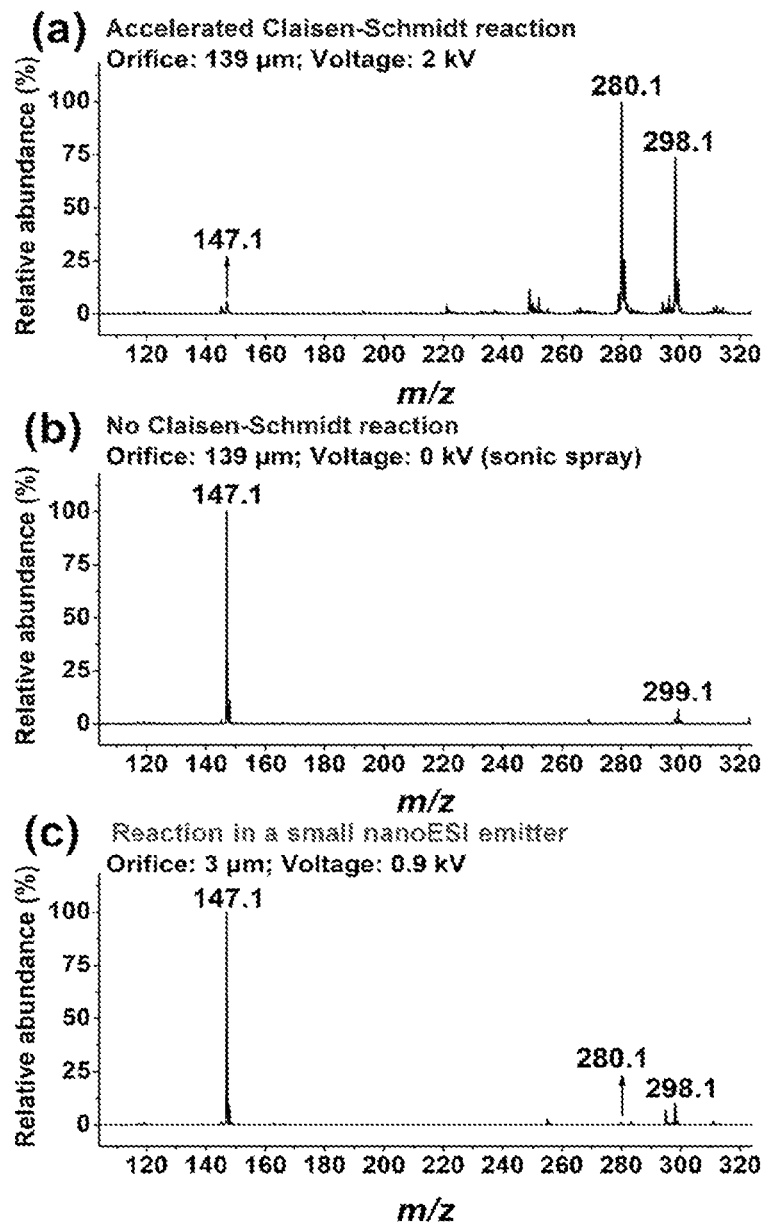
FIG. 21 shows mass spectra of the Claisen-Schmidt base-catalyzed condensation between 6-hydroxy-1-indanone and p-nitrobenzaldehyde (a) in the interfacial microreactor (a large ESI emitter with a 139 μm orifice operated at 2 kV); (b) by sonic spray; and (c) in a small ESI emitter with a 3 μm orifice operated at 0.9 kV.

To clarify the inherent mechanism for acceleration in the electrochemical interfacial microreactor, attention was paid to the geometry of the meniscus formed in the ESI process that is specific to the spraying mode, and is dependent on the voltage, flow rate, and orifice diameter. As shown by the microscopic images (FIG. 21), the electrospray from an emitter of a 139-μm orifice successively underwent the dripping, microdripping, spindle, cone jet (standard ESI mode), and multijet modes when the applied voltage was increased from 1.85 kV to 3.50 kV. It was observed that the electrochemical reactions could be accelerated most in the microdripping mode (Example 9) which maintains a large surface area (FIGS. 7a and b). In the ESI with an orifice less than 10 μm, however, the electrospray immediately responded to the cone jet without the other modes (dripping, microdripping and spindle) on gradually increasing the voltage (FIGS. 7c and 7d), which led to no obvious accelerated reactions in those ESI emitters. This indicates that the interfacial effect of the large-area meniscus in the microdripping mode of electrospray plays a key role in the accelerated electrochemical reactions. Similar results have been observed in additional reactions (Examples 6-8).

Figure 23:
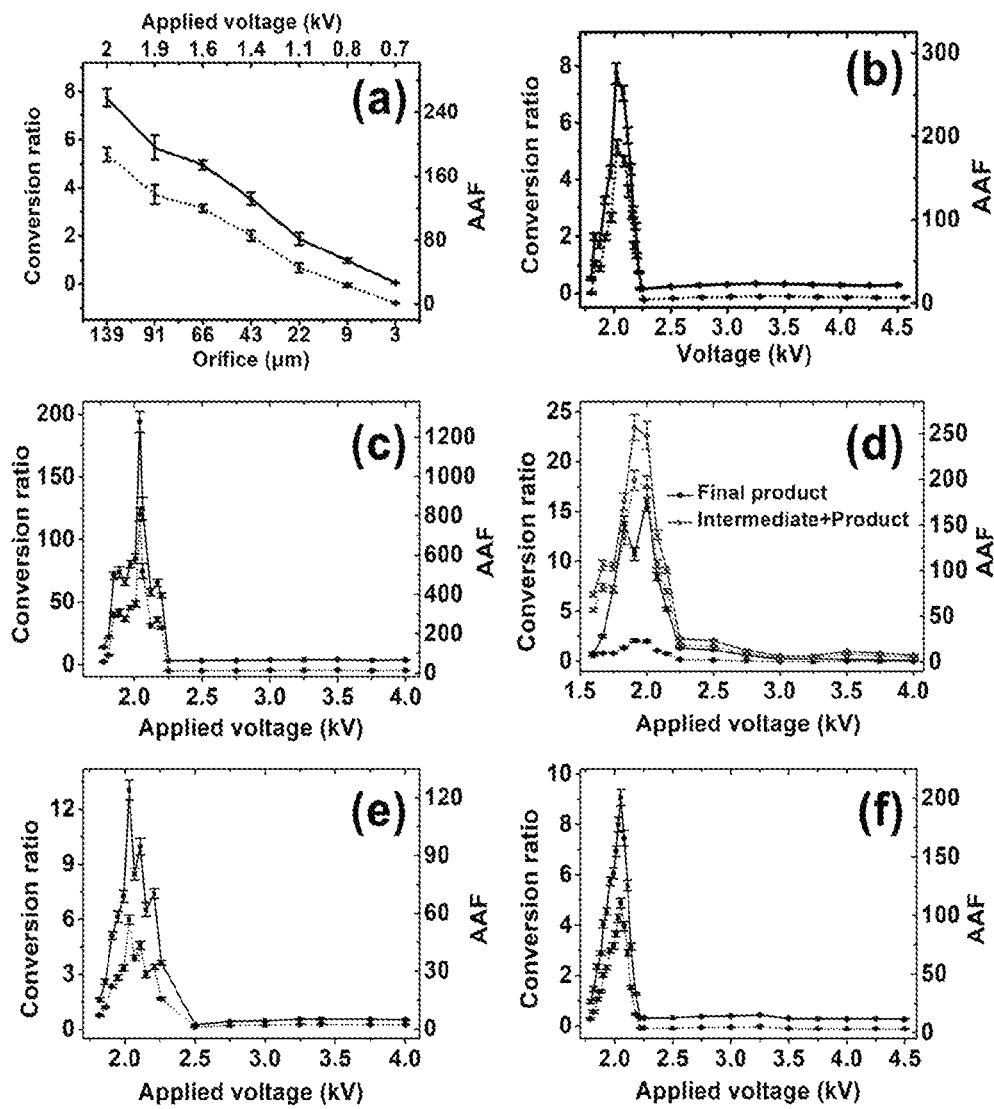
FIG. 23 shows plots of dependence of conversion ratios (solid line) and acceleration factors (dotted line) upon (a) orifice size and (b) applied voltage in the hydrazone formation; and dependence of conversion ratios (solid line) and acceleration factors (dotted line) upon applied voltage in the (c) Katritzky reaction, (d) Claisen-Schmidt condensation, (e) electro-oxidative coupling of PTA with DMA, and (f) electrochemical derivatization of benzyl alcohol with GT.

Furthermore, a neutral surfactant Triton X-100 was added to the electrochemical reaction of PTA and DMA in the interfacial microreactor. With the increased amount of Triton X-100 (from 0.001% to 0.1%, v/v), decreased conversion ratios and acceleration factors were observed (FIG. 7e), which further demonstrates the role of the interface in reaction acceleration as Triton X-100 blocks the surface and diminishes accelerated product formation (Example 13). Then the distance between the ESI emitter and the MS inlet was changed to vary the possible reaction time in the electrosprayed microdroplets. The reaction conversions of the electrochemical coupling of PTA and DMA were similar at different distances (FIG. 23), which suggests that the electrochemical reaction acceleration does not occur to a major extent in the electrosprayed microdroplets, but at the interface of the Taylor cone. In addition, it was found that the distance between the electrode and air/solution interface of the Taylor cone is very important in the electrochemical interfacial reactor. A distance of 0.6-5 mm allows the reactants at or near the interface to receive or lose electrons from/to the electrode upon the application of voltage (FIG. 7f, Example 11). The above results suggest that the electrochemical reaction is initiated at the electrode and is accelerated at the air/solution interface close to the electrode.

In short, a novel voltage-controlled interfacial microreactor that can accelerate electrochemical reactions has been demonstrated. This microreactor is formed at the solution-air interface of the Taylor cone in the ESI emitter of a 139-μm orifice. The electro-oxidative C—H/N—H coupling of DMA and PTA, and electrochemical derivatization of benzyl alcohol performed in such an electrochemical microreactor show the acceleration factors of 67 and 111 compared to the corresponding bulk reactions, respectively. The coupling of microreactors with MS allows the key radical intermediates to be captured in a mechanistic study of electro-oxidative C—H/N—H coupling of DMA and PTA. The electrochemical derivatization may be switched on and off by changing the spray voltage, which allows the collection of mass spectra before and after derivatization in a single run. The demonstrated fast electrochemical transformations, on-demand derivatization, and in situ mechanistic study make this novel interfacial microreactor widely applicable for electrochemistry related research.

On-Demand Electrochemical Epoxidation in Nano-Electrospray Ionization Mass Spectrometry to Locate Carbon-Carbon Double Bonds Double bonds exist in a wide range of biomolecules that are essential to biological processes. Atoms connected by a double bond cannot rotate freely about the bond axis. The rigid planarity imposed by double bonds has enormous significance for the shape of biological molecules including lipids and proteins. Changes in double bond positions are not signaled by difference in chemical formula, but nevertheless may be associated with dramatic changes in function. Lipids are the structural components of cell membranes and play critical roles in cellular functions, including signaling, energy storage, cell growth and survival. Unsaturated lipids contain single or multiple carbon-carbon double bonds in unbranched hydrocarbon residues that allow for multiple positional isomers with double bonds at different locations in the same or different hydrocarbon chains. These positional isomers can perform dramatically different roles in lipid metabolism and pathogenesis. For example, there is a significant correlation between double bond positional isomers and the onset/progression of breast cancer. The recognition of such correlation has attracted increased attention to lipid structural characterization in order to unveil the underlying lipid networks and disease mechanisms.

Characterization of unsaturated lipids has been the focus of extensive research and significant progress has been made over the past few decades, especially with advances in mass spectrometry (MS). These advances include novel gas-phase fragmentation methods, such as charge remote fragmentation, ozone-induced dissociation, radical directed dissociation, ultraviolet photodissociation, and selective double bond derivatization methods prior to MS analysis, such as ozonolysis, methoxylation, methylthiolation, olefin cross-metathesis, Paternò-Büchi reaction, as well as plasma induced and offline meta-chloroperoxybenzoic acid (m-CPBA) epoxidation. Although these strategies have been successfully employed in some biological samples, the requirements for particular MS instruments, extra apparatus for derivatization, or large sample consumption limit their readily accessible applications.

Electrospray ionization (ESI) MS coupled with tandem MS (MS/MS) has been used in the analysis of a broad range of biomolecules. NanoESI is a variant of ESI with a solution flow rate of nanoliter/min Due to its low sample consumption, it is favored for biological sample analysis. Although (nano)ESI-MS/MS is powerful in lipid structural analysis, it alone could not determine double bond positions in lipids prior to the present work. Methods in accordance with the present teachings incorporate double bond recognition into the nanoESI process and develop a novel method with the features of (i) fast and in-situ derivatization and characterization of double bonds, that (ii) requires a small amount of sample, (iii) needs no extra apparatus or special instrumentation, and (iv) may be implemented on unmodified commercial mass spectrometers.

The unique role of ESI as a two-electrode electrochemical cell was recognized almost as early as ESI was first developed. Under commonly used operating conditions, electrochemical phenomena rarely have much effect on the identity or relative abundances of the ions in an ESI mass spectrum. The inherent electrochemistry in an ESI source occurs at the interface between the sample solution and spray electrode, and it may be either an oxidation or a reduction reaction. Solvent molecules are usually those involved in the electrochemical reactions. The electrolysis inherent in ESI may be utilized for analytical applications. Electron-rich compounds with highly conjugated double bonds (e.g., porphyrin) or electron-donating groups (e.g., hydroxyl groups) may be oxidized, and electron-deficient species with electron-withdrawing groups (e.g., cyano, nitro and fluorine substituents) may be reduced. For example, the disulfide bond is formed during the ESI analysis of cysteine. Neutral ferrocene, an electrochemical tag, was used in protein analysis by forming the charged ferrocenium ion in positive ESI. Compared to those compounds, lipids are not electrochemically active in ESI and thus currently there is no electrochemical tag for lipid analysis.

In accordance with the present teachings, a novel electrochemical strategy for characterizing double bond positions in unsaturated lipids is provided. The lipid double bonds may be electro-epoxidized in the presence of hydrochloric acid and acetonitrile-water solvent system in a nanoESI emitter with a large orifice (FIG. 32, the effect of orifice size will be described below), which serves as an electrochemical cell. While neither desiring to be bound by any particular theory nor intending to limit in any measure the scope of the appended claims or their equivalents, it is presently believed that that the addition of chloride in an acidic environment might introduce a superior oxidative pathway by in-situ formation of hypochlorite and conversion of double bonds to the corresponding epoxides (see Example 6 for electro-epoxidation reagent study). The voltage applied to the nanoESI working electrode plays two roles: (i) it initiates electrospray; and (ii) it initiates/terminates electro-epoxidation of lipid double bonds. Interestingly, the epoxidation of lipid double bonds may be well controlled by tuning the applied voltage while maintaining the electrospray plume. As a result, the lipid epoxidation may be switched off by applying a voltage of 2.5 kV and, counter-intuitively, switched on by reducing the voltage to 1.8 kV (FIG. 32). In other words, within one experimental run, the ESI mass spectra of lipids before and after epoxidation may be collected. This greatly facilitates the immediate recognition of double bond presence in a time- and sample-efficient way. The ionized epoxidation products show a mass shift of +16 Da and may be fragmented by tandem MS, specifically by low energy collision-induced dissociation (CID). This reveals the positions of the original double bonds by generating two diagnostic ions arising from cleavages at these positions (FIG. 32). The whole process may be completed within several seconds, holding great potential for high-throughput lipid analysis. It is believed that this is the first use of in-situ electrochemical reactions for lipid derivatization and characterization.

Figure 33:
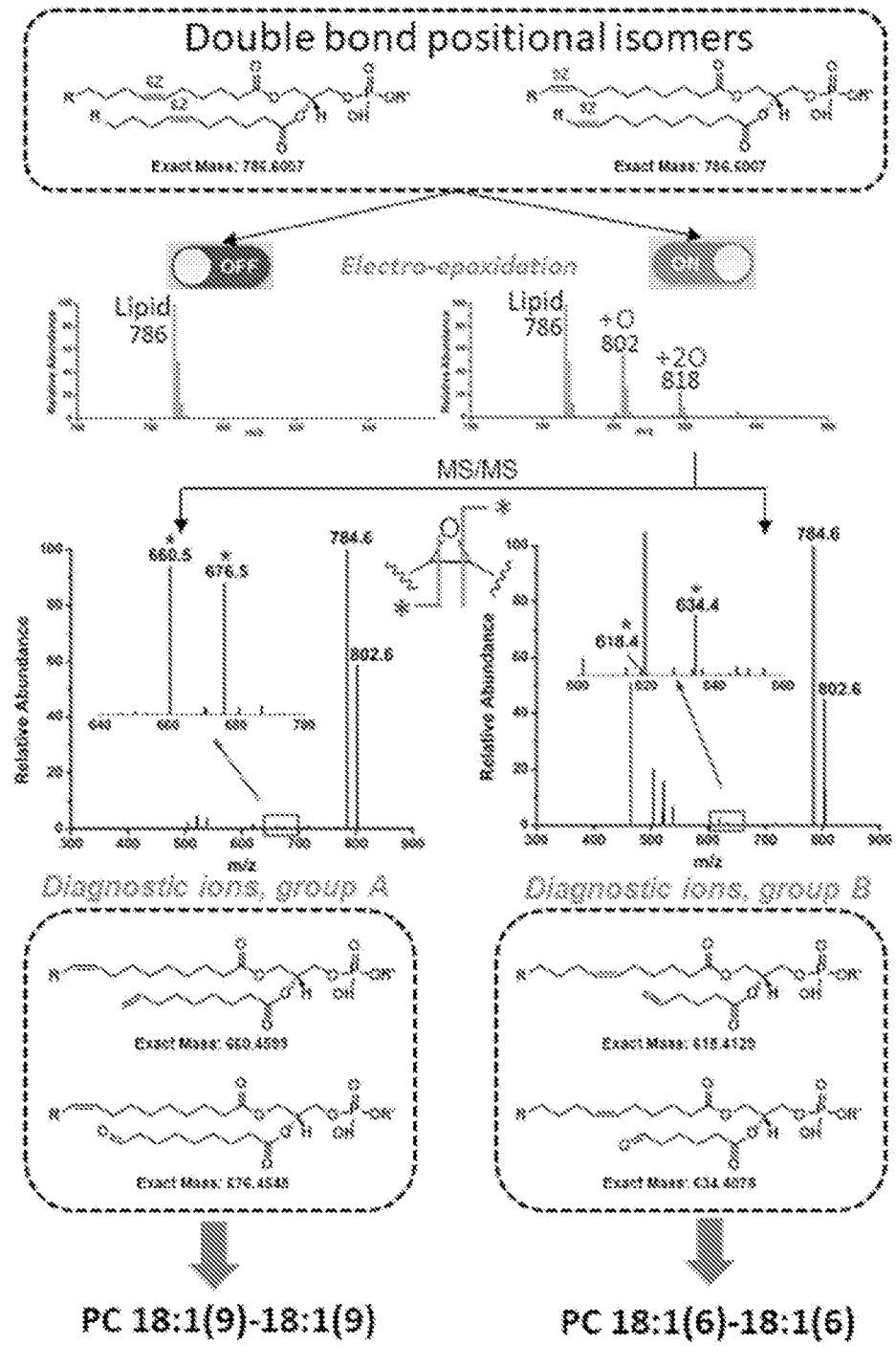
FIG. 33 shows full mass spectra before and after epoxidation of PC 18:1(9)-18:1(9) and PC 18:1(6)-18:1(6) and tandem mass spectra of their mono-epoxidized products collected at positive ion mode. The stars indicate the diagnostic fragments specific to the double bond positions in the lipids. R=C$_8$H$_{17}$, R'=CH$_2$CH$_2$N(CH$_3$)$_3$$^+$.
Figure 45:
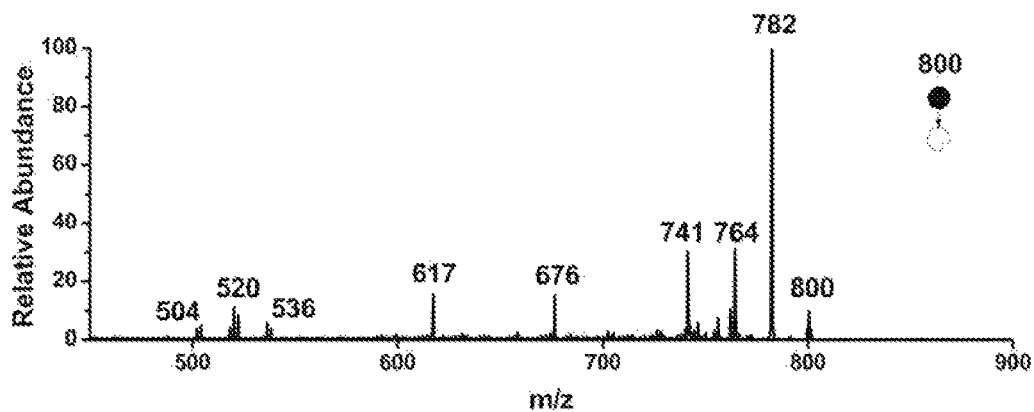
FIG. 45 shows a MS/MS spectrum of PC 18:1 (9)-18:1 (9)+14 Da species at m/z 800.
Figure 46:
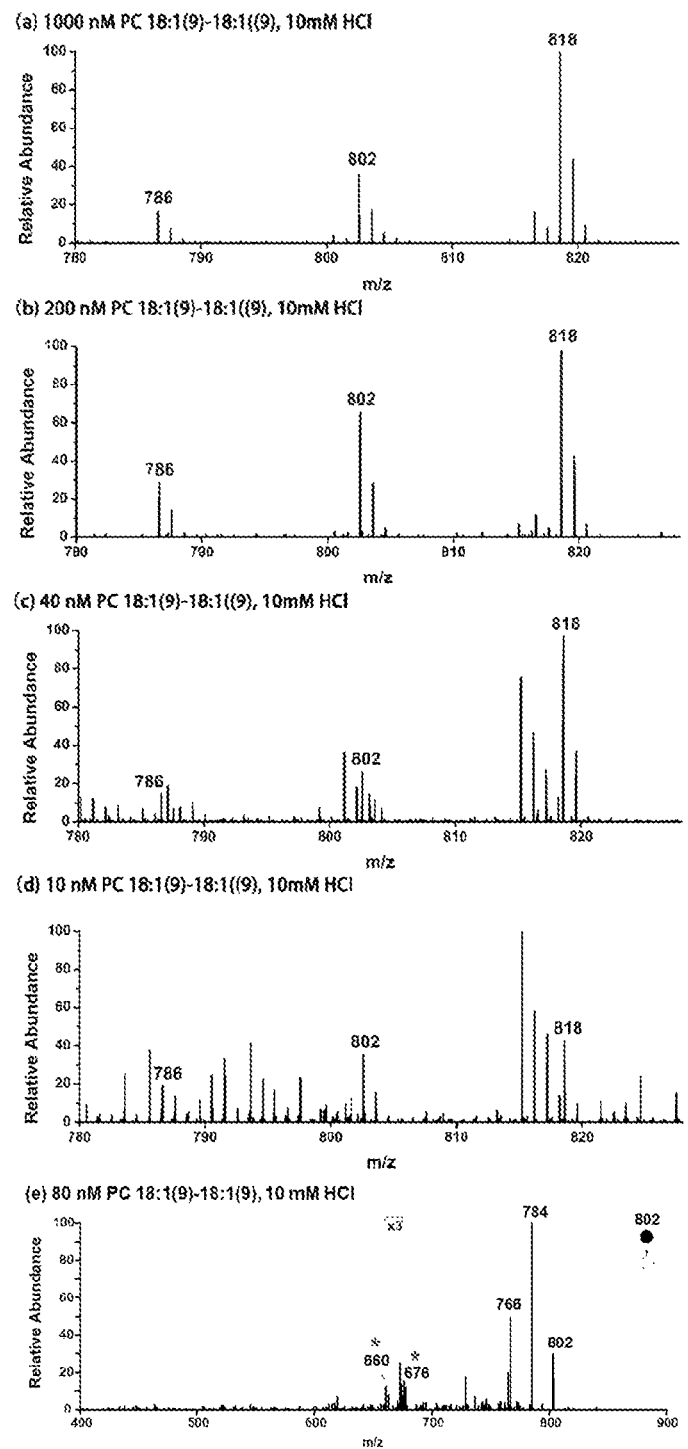
FIG. 46 shows mass spectra of (a) 1 µM; (b) 200 nM; (c) 40 nM; and (d) 10 nM PC 18:1(9)-18:1(9) after electro-epoxidation.
Figure 47:
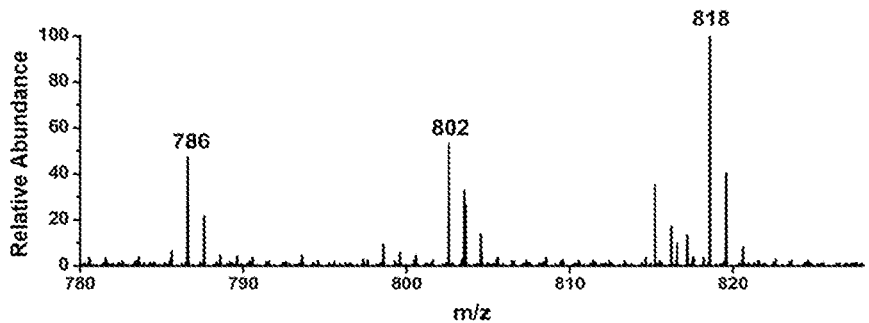
FIG. 47 shows (a) the mass spectrum of 10 nM PC 18:1(6)-18:1(6) after electro-epoxidation; and (b) the MS/MS spectrum of 80 nM PC 18:1(6)-18:1(6) with 10 mM HCl.
Figure 47:
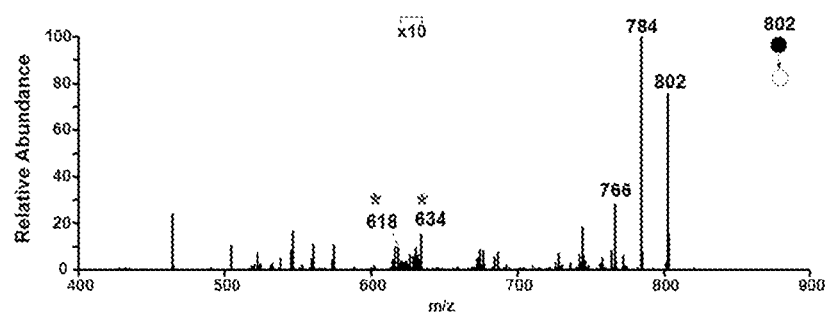

This strategy is illustrated by using a pair of lipid isomers of phosphatidylcholine (PC) with two double bonds at different positions (FIG. 33). PC 18:1 (6)-18:1 (6) and PC 18:1 (9)-18:1 (9) were separately dissolved in a mixed solvent of acetonitrile (ACN) and water (80/20, v/v, trace chloroform) to achieve concentrations of 20 µM with 10 mM hydrochloric acid (HCl, see Example 6 for HCl concentration optimization). The prepared solutions (10 µL) were loaded into individual nanoESI emitters with 75 µm orifices that were placed 8 mm away from the inlet of a high-resolution mass spectrometer (Thermo LTQ Orbitrap Velos Pro). Upon the application of a 3.0 kV DC voltage, the protonated lipids ($[M+H]^+$) at m/z 786.6011 were observed in both mass spectra (FIG. 33). When the voltage was switched to 1.8 kV, new species at m/z 802.5996 and 818.5936 were found, with abundances of 60% and 30% relative to the protonated lipid signal. The accurate mass increases of 15.9938 Da and 31.9878 Da correspond to the addition of one and two oxygen atoms to the lipids, which suggests the formation of mono-epoxidized and di-epoxidized products of PC 18:1 (6)-18:1 (6) and PC 18:1 (9)-18:1 (9). The mono-epoxides were mass-selected and fragmented by CID. The result shows the cleavage of the three-membered epoxide ring at both sides of the C—O bond, generating diagnostic ions with a 15.9954 Da mass difference that pinpoint the two cleavage sites. The presence of diagnostic ions having m/z 618.4158 and 634.4122 establishes the identity PC 18:1 (6)-18:1 (6), while the ions at m/z 660.4618 and 676.4572 confirm PC 18:1 (9)-18:1 (9) (FIG. 33). The remaining fragment ions of these mono-epoxides at m/z 784.5892, 619.5329, 538.3532, 522.3411, 520.3411 and 504.3463, correspond to specific losses of water, headgroup and acyl chain. Furthermore, a mixture of PC 18:1 (6)-18:1 (6) (20 µM) and PC 18:1 (9)-18:1 (9) (20 µM) was also analyzed. The results (FIG. 48) reveal that two groups of diagnostic ions could be detected at the same time without interference. Additionally, good linearity ($R^2=0.9968$) was obtained when the ion intensity ratios of each group of diagnostic ions were plotted against the concentration ratios (FIG. 49), and the electro-epoxidation efficiency is independent of the lipid concentrations when the voltage is fixed (FIG. 47). The detection limit of this method was evaluated using PC 18:1(9)-18:1(9) and PC 18:1(6)-18:1(6). The electro-epoxidation products could be observed with acceptable signal/noise at 10 nM, while the diagnostic fragment ions could be clearly seen at 80 nM (FIGS. 45 and 46).

Figure 34:
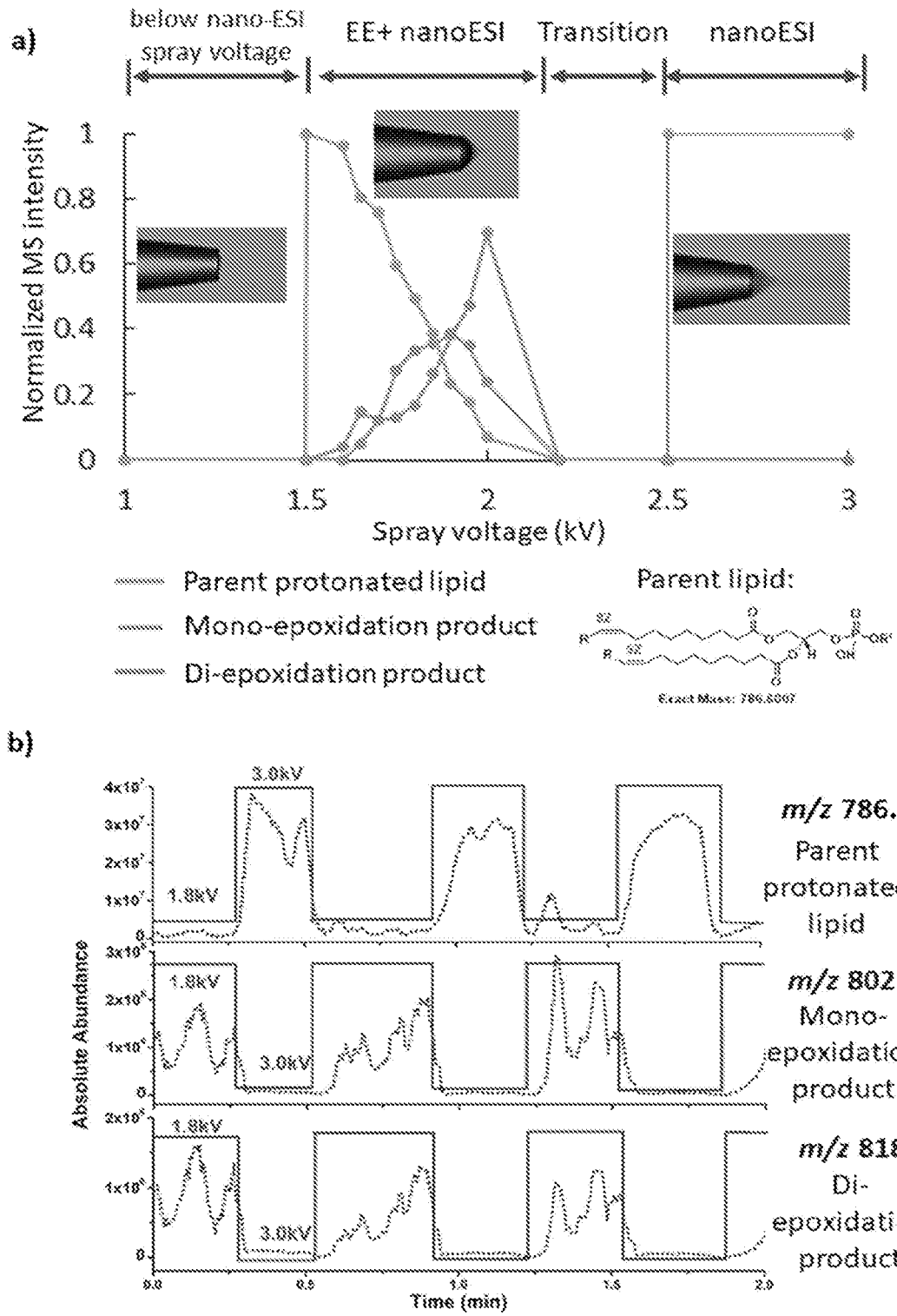
FIG. 34 shows (a) plots of effect of applied spray voltage on the behaviors of electrosprays (insets), and normalized MS intensities of parent protonated lipid, mono-epoxidized lipid, and di-epoxidized lipid at different voltages (EE: electro-epoxidation); and (b) chronograms of the parent lipid and its epoxidized products at different voltages indicating that epoxidation is switched on rapidly at applied spray voltage of 1.8 kV and terminated upon raising this to 3.0 kV.
Figure 42:
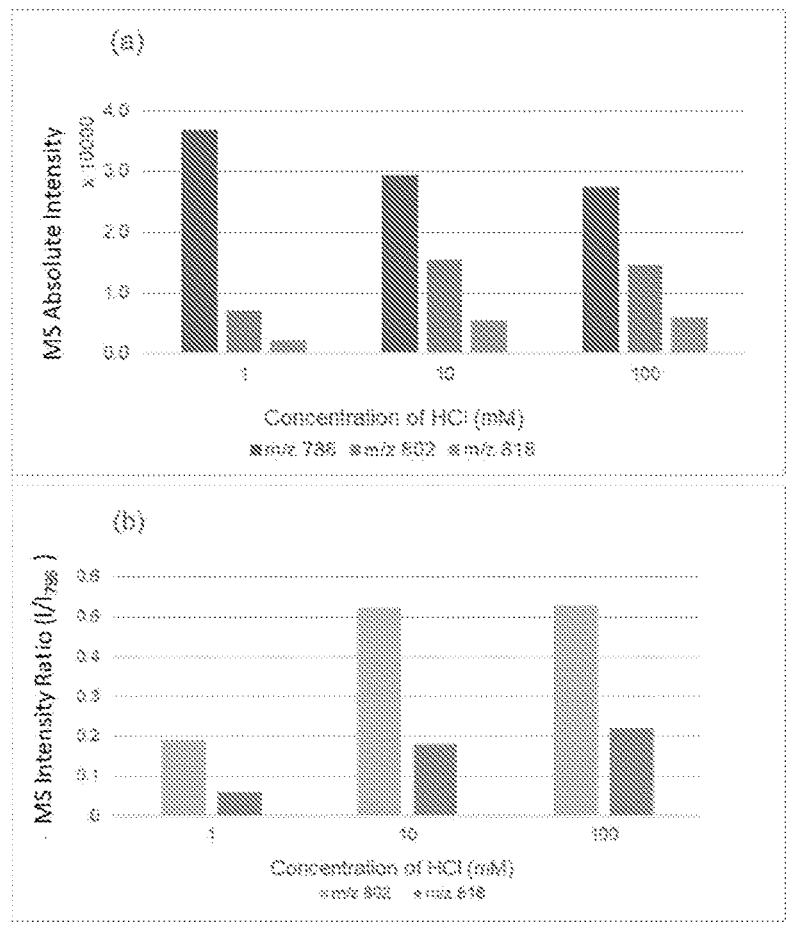
FIG. 42 shows (a) the MS absolute intensities of protonated PC 18:1(9)-18:1(9) at m/z 786, mono-epoxidized PC 18:1(9)-18:1(9) at m/z 802, di-epoxidized PC 18:1(9)-18:1 (9) at m/z 818 with HCl at different concentrations (1, 10 and 100 mM); and (b) the MS intensity ratios of epoxidation products (mono-epoxide at m/z 802, and di-epoxide at m/z 818) to PC 18:1(9)-18:1(9) at m/z 786 with HCl at different concentrations (1, 10 and 100 mM).

The applied spray voltage plays an important role in the onset of electro-epoxidation of lipids as well as in the formation of the electrospray plume (FIG. 34). It is worth noting that switchable electro-epoxidation process can only work in nanoESI emitters with large orifices (75 µm), while it produces only protonated lipids in the regular nanoESI device with orifices smaller than 20 µm, no matter how the spray voltage is changed. In order to investigate the underlying reason, the behaviors of such electrosprays generated with various voltages were monitored using a microscopy camera. Upon the application of voltages higher than +1.5 kV, ions of the same polarity are enriched at the surface of the liquid moving into the Taylor cone that is seen to be formed. When the build-up of these ions reaches the point that Coulombic forces are sufficient to overcome the surface tension of the liquid (the threshold voltage here is 2.2 kV), the slightly rounded cone inverts and emits a jet of liquid (FIG. 34a). The corresponding mass spectrum shows protonated lipids without epoxidation products (FIG. 33). The larger orifice provides a metastable state in which the plume is a large rounded Taylor cone (voltage between 1.5-2.0 kV), where coulombic forces are close to but not sufficient to overcome the surface tension, while a tiny thread of charged droplets is ejected from the cone and generates MS signals of protonated lipids and also of their epoxidation products (FIG. 42 and FIG. 34). While neither desiring to be bound by any particular theory nor intending to limit in any measure the scope of the appended claims or their equivalents, it is presently believed that the large rounded Taylor cone allows time for the electro-epoxidation to occur. Another benefit from this mode is that the spray flow rate is very low, which results in a low sample consumption. For example, a sample of 10 µL may be continuously sprayed in this mode for more than 1.5 hours. Between the voltage of 2.2 kV and 2.5 kV, the MS signal is not stable due to the transition between states. Moreover, it was found that the epoxidation efficiency may be tuned by changing the voltage within the range of 1.5 kV~2.0 kV (e.g., for those lipids with multiple double bonds), and complete epoxidation may be achieved and the corresponding epoxidation product may be made the dominant electrochemical product by increasing the voltage (FIG. 34a and FIG. 42). Additionally, the presence of byproduct peaks at m/z 800 and 816 (+14 Da and +O+14 Da) in relatively low intensities (2-10%) accompanying the formation of lipid epoxides was observed (see FIG. 42 for details). Unlike other epoxidation methods such as those driven by plasma or m-CPBA reagent that require a certain reaction time and need to be performed off-line, the electro-epoxidation of lipids may be switched on and off simply by changing the voltage, where the lipid solution in the nanoESI emitter was intact and reused for other aims. The ion chronograms of parent lipid, mono-epoxide and di-epoxide are shown in FIG. 34b, where the onset of electro-epoxidation is seen to respond rapidly to the voltage change and could be repeated multiple times.

Figure 35:
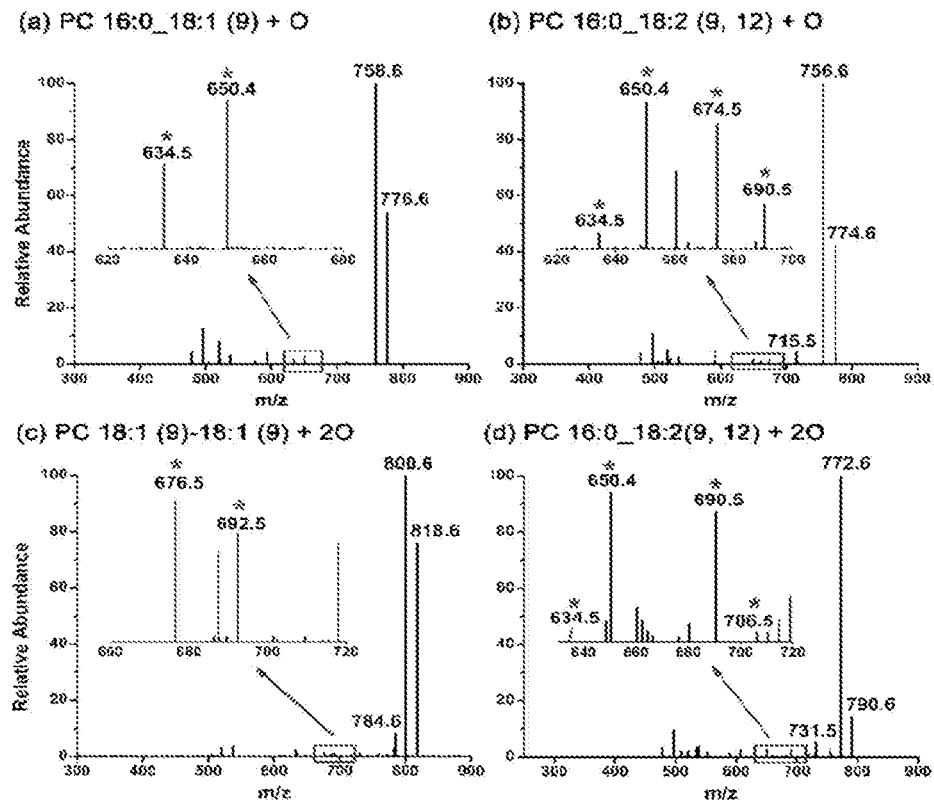
FIG. 35 shows tandem mass spectra of the epoxidation product of (a) PC 16:0_18:1 (9); (b) PC 16:0_18:2 (9,12); (c) PC 18:1(9)-18:1 (9); and (d) PC 16:0_18:2 (9,12). The stars indicate the diagnostic fragments specific to the double bond positions in the lipids.

In PC 18:1 (6)-18:1 (6) and PC 18:1 (9)-18:1 (9), each lipid has two double bonds in different acyl chains, which happens often in complex biological samples. The method shown in FIG. 33 used mono-epoxidation products to identify the positions of two double bonds. This was based on the fact that electro-epoxidation of double bonds is not selective and can provide positional information on all double bonds in a lipid. Evidence for this is the identification of PC 16:0-18:1 (9) and PC 16:0-18:2 (9,12), with one double bond vs. two double bonds in the same acyl chain. As indicated in FIGS. 35a and 35b, the mono-epoxides were selected for fragmentation in both lipids. In PC 16:0-18:1 (9), the diagnostic ions at m/z 650.4461 and 634.4512 were observed, while another group of diagnostic ions at m/z 674.4827 and 690.4771 was found in PC 16:0-18:2 (9,12). The intensities of the two groups of diagnostic ions were comparable to each other, suggesting that the two double bonds have equal reactivities.

Moreover, complete epoxidation can also be used to identify double bond positions. As indicated above, those lipids with multiple double bonds may be tuned to yield completely epoxidized products by changing the spray voltage (FIG. 42). FIGS. 35c and 35d provide the tandem mass spectra of di-epoxidized lipids PC 18:1 (9)-18:1 (9) and PC 18:0-18:2 (9, 12). In general, the cleavage of complete epoxidation product follows the same fragmentation rule as that in mono-epoxidized products. Thus, the additional 15.9949 Da is added to each diagnostic ion of the mono-epoxide, owing to the addition of an oxygen atom at the non-cleaved double bond. The CID fragmentation of completely epoxidized PC 18:1(9)-18:1(9) (m/z 818.5938) generated diagnostic ions at m/z 676.4536 and 692.4487. PC 18:0-18:2 (9, 12) (m/z 790.5676) yielded the fragment ions at m/z 634.4506 & 650.4460 and m/z 690.4778 & 706.2183 (FIGS. 35c and 35d). It is worth noting that in order to achieve high yield of complete epoxidation, relatively high voltages (e.g. 2 kV) are required and this can cause side reactions (such as +14 Da species) in full MS spectra.

Figure 50:
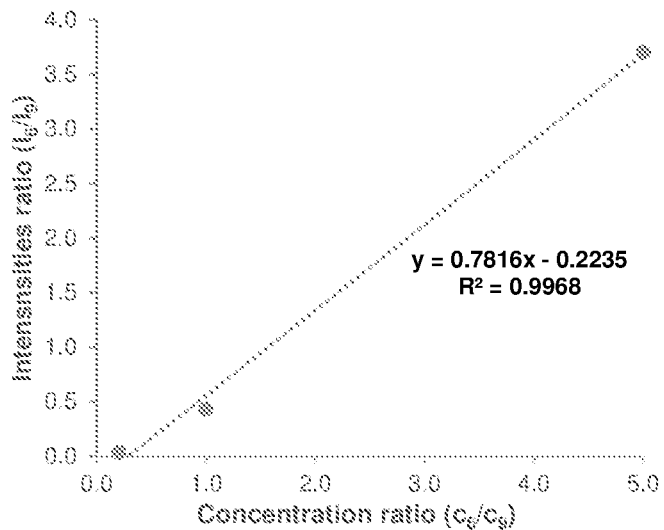
FIG. 50 shows a plot of the linear relationship between the total diagnostic ion intensity ratio ($I_6/I_9$) and the concentration ratio ($c_6/c_9$) of PC 18:1(6)-18:1(6) and PC 18:1(9)-18: 1(9) isomers.
Figure 51:
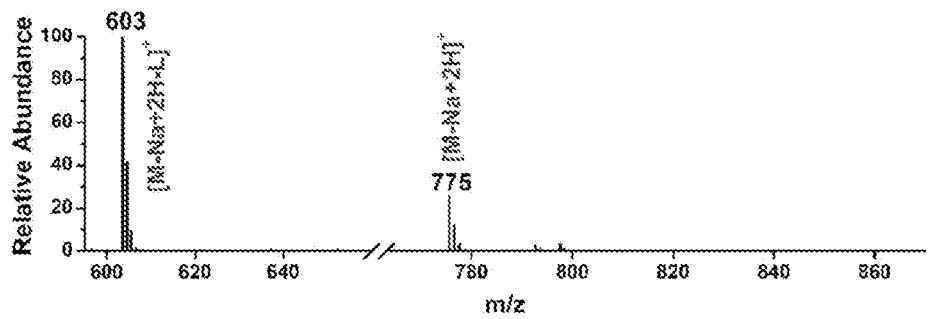
FIG. 51 shows (a) the mass spectrum of PG 18:1 (9)-18:1(9) (sodium salt) collected at the spray voltage of 3.0 kV without epoxidation; and (b) the mass spectrum of electro-epoxidized PG 18:1 (9)-18:1(9) (sodium salt) obtained at the spray voltage of 1.75 kV.
Figure 51:
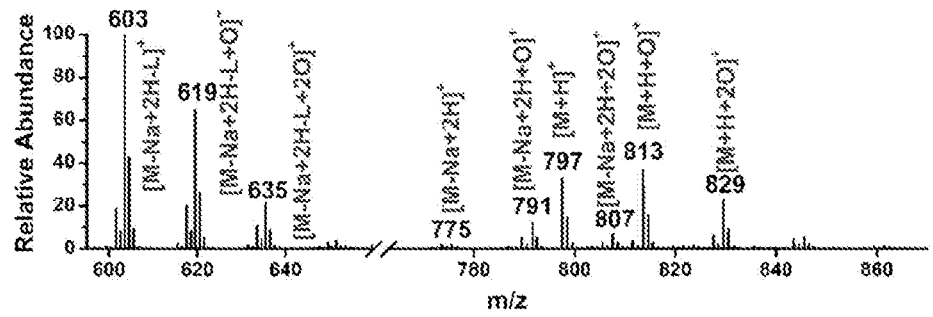
Figure 52:
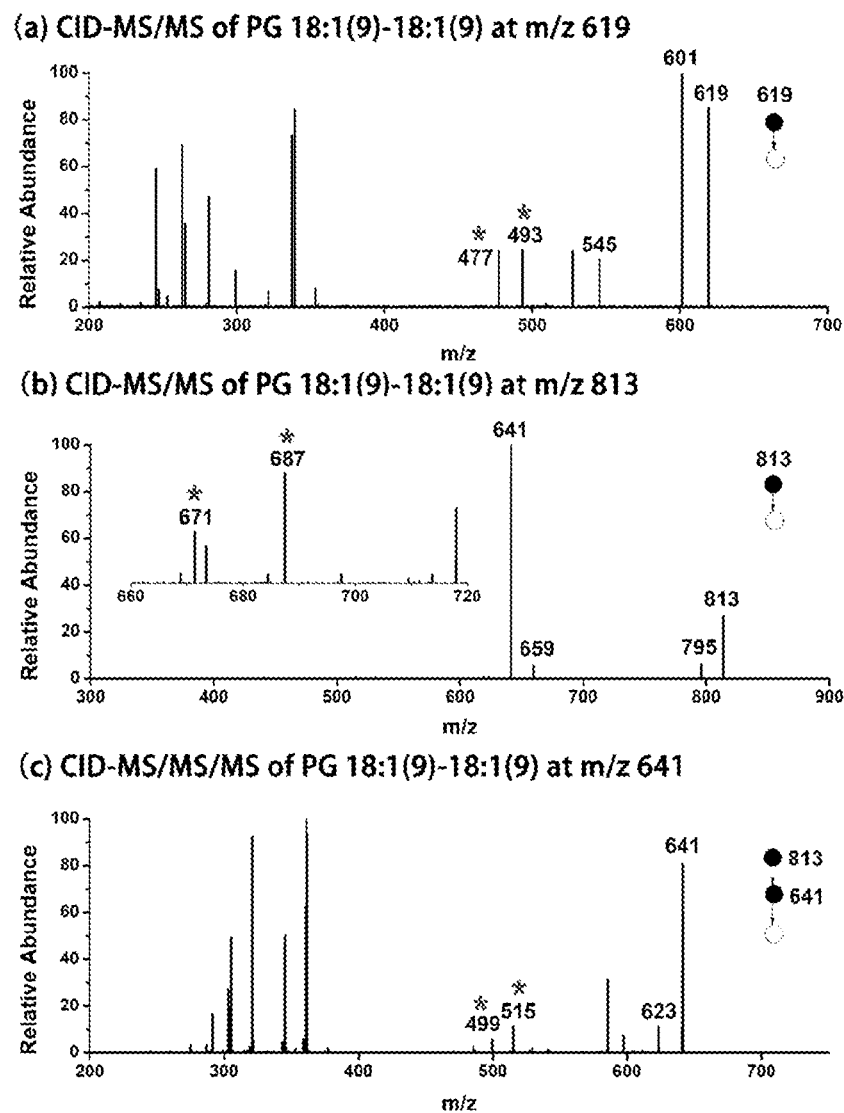
FIG. 52 shows (a) the MS/MS spectra of the mono-epoxidized products of PG 18:1 (9)-18:1 (9) (sodium salt). Precursor ion at m/z 619, the in-source dissociation product ion from the protonated mono-epoxidized PG 18:1 (9)-18:1 (9) [M−Na+2H+O]$^+$ at m/z 791; (b) precursor ion at m/z 813, the protonated mono-epoxidized PG 18:1 (9)-18:1 (9) ([M+H+O]$^+$); (c) MS/MS/MS spectrum of ions at m/z 641 generated by the headgroup loss from CID fragmentation of ions [M+H+O]$^+$ at m/z 813. The stars indicate the diagnostic ions.
Figure 53:
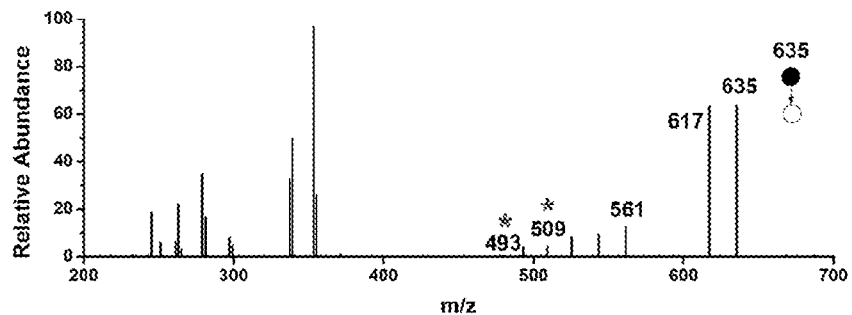
FIG. 53 shows (a) the MS/MS spectrum of the di-epoxidized products of PG 18:1 (9)-18:1 (9) (sodium salt). Precursor ion at m/z 635, the in-source dissociation product ion from protonated di-epoxidized PG 18:1 (9)-18:1 (9) [M−Na+2H+2O]$^+$ at m/z 807; (b) precursor ion at m/z 829, the protonated di-epoxidized PG 18:1 (9)-18:1 (9) ([M+H+ 2O]$^+$); (c) MS/MS/MS spectrum of ions at m/z 657 generated by the headgroup loss from CID fragmentation of ions [M+H+2O]$^+$ at m/z 829. The stars indicate the diagnostic ions.
Figure 53:
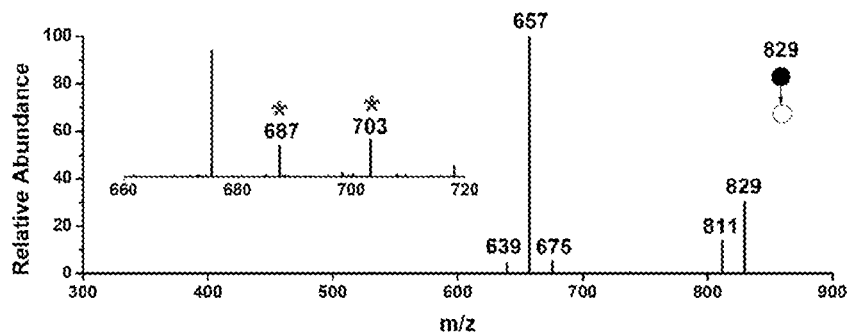
Figure 53:
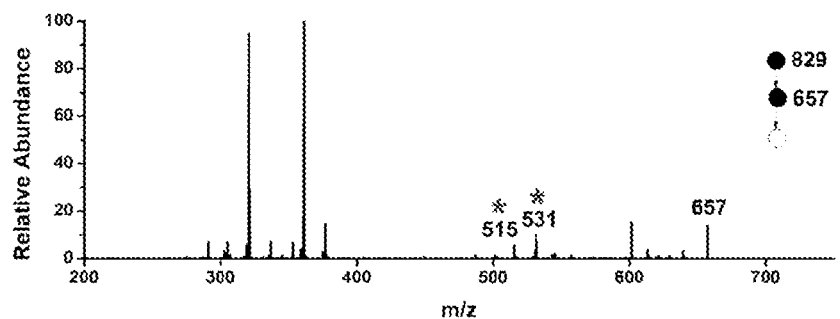
Figure 54:
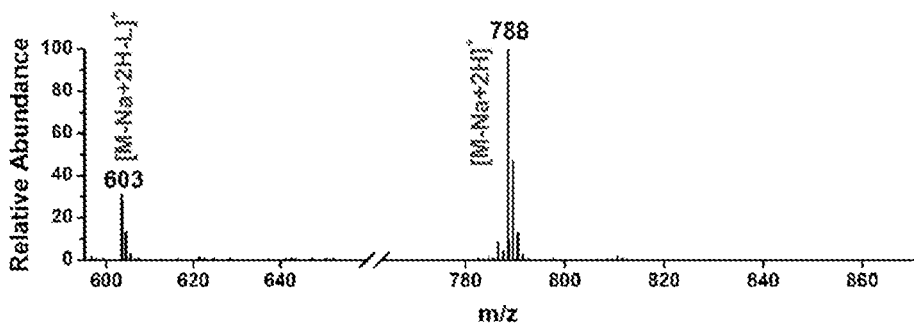
FIG. 54 shows (a) the mass spectrum of PS 18:1 (9)-18: 1(9) (sodium salt) collected at the spray voltage of 3.0 kV without epoxidation; and (b) the mass spectrum of electro-epoxidized PS 18:1 (9)-18:1(9) (sodium salt) at the spray voltage of 1.75 kV.
Figure 54:
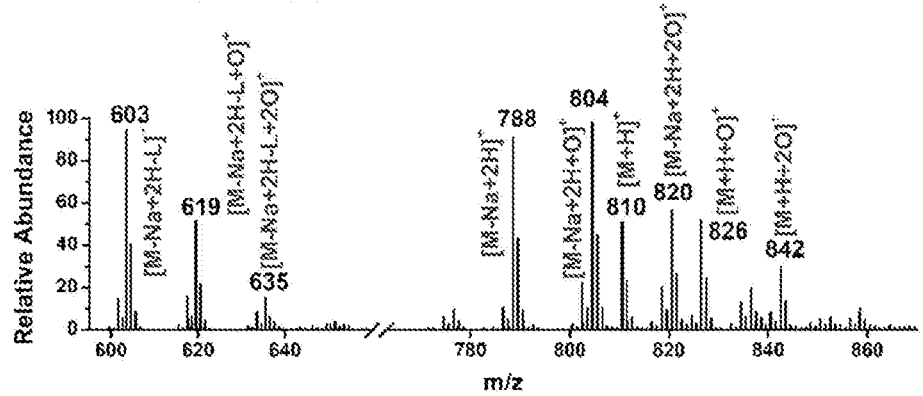
Figure 55:
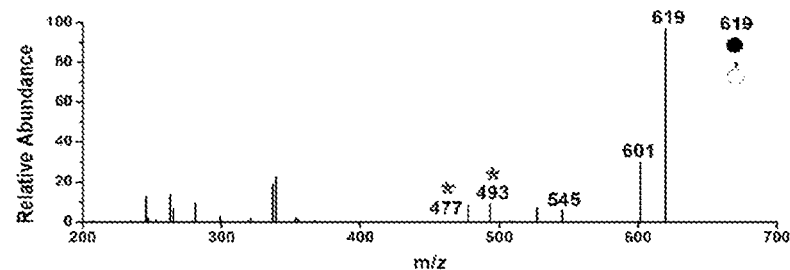
FIG. 55 shows (a) the MS/MS spectrum of the mono-epoxidized products of PS 18:1 (9)-18:1 (9) (sodium salt). Precursor ion at m/z 619, the in-source dissociation product ion from the protonated mono-epoxidized PS 18:1 (9)-18:1 (9) [M−Na+2H+O]$^+$ at m/z 804; (b) precursor ion at m/z 804, the protonated mono-epoxidized PS 18:1 (9)-18:1 (9) [M−Na+2H+O]$^+$; (c) MS/MS/MS spectrum of ions at m/z 619 generated by the headgroup loss from CID fragmentation of ion [M−Na+2H+O]$^+$ at m/z 804; (d) MS/MS spectrum of ions at m/z 826, the protonated mono-epoxidized PS 18:1 (9)-18:1 (9) ([M+H+O]$^+$); (e) MS/MS/MS spectrum of ions at m/z 641 generated by the headgroup loss from CID fragmentation of ions [M+H+O]$^+$ at m/z 826. The stars indicate the diagnostic ions.
Figure 55:
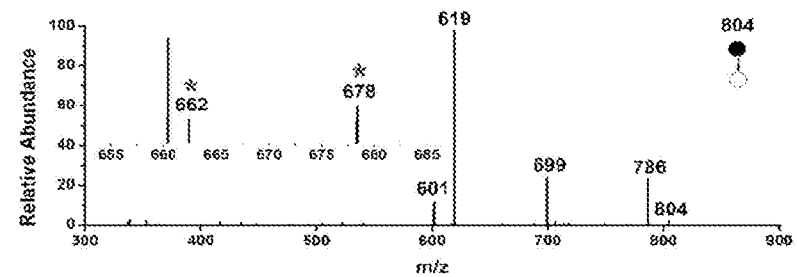
Figure 55:
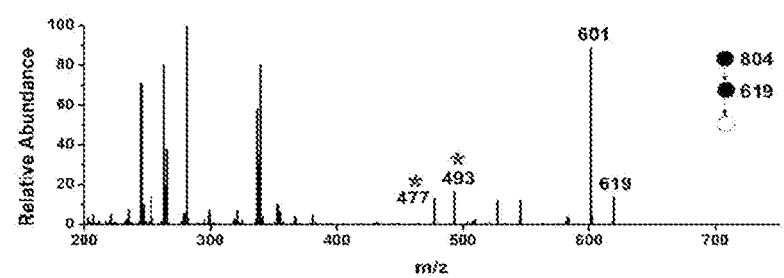
Figure 55:
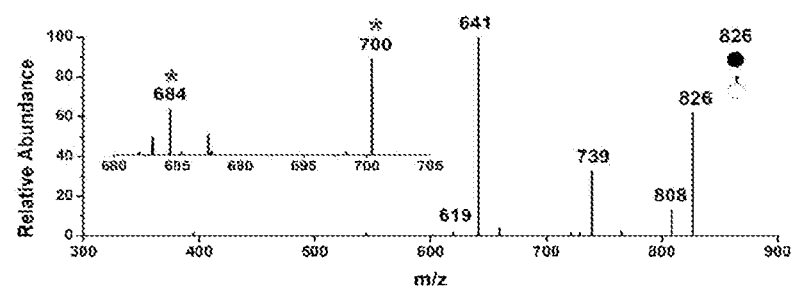
Figure 55:
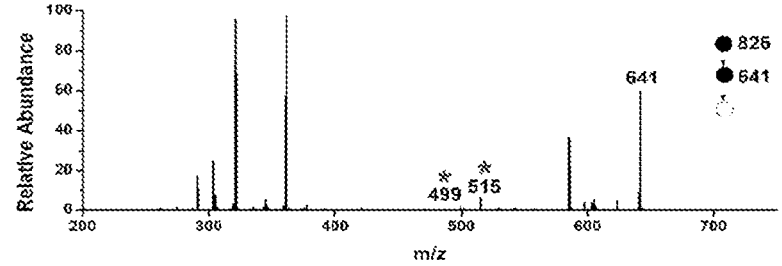
Figure 56:
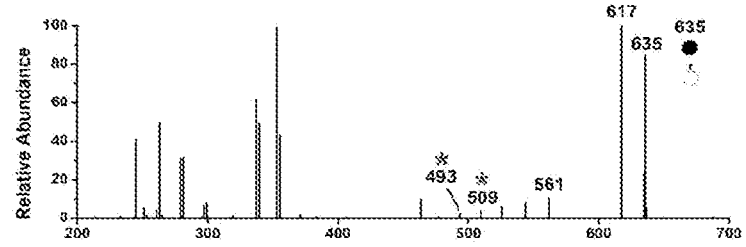
FIG. 56 shows (a) the MS/MS spectrum of the di-epoxidized products of PS 18:1 (9)-18:1 (9) (sodium salt). Precursor ion at m/z 635, the in-source dissociation product ion from the protonated di-epoxidized PS 18:1 (9)-18:1 (9)
Figure 56:
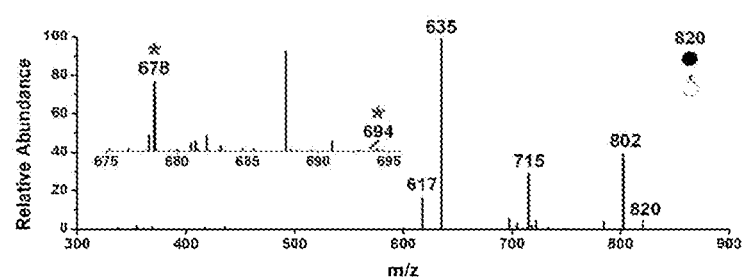
Figure 56:
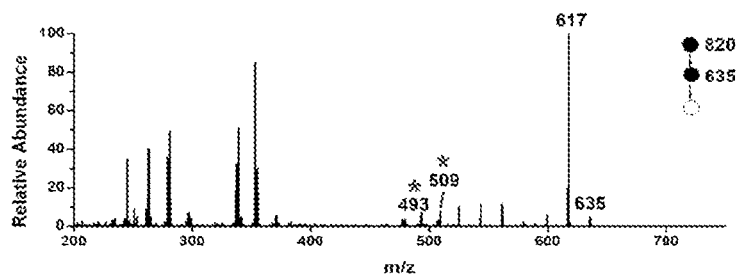
Figure 56:
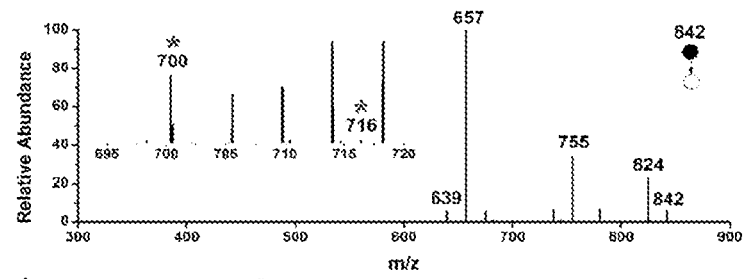
Figure 56:
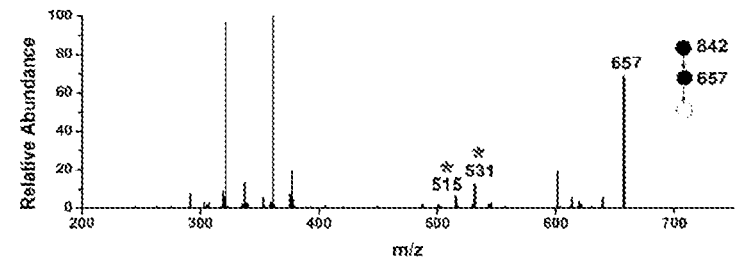

To further evaluate the feasibility of this method, other classes of lipids were tested including phosphatidylglycerol (PG) and phosphatidylserine (PS) and an unsaturated fatty acid (FA). The full mass spectra of PG 18:1 (9)-18:1 (9) (sodium salt) and PS 18:1 (9)-18:1 (9) (sodium salt) after electro-epoxidation are shown in FIGS. 50 and 53. The sodium adducts and epoxides were observed as well as the protonated forms. The fragmentation pattern of mono-epoxidized PG ([PG+O+Na]$^+$, m/z 813.5332) suggests that PG generated two diagnostic ions at m/z 671.3961 and 687.3909 (FIG. 51). The fragmentation of mono-epoxidized PS ([PS+O+H]$^+$, m/z 804.5478) produced diagnostic fragment ions at m/z 662.4105 and 678.4057 (FIG. 54). In addition, these results may be validated by studying the epoxidation of products in both acyl chains. The losses of phosphate and glycerol may be obtained by in-source dissociation. Since PG 18:1 (9)-18:1 (9) and PS 18:1 (9)-18:1 (9) have two identical acyl chains, their in-source dissociation product ions share the same structure. CID fragment ions at m/z 619.5358 produced the corresponding olefin and aldehyde fragments (m/z 477.3981 and 493.3931) to indicate the double bond positions (FIGS. 50 and 51). Additionally, fragmentation of their di-epoxidation products also occurred (FIG. 52). PG 18:1 (9)-18:1 (9) at m/z 829.5276 generated the diagnostic ions of m/z 687.3906 and 703.3862, while PS 18:1 (9)-18:1 (9) at m/z 820.6169 produced diagnostic ions of m/z 678.4049 and 694.5466 (FIGS. 53 and 55). The full mass spectra of oleic acid before and after electro-epoxidation are shown in FIG. 56. The diagnostic ions at m/z 163.1302 and 179.1251 indicate the position of double bond in oleic acid (FIG. 57).

Figure 36:
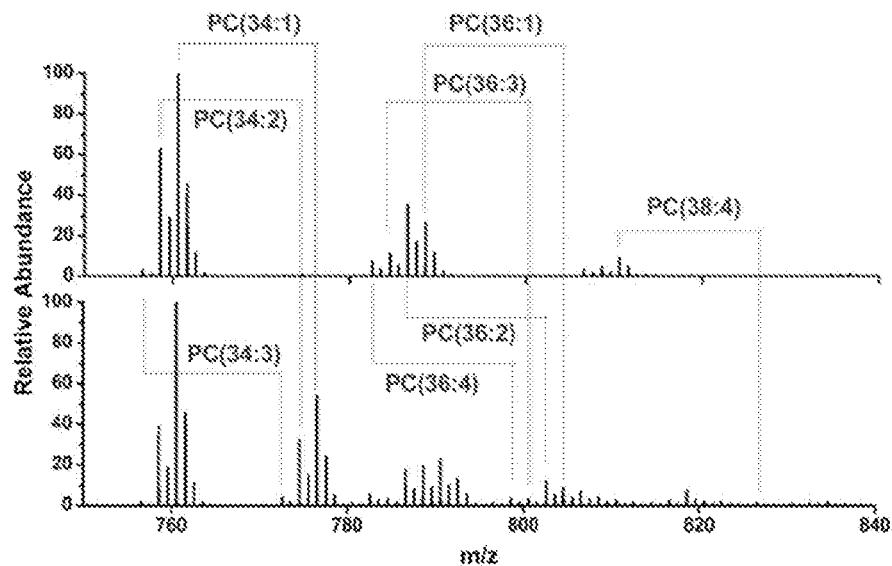
FIG. 36 shows full mass spectra of the lipid extract from chicken egg yolk before (top) and after (bottom) the electro-epoxidation.
Figure 37:
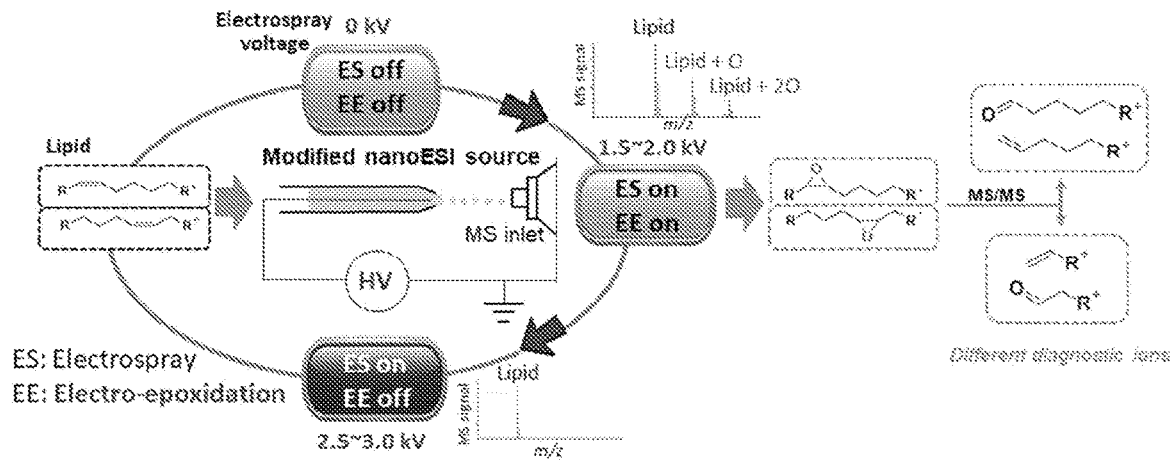
FIG. 37 shows a schematic of how the onset of electro-epoxidation of lipid double bonds may be controlled by simply tuning the spray voltage. On-demand derivatization, rapid response, low sample consumption, may thus be achieved and without the need for any extra apparatus.

To evaluate the efficacy of the present method in real sample analysis, a natural lipid extract from chicken egg yolk (from Avanti Polar Lipids) was employed. A solution of 10 µL lipid extract was prepared (0.2 µg/µL lipids, 10 mM HCl) in the ACN and water (80/20) solvent system, and loaded into a nanoESI emitter. Two mass spectra were collected (FIG. 36) before and after electro-epoxidation, which indicate 8 major sets of unsaturated lipid signals in the spectra. For the lipid PC (34:1), the CID fragmentation of its protonated ion at m/z 760.5888 (FIG. 59) leads to 59 Da and 183 Da neutral losses, which are specific to PCs. Also, the remaining fragment ions with acyl chain loss giving ions at m/z 478.3340, 496.3449, 504.3501, and 522.3608 indicate that the two acyl chains originated from FA (16:0) and FA (18:1). Using the diagnostic ions at m/z 634.4509 and 650.4459, the double bonds were identified between $C_9$ and $C_{10}$ for the unsaturated acyl chain. With all the information above, the structure of PC (34:1) could be elucidated as PC 16:0_18:1 (9). Similarly, the structures of lipids containing multiple double bonds in a single acyl chain or distributed between two different chains can also be identified. For example, the MS/MS spectrum of epoxidized PC (34:3) is shown in FIG. 62b. The generated diagnostic fragment ions suggest three double bond positional isomers are present, namely PC 16:0_18:3 (6, 9, 12), PC 16:0_18:3 (9, 12, 15) and PC 16:1 (9)_18:2 (9, 12). In total, 13 unsaturated lipids were identified in the sample and are listed with detailed information in Table 2. The MS spectra with diagnostic ions are shown in FIGS. 59-68.

In summary, an innovative strategy in accordance with the present teachings incorporates controllable electrochemical epoxidation of lipid double bonds in nanoESI-MS/MS for unsaturated lipid analysis. The electro-epoxidation of double bonds may be rapidly switched on and off by simply changing the electrospray voltage. The voltage may also be tuned to achieve desirable mono-epoxidation products or multiple-epoxidation products. Compared to the currently available methods, methods in accordance with the present teachings have one or more of the following features: (i) rapid and switchable derivatization of lipids using a single sample; (ii) low sample consumption; (iii) no need for extra apparatus; and/or (iv) compatibility with existing lipid analysis workflows using nanoESI-MS/MS. The unique capability of locating lipid double bond and the simple setup should facilitate its wide application to a range of biological systems. In addition, the on-demand voltage triggered electrochemical strategy opens a door to design new in-situ derivatization methods and expands the scope of molecules that may be analyzed using nanoESI.

Simultaneous Characterization of Lipid Sn-Positional and Double Bond Positional Isomers Using On-Demand Electrochemical Mass Spectrometry Mass spectrometry (MS) coupled with tandem MS (MS/MS) has been widely used in lipid analysis. Tandem MS in the form of collision-induced dissociation (CID) aids the lipid assignments of class and chain length isomers from the fragment ions associated with headgroup loss and fatty acyl chain loss. To achieve lipid structure characterization at the double bond and sn-positional isomer level, recent efforts have gone into developing new derivatization and ion activation methods. Chemical derivatization methods such as methoxylation, methylthiolation, olefin cross-metathesis, ozonolysis, Paternò-Büchi (PB) reaction, as well as the plasma-induced and off-line meta-chloroperoxybenzoic acid (m-CPBA) epoxidation have been developed to functionalize lipid double bonds and to produce characteristic fragment ions in tandem MS to locate double bond positions. Novel ion activation methods including ultraviolet photodissociation (UVPD), ozone-induced dissociation (OzID), and electron impact excitation of ions from organics (EIEIO) also successfully achieved double bond localization. Moreover, UVPD, OzID, EIEIO and radical induced fragmentation are able to identify sn-position of lipid isomers. These studies build the field of structural lipidomics and shed light on lipid biochemistry.

Described hereinabove is the first electrochemical (EC) probe for lipid structural analysis that allows for the elucidation of double bond positional isomers. This was achieved by developing a novel voltage-controlled electro-epoxidation reaction at the Taylor cone interface using a wire-in-a-capillary ESI emitter with a large orifice (LO-ESI emitter), followed by CID fragmentation of the epoxides to form two characteristic ions in MS/MS. The electro-epoxidation of double bonds may be rapidly switched on/off by simply changing the applied electrospray voltage.

Encouraged by these powerful and on-demand features, a novel EC derivatization method for characterization of lipid sn-positional isomers has also been developed in accordance with the present teachings. It was found that cobalt ions ($Co^{2+}$) produced by anodic corrosion of ESI electrode may be used to form complexes binding to lipids at the sn-positions, which leads to characteristic fragment ions in CID. It is worth noting that the formation of Co-lipid complexes in this method is voltage-dependent, which allows it to be cascaded with electro-epoxidation of lipids for simultaneous identification of double bond isomers. Therefore, in accordance with the present teachings, an EC-MS-based workflow where double bond location, sn-position as well as native lipid structure may be sequentially determined by tuning ESI voltages is provided. The characterization may be completed in a single sample.

The on-demand EC-MS-based workflow is illustrated using a pair of unsaturated sn-positional lipid isomers, phosphatidylcholine (PC) 18:1 (9)-16:0 and PC 16:0-18:1 (9). The two PC lipids were dissolved in a mixture of solvent (acetonitrile/water=¼, v/v) and 10 mM hydrochloric acid to achieve a concentration of 20 μM. Samples were loaded into two LO-ESI emitters separately, then placed 8 mm away from the inlet of a mass spectrometer (Thermo LTQ Orbitrap Velos Pro). A Co wire was inserted into the LO-ESI emitter to serve as the ESI electrode.

The workflow achieves (i) localization of double bonds by fragmenting the product of electro-epoxidation of lipids when the voltage is 1.8 kV; (ii) elucidation of sn-positions by fragmenting the lipid-Co complex ions when the voltage is switched to 3.0 kV; and (iii) interestingly, the MS spectrum of native lipids may also be obtained at a voltage of 3.0 kV with the Co electrode positioned in the middle of the LO-ESI emitter.

The characterization of isomeric PC 18:1_16:0 using the on-demand EC-MS-based workflow of a single sample injection will now be described. Protonated PC 18:1 (9)-16:0 and PC 16:0-18:1 (9) were both observed at m/z 760.5760. CID fragmentation of the protonated lipids produced the ions associated with headgroup loss and fatty acyl chain loss which allow identification of the backbone of lipids. For example, the tandem spectrum of protonated PC 18:1 (9)-16:0 shows characteristic ions at m/z 577.50, m/z 522.34 and m/z 496.25 (FIG. 72a), corresponding to the structures 2, 3, and 4 in FIG. 71. The epoxidized PC 18:1 (9)-16:0 and PC 16:0-18:1 (9) were found at m/z 776.5720. Fragmentation of the mono-epoxidized products results in the cleavage of the epoxide ring at both sides of C—O bond, generating two diagnostic ions that have 15.9954 Da mass difference to pinpoint double bond positions. The presence of ions at m/z 634.4402 and m/z 650.4351 in tandem spectrum of epoxidized PC 18:1 (9)-16:0 (FIG. 72b) confirms that the double bond was located between the C-9 and C-10 in its unsaturated fatty acyl chain (FA) 18:1. FIG. 71b provides the fragmentation pathway of epoxidized PC 18:1 (9)-16:0 and the corresponding structures of the two diagnostic ions. Co-adducted PC 18:1 (9)-16:0 and PC 16:0-18:1 (9) ions were found at m/z 409.2543. sn-Positions in lipids are then identified via tandem spectra of the Co-adducted products. PC 18:1 (9)-16:0 has its FA 18:1 (9) at sn-1 position and FA 16:0 at sn-2 position (structure 1 in FIG. 71). When the $Co^{2+}$ ions are bound to PC 18:1 (9)-16:0, it is proposed that a five-membered ring prefers to form containing the phosphate group and FA 16:0 at sn-2 position (structure 8 in FIG. 71), and then this gives a pair of fragment ions associated with the FAs attached to sn-2 position (see pathway a in FIG. 71c). Alternatively, an analogous fragmentation pathway that occurs via a six-membered ring (see pathway b in FIG. 71) may also exist in a small amount. The tandem spectrum of Co-adducted PC 18:1 (9)-16:0 ions contains two pairs of diagnostic ions having significantly different intensities (FIG. 72c). The dominant fragment ions have m/z at 314.1629 and 504.3413, corresponding to structures 9 and 10 in FIG. 71. Ions at m/z 340.1782 and 478.3259 are observed in low abundance, and these correspond to structures 12 and 13 (FIG. 71). In contrast, dominant species at m/z 340.1782 and 478.3259 are observed in the fragmentation of Co-adducted PC 16:0-18:1 (9) ions (FIG. 72*d*).

Quantitation of lipid double bond and sn-positional isomers may be achieved based on diagnostic ions intensities. A pair of lipid double bond positional isomers, PC 18:1 (6)-18:1 (6) and PC 18:1 (9)-18:1 (9), and two lipid sn-positional isomers, PC 18:1 (9)-16:0 and PC 16:0-18:1 (9) are selected for the quantitation experiments.

In the quantitative analysis of double bond positional isomers, a series of mixed solutions of PC 18:1 (6)-18:1 (6) and PC 18:1 (9)-18:1 (9) were used, with the concentration of PC 18:1 (6)-18:1 (6) being constant at 30 µM and PC 18:1 (9)-18:1 (9) varying from 10 µM to 50 µM. The two isomers were electro-epoxidized upon the application of a 1.8 kV voltage in a LO-ESI emitter and they generated both mono-epoxidized and di-epoxidized products at m/z 802.5996 and m/z 818.5936, respectively (see Example 33). The mono-epoxides were then mass-selected and fragmented by CID. In their tandem mass spectra, PC 18:1 (6)-18:1 (6) showed diagnostic ions at m/z 618.4158 and 634.4122, and the ions at m/z 660.4618 and 676.4572 were seen as the diagnostic ions of PC 18:1 (9)-18:1 (9) (FIGS. 73*a* and 73*b*). The total ion intensities ratios of the two pairs of double bond diagnostic ions, (e.g., total ion intensities of m/z at 660.4618 and 676.4572 from PC Δ9 divided by the intensities of m/z 618.4158 and 634.4122 from PC Δ6) were plotted against their concentration ratios. Good linearity ($R^2$=0.9967) was obtained (FIG. 73*c*).

To quantify the sn-positional isomers, a series of mixtures of PC 18:1 (9)-16:0 and PC 16:0-18:1 (9) was analyzed, with the total concentration kept constant at 50 µM, and molar ratios varied. In the tandem mass spectrum of Co-adducted PC 18:1 (9)-16:0, the ratio calculated by using the total intensities of ions at m/z 314.1629 and 504.3413 divided by the total ion intensities of the four diagnostic fragment ions at m/z 314.1629, m/z 504.3413, m/z 340.1782 and m/z 478.3259 is 0.8622, while the calculated ratio for Co-adducted PC 16:0-18:1 (9) is 0.2649. A good linear relationship was found when the ratios were plotted against the molar percentage of PC 18:1 (9)-16:0 in the mixed solutions ($R^2$=0.9965) (FIG. 73*d*). These results demonstrate that the on-demand EC-MS-based workflow may be used for quantification of both lipid double bond and sn-positional isomers.

The detection limit was evaluated using PC 18:1 (9)-16:0 and PC 16:0-18:1 (9). The double bond diagnostic ions may be observed with acceptable signal/noise at 50 nM for PC 18:1 (9)-16:0 and 10 nM PC 16:0-18:1 (9), which is comparable to the value reported in our previous work (10 nM for PC 18:1 (9)-18:1 (9) and 80 nM PC 18:1 (6)-18:1 (6)). The sn-position diagnostic ions may be clearly seen and used to identify sn-positions of the two lipid isomers even at 10 nM (see Example 34 for details).

EC-MS-based lipid analysis is highly efficient. Many parameters in the design are multifunctional. Voltages that initiate electrospray also control the occurrence of two electrochemical reactions. The cobalt electrode employed not only serves as an ESI working electrode but also provides $Co^{2+}$ ions via metal electrolysis to form [lipid+Co]$^{2+}$ ions. Hydrochloric acid is the reagent for electro-epoxidation as well as for assisting in electrode corrosion to form metal ions.

Metal ions formed in situ by anodic corrosion may have one or more advantages compared to the external addition of salts including but not limited to: (i) a metal electrode is typically required in an ESI source, so it may be used readily as a source of metal ions; (ii) release of the metal ions may be controlled by the applied spray voltage; (iii) release of metal ions in a mild and sustained way allows many reactions to occur efficiently; and/or (iv) external addition of metal ions often suffers from time-consuming sample preparation steps and incapacity when unstable metal ions are needed.

In summary, in accordance with the present teachings, a new electrochemical strategy has been developed that uses $Co^{2+}$ formed in situ by voltage-controlled anodic corrosion of an ESI electrode to achieve the identification of lipid sn-positions due to differentiated fragment pathways of the Co-lipid complexes in CID. Furthermore, this experiment is cascaded with interfacial electro-epoxidation to form a novel EC-MS-based workflow for lipid structural characterization. In this workflow, the electro-epoxidation reaction and anodic corrosion of Co electrode are voltage-dependent. Therefore, the double bond localization, the sn-position, and the lipid base structure may be sequentially determined by tuning ESI voltages. In addition to this feature, the on-demand EC-MS workflow for lipid analysis also possesses one or more of the following characteristics: (i) low sample consumption; (ii) no requirement for extra instrumentation; (iii) compatibility with the direct infusion lipidomics workflow; (iv) collection of lipid structural information at a high level of specificity using a single sample; and/or (v) quantitative analysis of lipids isomers. The unique features of this strategy and its simple setup show great potential for its future applications in the lipidomics field.

The following examples and representative procedures illustrate features in accordance with the present teachings, and are provided solely by way of illustration. They are not intended to limit the scope of the appended claims or their equivalents.

EXAMPLES

Examples Relating to Acceleration of Electrochemical Reactions in a Voltage-Controlled Interfacial Microreactor Reagents and Materials All reagents were of analytical or chromatographic grade and were used without further purification. Girard's reagent T (>99%), 4-nitrobenzaldehyde (>99%), 4-anisidine (>99%) and potassium hydroxide (>99.98%) were purchased from Acros Organics (Morris Plains, NJ). Cortisone (>98%), benzyl alcohol (99%), 2,4,6-trimethylpyrylium tetrafluoroborate (>98%), lithium trifluoromethanesulfonate (LiOTf, 96%), N,N'-dimethyoxydiphenylamine (DMA, 99%) and phenothiazine (PTA, 98%) were purchased by Alfa Aesar (Haverhill, MA). 6-Hydroxy-1-indanone was purchased from TCI America (Cambridge, MA). Formic acid (>99.0%), methanol and water were purchased from Fisher Chemical (Houston, TX). Borosilicate glass capillaries of 0.86 mm i.d. and 1.50 mm o.d. and 150 mm long were provided by World Precision Instruments (Sarasota, FL).

Example 1—Fabrication of ESI Emitters with Different Orifice Sizes

Figure 8:
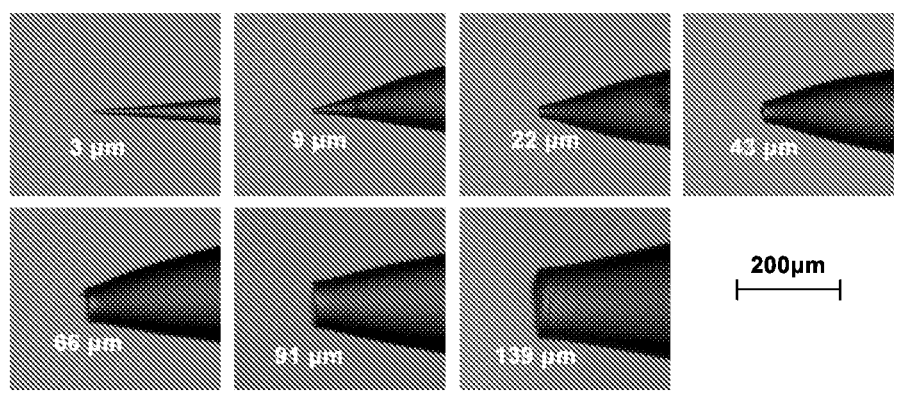
FIG. 8 shows representative microscopic photos of fabricated nanoESI emitters using the P-1000 puller.

ESI emitters were pulled from borosilicate glass capillaries (1.5 mm o.d. and 0.86 mm i.d.) using a P-1000 micropipette puller (Sutter Instrument, Novato, CA) following the procedures listed in Table 1. The microscopic images of the emitter tips are shown in FIG. 8. Note that when the emitter puller was continuously used for more than 1 hour, size variations become large. The ESI emitter size is an important parameter for the experiments described herein. Therefore, the size of each ESI emitter was confirmed under the microscope before experiments.

TABLE 1

Operating Procedures Used To Pull nanoESI Emitters.

| Emitter orifice (μm, n = 5) | Ramp (° C.) | Heat (° C.) | Pull | Velocity | Time | Pressure | Mode |
|---|---|---|---|---|---|---|---|
| 2.9 ± 0.8 | 539 | 545 | 0 | 25 | 250 | 500 | Delay |
| 9.4 ± 1.3 | 539 | 545 | 0 | 15 | 250 | 500 | Delay |
| 21.9 ± 2.2 | 539 | 545 | 0 | 10 | 250 | 500 | Delay |
| 42.9 ± 1.4 | 539 | 545 | 0 | 8 | 250 | 500 | Delay |
| 66.3 ± 2.7 | 539 | 545 | 0 | 6 | 250 | 500 | Delay |
| 90.9 ± 3.1 | 539 | 545 | 0 | 5 | 250 | 500 | Delay |
| 138.6 ± 6.0 | 539 | 545 | 0 | 3 | 250 | 500 | Delay |

Example 2—Mass Spectrometry

MS data were acquired on an Orbitrap Velos Pro mass spectrometer (Thermo Fisher Scientific, San Jose, CA, USA). The ion transfer capillary was held at 200° C. for all analyses with the capillary voltage at 15 V and the tube-lens voltage at 65 V. The distance between the ESI emitter tip and the transfer capillary was fixed at 10 mm. The resolution was set to 60,000 at m/z 400 for exact mass measurements. MS data were analyzed using the Qual Browser feature of the Xcalibur™ program (Thermo Fisher Scientific, San Jose, CA). MS/MS mass spectra were recorded using an isolation window of 1.0 Th and normalized collision energies of 20-50%.

Example 3—Electrochemical Reactions in the Interfacial Microreactor

The unique microreactor is formed at the solution-air interface of the Taylor cone in a large ESI emitter (~139 μm orifice), when the spray voltage of 2 kV is applied to form a meniscus. For electro-oxidative coupling of DMA and PTA, PTA (100 μM) and DMA (400 μM) were prepared in acetonitrile-water (1:1 v/v) containing LiOTf (100 μM). 10 μL of the mixture solution was loaded into the ESI emitter. A Pt wire was inserted into the ESI emitter and used as an electrode, and the MS inlet was grounded. The reaction starts upon the application of +2 kV to the ESI electrode. The ESI emitter is coupled with a mass spectrometer, which monitors the reaction in situ. For electro-oxidation of alcohol and GT reaction, GT (250 μM) and benzyl alcohol (1 mM) were prepared in methanol-water (1:1 v/v) containing 0.5% formic acid. 10 μL of the mixture solution was loaded into an ESI emitter (~139 μm orifice). The reaction starts upon the application of +2 kV to the ESI electrode.

Example 4—Bulk Electrochemical Reactions in Electrochemical Cells

For comparison, the above electrochemical reactions were performed in undivided electrochemical cells as bulk reactions. The electrochemical cells were assembled from a glass tube (5 mL) and two platinum wires (diameter of 0.25 mm) as the anode and the cathode. A precision 40 V/5 A switching direct current power supply was employed to provide current to the reaction solutions. The output plug was connected to the positive and negative output wires, which were connected to the reaction electrodes. The electrochemical cell was filled with PTA (100 μM), DMA (400 μM), and LiOTf (1 mM) in 4 mL acetonitrile-water (1:1 v/v) when performing the electro-oxidative coupling of PTA with DMA. Current (3 V, 1 mA, density 6.4 mA cm$^{-2}$) was passed through the solution mixtures. The reaction mixture was subsequently extracted and analyzed at the reaction time of 7 sec (FIG. 12a), 5 mM (FIG. 12b), and 30 min (FIG. 12c) by a non-electrical sonic spray MS method to avoid any electrochemical reactions during the detection. The sonic spray ionization was operated using the nebulization pressure of 120 psi and the solution flow rate of 10 μL min$^{-1}$. The electrochemical cell was filled with GT (250 μM), benzyl alcohol (1 mM), and LiOTf (1 mM) in 4 mL methanol-water-formic acid (1:1:0.005 v/v) when performing one-step electrochemical derivatization of benzyl alcohol. The reaction mixture was subsequently extracted and analyzed at the reaction time of 7 sec (FIG. 13a), and 30 min (FIG. 13b) using sonic spray MS analysis.

Example 5—Palladium Catalyzed Synthesis of N,N-Dimethyl-4-(10H-phenothiazin-10-yl)aniline as the Compound 3 Standard N,N-Dimethyl-4-(10H-phenothiazin-10-yl)aniline was synthesized following a palladium catalyzed coupling of 4-bromo-N,N-dimethylaniline and 10H-phenothiazine with slight modification. Briefly, phenothiazine (200 mg, 1 mmol, 1.00 equiv), 4-bromo-N,N-dimethylaniline (300 mg, 1.5 mmol, 1.50 equiv), KOt-Bu (280 mg, 2.5 mmol, 2.50 equiv), tri(o-tolyl)phosphine (61 mg, 0.2 mmol, 0.2 equiv) and palladium(II) acetate (23 mg, 0.1 mmol, 0.1 equiv/10 mol %) were dissolved in anhydrous toluene (3 mL). The reaction mixture was then stirred at 100° C. (oil bath temperature) under inert atmosphere overnight. After being cooled to room temperature, 50 mL water was added, followed by extraction with EtOAc (3×50 mL) and drying over MgSO$_4$, the crude product 3 was purified by column chromatography (hexane/CH$_2$Cl$_2$ 4:1). $^1$H NMR (400 MHz, acetone-d$_6$, FIG. 27): δ (ppm)=7.20 (d, J=8.7 Hz, 2H), 6.98 (m, 4H), 6.91-6.78 (m, 4H), 6.24 (d, J=8.1 Hz, 2H), 3.05 (s, 6H), which agrees with the literature.

Example 6—Hydrazone Formation in the Interfacial Microreactor

Figure 14:
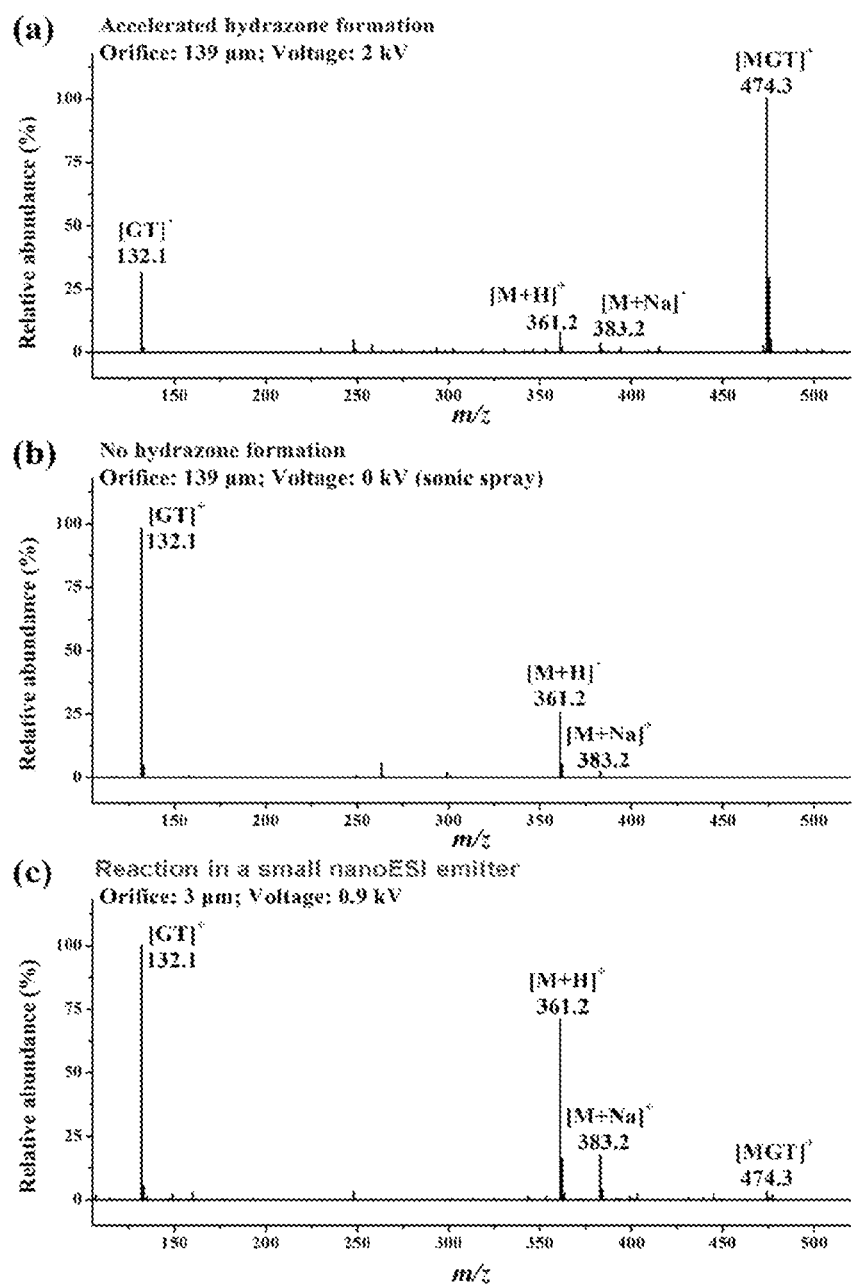
FIG. 14 shows mass spectra showing the reaction of GT and cortisone (a) in the interfacial microreactor (a large ESI emitter with a 139 μm orifice operated at 2 kV); (b) by sonic spray; and (c) in a small ESI emitter with a 3 μm orifice operated at 0.9 kV.
Figure 15:
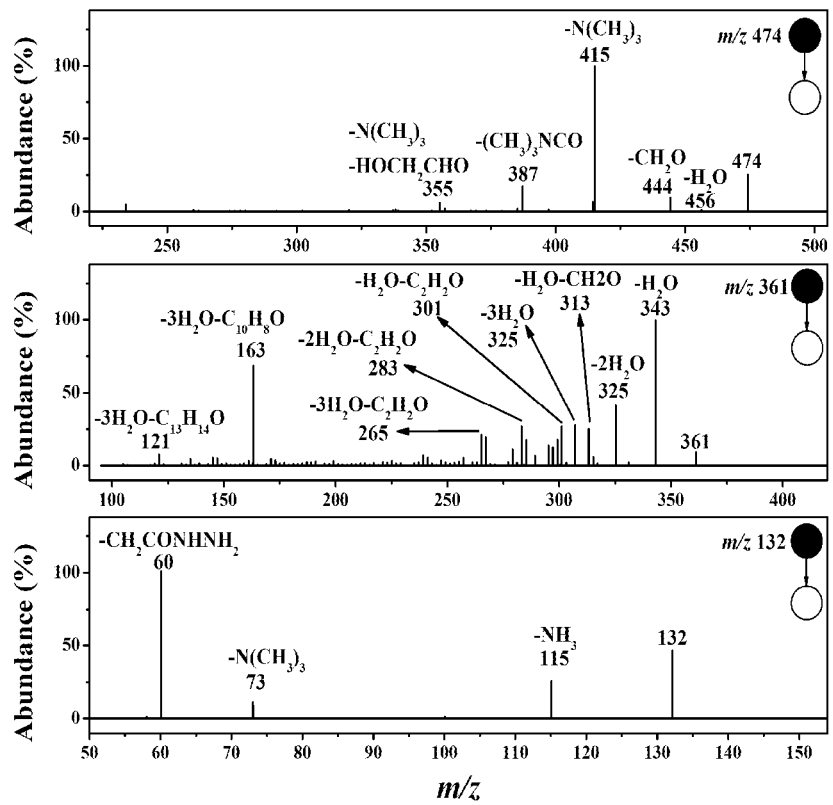
FIG. 15 shows tandem mass spectra of the precursor ions [GT]$^+$ at m/z 132, [M+H]$^+$ at m/z 361 and [MGT]$^+$ at m/z 474.
Figure 16:
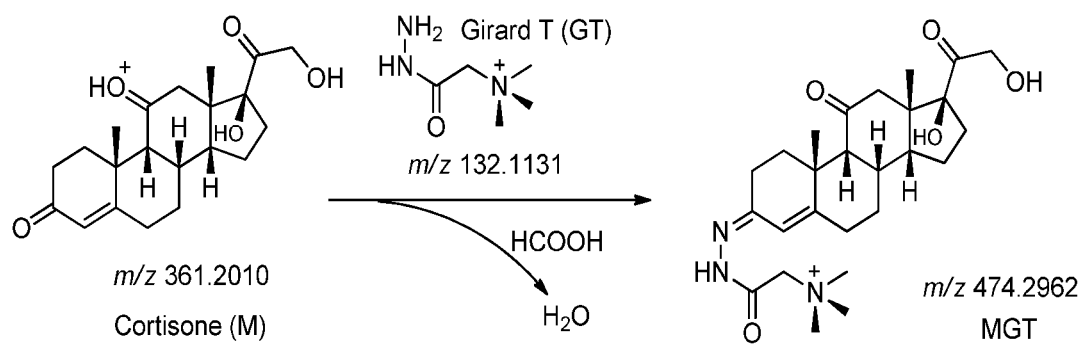
FIG. 16 shows a scheme for the conversion of cortisone to its corresponding hydrazone using GT reagent.

The reaction between Girard's reagent T (GT, a quaternary ammonium hydrazine salt) and cortisone (M, a type of ketosteroids) affording the corresponding charge-labeled hydrazone (MGT, FIG. 16) was selected to demonstrate the interfacial effect in the microreactor, because this reaction has been proved to be accelerated in other microdroplet formats. GT reagent (250 μM) and cortisone (200 μM) in methanol-water (1:1 v/v) containing 0.5% formic acid were mixed and immediately loaded into an ESI emitters with a 139-μm orifice. Upon the application of a spraying voltage at 2 kV, the product ion MGT$^+$ at m/z 474.3 appeared as the major peak, three minor peaks (GT$^+$ at m/z 132.1, and two cortisone ions [M+H]$^+$ at m/z 361.2 and [M+Na]$^+$ at m/z 383.2) were observed in the mass spectrum (FIG. 14a). The relative intensities of GT and cortisone were less than 35% and 10%, respectively, indicating the massive reaction conversion. Along with the accurate masses by high-resolution mass spectrometry (−4.6 ppm for GT$^+$, +5.5 ppm for [M+H]$^+$, +5.2 ppm for [M+Na]$^+$ and +4.0 ppm for MGT$^+$), chemical structures of the reactant and product ions were verified by fragmenting the precursor ions using tandem mass spectrometry under collision-induced dissociation (CID) in FIG. 15. In comparison, the product peak MGT$^+$ at m/z 474.3 was not observed, and the peaks of the two reactants (FIG. 14*b*) remained, when the spray was initiated by pneumatic nebulization without applying a spray voltage. In addition, a small amount of the product ions MGT$^+$ at m/z 474.3 (5-8% ratios) was observed as shown in FIG. 14*c* when a low spraying voltage (0.9 kV) was applied on a 3-μm ESI emitter.

Example 7—Katritzky Reaction in the Interfacial Microreactor

Figure 17:
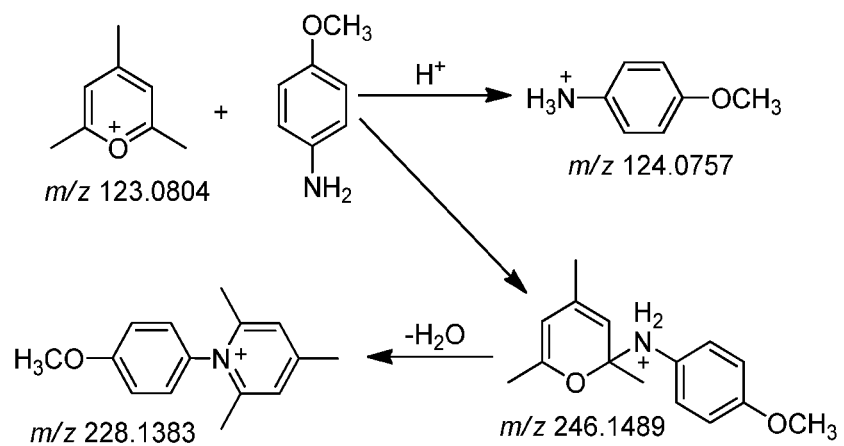
FIG. 17 shows a possible reaction pathway of the Katritzky reaction
Figure 18:
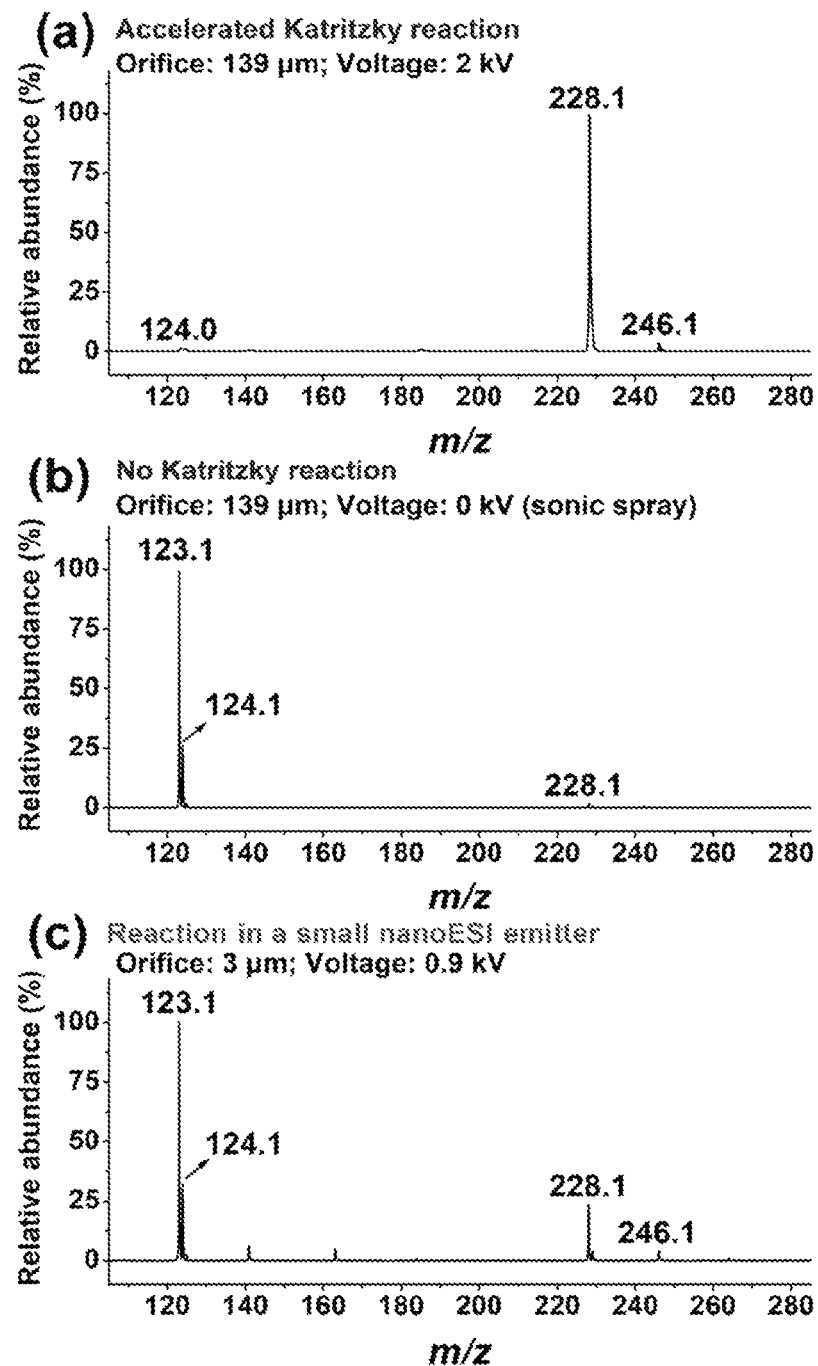
FIG. 18 shows mass spectra showing the Katritzky reaction between 3,4,5-trimethylpyrylium tetraborate and 4-anisidine (a) in the interfacial microreactor (a large ESI emitter with a 139 μm orifice operated at 2 kV); (b) by sonic spray; and (c) in a small ESI emitter with a 3 μm orifice operated at 0.9 kV.
Figure 19:
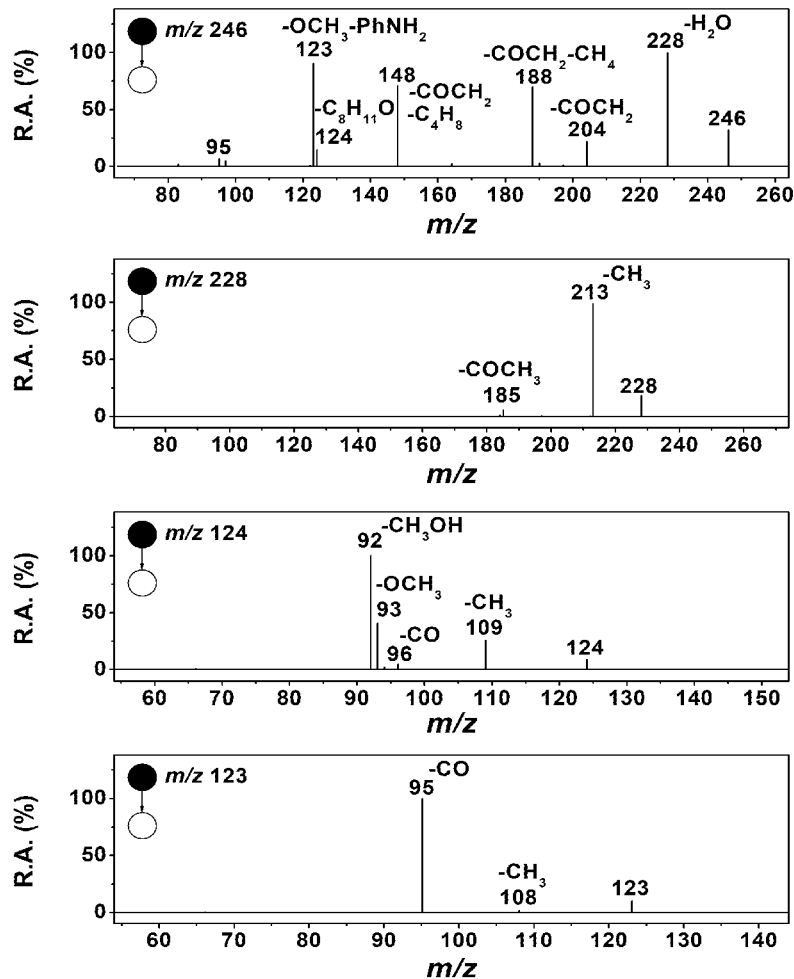
FIG. 19 shows tandem mass spectra of the trimethylpyrylium cation at m/z 123, protonated p-methoxyaniline at m/z 124, pyridinium cation at m/z 228 and intermediate adduct at m/z 246. R.A: relative abundance.

Katritzky reaction of pyrylium ions with amines to yield N-substituted pyridinium cations (see FIG. 17) was also investigated for the acceleration study in the interfacial microreactor. This reaction was sharply accelerated by reactive paper spray. 3,4,5-Trimethylpyrylium tetraborate (0.5 mM) and 4-anisidine (0.5 mM) were mixed in methanol-water (1:1 v/v) and introduced into an ESI emitter with a 139-μm orifice. When a spray voltage of 2 kV was applied to the 139-μm ESI emitter, the pyridinium product peak appears at m/z 228.1 as the dominate peak, along with two visible peaks assigning to the protonated 4-anisidine at m/z 124.0 (abundance <2%) and the hydrated intermediate at m/z 246.1 (abundance <5%) in the mass spectrum (FIG. 18*a*), indicating a good reaction conversion. Small mass errors (−2.6 ppm for the pyridinium product and −3.3 ppm for the hydrated intermediate) as well as the MS/MS spectra (FIG. 19) confirmed their chemical structures. Pneumatic nebulization of the two reactants by using the same ESI emitter without applying any voltage leads to only a small amount of the pyridinium product at m/z 228.1 (2.4% abundance shown in FIG. 18*b*). For a comparison experiment using a 3-μm nanoESI emitter operated at 0.9 kV, the pyridinium product at m/z 228.1 of 24% abundance and the hydrated intermediate at m/z 246.1 of 5% abundance are observed from the mass spectrum in FIG. 18*c*.

Example 8—Claisen-Schmidt Condensation in the Interfacial Microreactor

Figure 20:
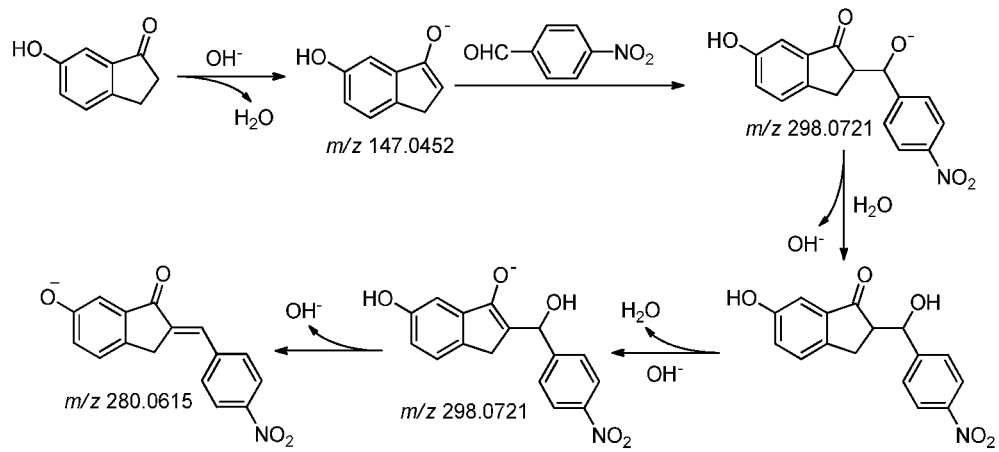
FIG. 20 shows a possible reaction pathway of the Claisen-Schmidt base-catalyzed condensation.
Figure 22:
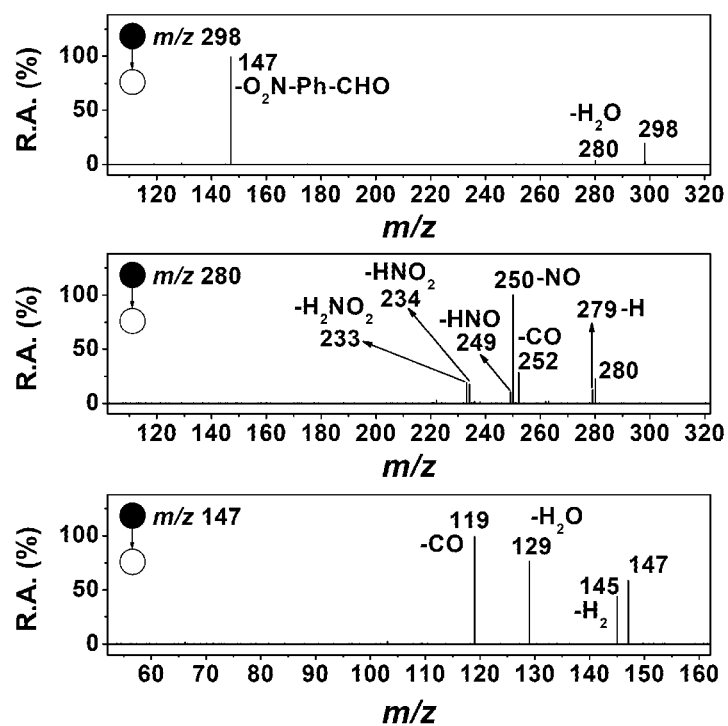
FIG. 22 shows tandem mass spectra of deprotonated 6-hydroxy-1-indanone at m/z 147, dehydrated product at m/z 280 and hydrated intermediate at m/z 298. R.A: relative abundance.

The interfacial microreactor was further demonstrated by the investigation of Claisen-Schmidt base-catalyzed condensation (see FIG. 20). When 6-hydroxy-1-indanone (0.5 mM) was mixed with nitrobenzaldehyde (5 mM) and KOH (1 mM) in methanol-water (1:1 v/v), and loaded in a 139-μm glass emitter, two major peaks at m/z 280.1 and 298.1 were observed in FIG. 21*a* upon applying 2 kV spray voltage, which correspond to the dehydrated condensed product and the condensed intermediate, respectively. The intensity of the deprotonated indanone at m/z 147.1 was less than 7%, indicating a high condensation conversion. The MS/MS spectra in FIG. 22 verified the chemical structures of the intermediate and the product. The condensation percentage was less than 5% (the dehydrated condensed product of 1.2% abundance at m/z 280.1 and the condensed intermediate of 4.1% abundance at m/z 298.1) when the same reaction was performed by sonic spray using the same emitter (FIG. 21*b*). When the Claisen-Schmidt condensation was performed in a typical nanoESI (using 3-μm glass emitter operated at 0.9 kV), the dehydrated product at m/z 280.1 and the hydrated intermediate at m/z 298.1 showed 1.8% and 10.7% abundance (FIG. 21*c*), respectively.

Example 9—Reaction Conversions and Acceleration Factors in the Interfacial Microreactor Methods of calculating acceleration factors in confined volume reactions are discussed in literature. To determine the extent to which the reactions may be accelerated in the interfacial microreactor, a method called apparent acceleration factor (AAF) was used to evaluate the effect of acceleration in this work. For two different reaction media and the same reaction time, AAF is defined as the conversion ratio of reaction in the interfacial reactor divided by the conversion ratio of the same reaction in bulk. Conversion ratio is defined as product intensities relative to reagent intensities. This ratio of ratios method is a crude measure of reaction rate acceleration as it does not include ionization efficiency differences. This method has been used in many microdroplet acceleration studies due to the convenience of calculation.

As an example, the conversion ratio of the electrochemical coupling of PTA with DMA was calculated as: $I_p/I_r$, where $I_p$ (intensity of the product) is the intensity sum of the product at m/z 318.1 and its in-source fragment ion at m/z 303.1, and $I_r$ (intensity of the reagent) is the intensity sum of the PTA cation at m/z 199.1 and its in-source fragment ion at m/z 167.1. The AAF of the electrochemical coupling of PTA with DMA was calculated by $I_p/I_r$ in the interfacial microreactor $(I_p/I_r)_i$ to the value in the bulk reaction $(I_p/I_r)_b$ carried out for the same period of time, viz. $(I_p/I_r)_i/(I_p/I_r)_b =$ (2.68e5/2.08e4)/(8.33e3/4.32e4)=67.

The electrode surface area is generally related to the rate of electrode reaction in solution. The electric current density in the interfacial microreactor (current in amperes per unit area of cross-section=0.6 μA cm$^{-2}$) is much less than the current density in the bulk electrolytic cell (6.4 mA cm$^{-2}$). Nevertheless, the reaction conversion ratios in the interfacial microreactor were still much higher than those in the bulk electrolytic cells (FIG. 3*a* vs. FIG. 12 and FIG. 6*b* vs. FIG. 13). Therefore, the acceleration factor would be even higher than that calculated from this ratio if the same current density in the bulk electrolytic cell were able to be maintained, although the current density of 0.6 μA cm$^{-2}$ in the bulk electrolytic cell cannot be achieved due to the minimum current of 1 mA provided by the power supply. The acceleration factor used here is a crude measure.

It was observed that the orifice size and the ESI voltage play notably important roles in the reaction acceleration. AAF increases in the larger orifice (FIG. 23*a*), and at lower voltages with the optimum at around 2 kV (FIG. 23*b*). Similar AAF curves over the applied voltage were also obtained for the Katritzky reaction (FIG. 23*c*), Claisen-Schmidt condensation (FIG. 23*d*), electro-oxidative coupling of PTA and DMA (FIG. 23*e*), and one-step electrochemical derivatization of benzyl alcohol with GT (FIG. 23*f*). These results provide important evidence to the effect of the meniscus interface in large-orifice ESI emitters on reaction acceleration.

When non-electrochemical reactions are performed in the large emitters with interfacial microreactors, they may be accelerated both at the interface of the Taylor cone and in the electrosprayed microdroplets, because the reagents do not need to contact the electrode. However, reactions in the small ESI emitters can only be accelerated in electrosprayed microdroplets. Therefore, the acceleration factors in the interfacial microreactor of the large emitter may be higher than those in the small ESI emitters.

Example 10—Microscopic Photos in Various Spraying Modes

Figure 24:
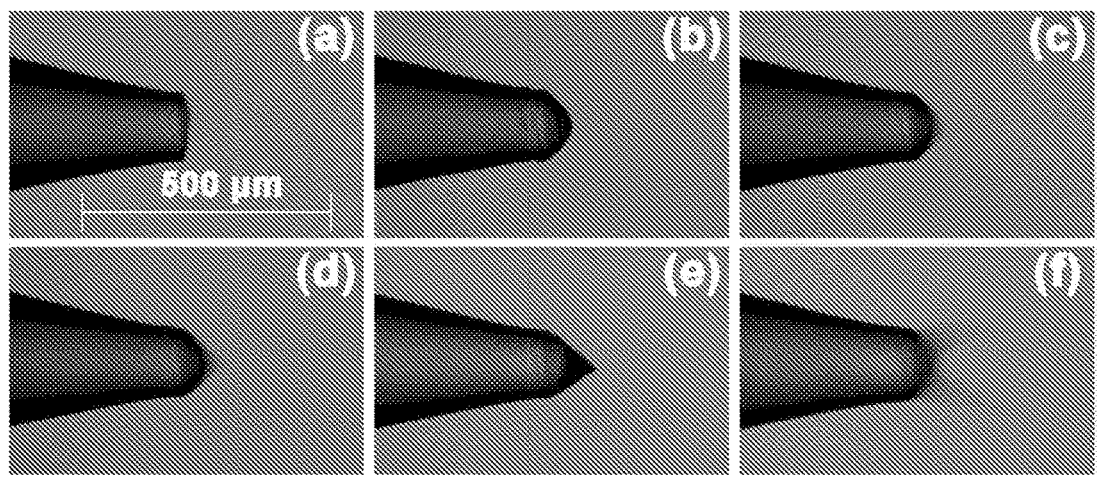
FIG. 24 shows microscopic images of the ESI emitter with a 139 μm orifice (a) before applying the spray voltage, and after the application of various voltages to work on the (b) dripping, (c) microdripping, (d) spindle, (e) cone jet, and (f) multi-jet modes.

To determine the inherent mechanism for reaction acceleration in the interfacial microreactor, the microscopic photos (FIG. 24) of the ESI emitter with a 139 μm orifice were collected under various spray voltages.

Figure 25:
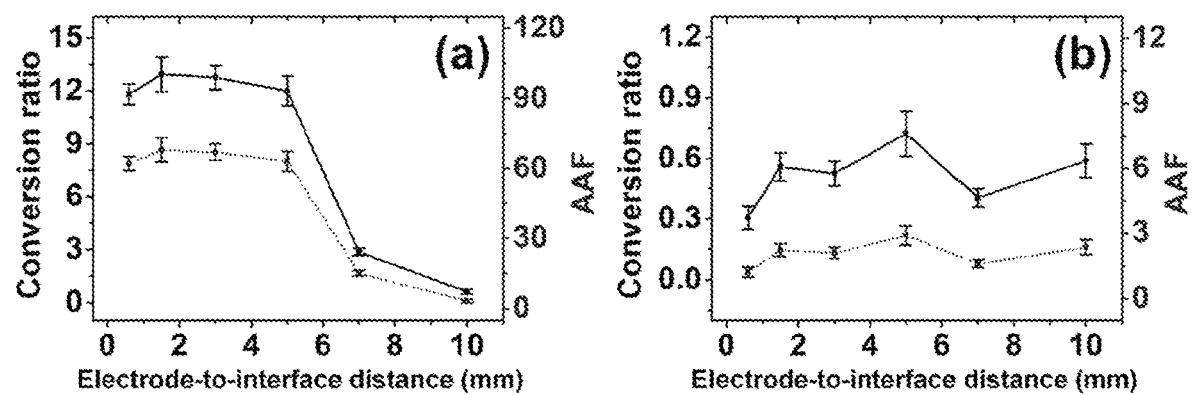
FIG. 25 shows plots of the effects of the electrode-to-interface distance on the conversion ratios and apparent acceleration factors of the electrochemical coupling of PTA with DMA (a) in the interfacial microreactor of a large ESI emitter (139 μm orifice) and (b) in a small ESI emitter (3 μm orifice).
Figure 28:
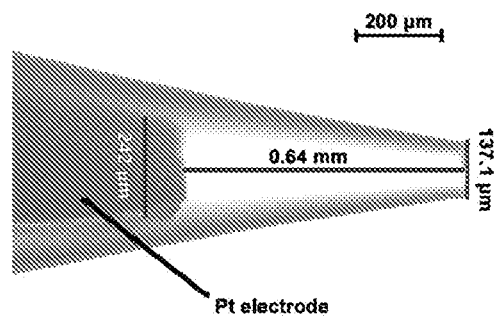
FIG. 28 shows a microscopic image of the large-orifice ESI emitter showing the distance between the Pt electrode and the emitter tip.

Example 11—Distance Between the ESI Electrode and Air/Solution Interface of the Taylor Cone The distance between the electrode and air/solution interface of the Taylor cone is important in the electrochemical interfacial reactor. A distance of 0.6 mm was used in these experiments (confirmed by the microscopic image in FIG. 28), which allows the reactants at or near the interface to receive or lose electrons from/to the electrode upon the application of voltage. In order to see how this distance would affect the acceleration of electrochemical reactions, an experiment was performed in which different distances between the interface and the electrode and their corresponding reaction conversions were studied. The results (FIG. 25a) show that the electrochemical coupling of PTA and DMA may be accelerated in the interfacial microreactor when the distance is in the range of 0.6-5 mm. The acceleration effect dropped sharply once the distance exceeds 5 mm (FIG. 25a). The results show the distance (0.6 mm) was not far away from the air/solution interface, which allows the acceleration of electrochemical reactions.

Example 12—Distance Between the ESI Emitter and MS Inlet

Figure 26:
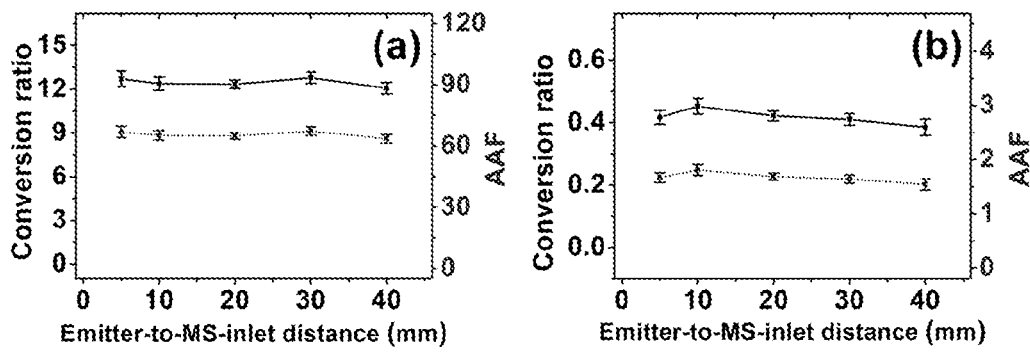
FIG. 26 shows plots of the effects of the emitter-to-MS-inlet distance on the conversion ratios and apparent acceleration factors of the electrochemical coupling of PTA with DMA (a) in the interfacial microreactor of a large ESI emitter (139 μm orifice) and (b) in a small ESI emitter (3 μm orifice).

An experiment was performed to investigate whether electrosprayed droplets are involved in the acceleration of electrochemical reactions besides the air/solution interface of the Taylor cone. The distance between ESI emitter and MS inlet was changed to vary the possible reaction time in the electrosprayed microdroplets. No obvious reaction progress of the electrochemical reaction of PTA and DMA was observed in electrosprayed droplets at different reaction times (FIG. 26), which shows the electrochemical reaction acceleration does not occur to a significant extent in the electrosprayed microdroplets. This is because reactants in the electrosprayed microdroplets lose contact with the ESI electrode, resulting in termination of the electrochemical reactions in electrosprayed microdroplets. Therefore, the surface area/volume of the electrosprayed microdroplets is not involved in the acceleration of electrochemical reactions.

Example 13—Addition of Surfactant

Figure 27:
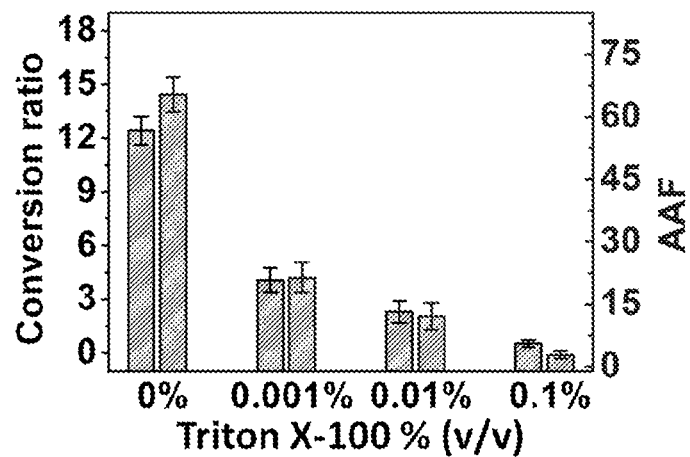
FIG. 27 shows a plot of the effects of Triton X-100 on the conversion ratios and apparent acceleration factors of the electrochemical coupling of PTA with DMA in the interfacial microreactor.

Additional evidence to support the interfacial effect on reaction acceleration in the interfacial reactor was provided. A neutral surfactant Triton X-100 was added to the electrochemical reaction of PTA and DMA in the interfacial microreactor. With the increased amount of Triton X-100 (from 0.001% to 0.1%, % represents volume of Triton X-100/volume of reaction solution) added to the reaction mixture, decreased conversion ratios and acceleration factors were observed (FIG. 27). A blank bulk-phase experiment with 0.1% Triton X-100 showed no change in the reaction progress. These results demonstrate the role of the surface in reaction acceleration as Triton X-100 blocks the surface and diminishes accelerated product formation.

Example 14—Liquid Flow Rate in ESI Emitters

One question to answer is whether the microreactor acceleration is due to the slower flow rate and longer residence time of the electrogenerated reactants in the solution. When 2 kV was applied to the electrode in the 139 μm orificeESI emitter (microreactor acceleration mode), the liquid flow rate was found to be 0.08 μL min$^{-1}$; when 3 kV was applied in the large ESI emitter (cone jet mode), the liquid flow rate was changed to 0.9 μL min$^{-1}$. In order to answer this question, the reaction was performed in a small ESI emitter (with a 3-μm orifice), where the flow rate was around 0.02 μL min$^{-1}$. The residence time of the electrogenerated species in the small emitter was longer than that in the large one. However, the reaction conversion in the small emitter was significantly lower than that in the large emitter at 2 kV (FIG. 3a versus FIG. 12d). These results indicate that the microreactor acceleration was not the result of the residence time of the electrogenerated reactants in the solution.

Figure 9:
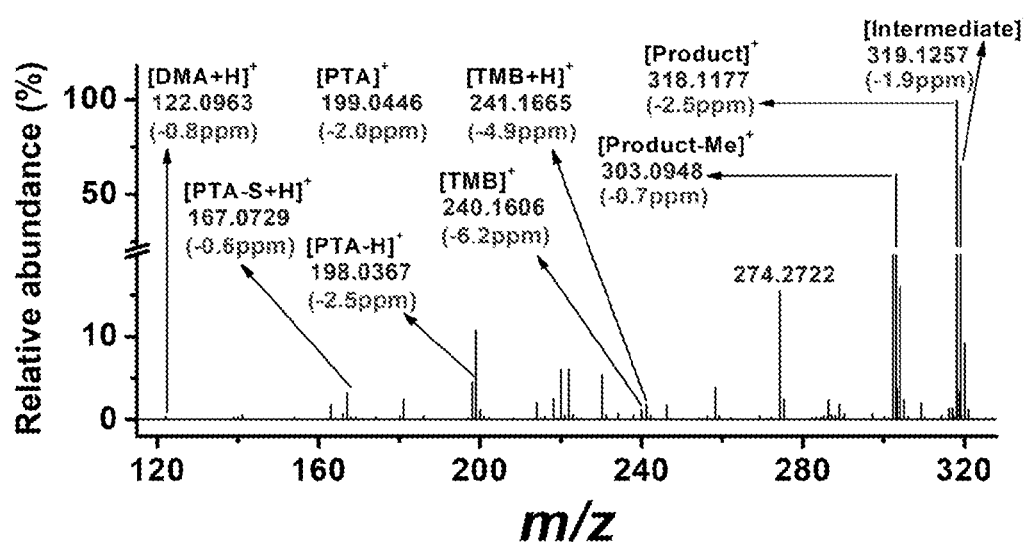
FIG. 9 shows a high resolution mass spectrum of the electro-oxidative coupling of phenothiazine with N,N'-dimethylaniline by ESI using a 139 μm emitter upon applying a spray voltage of 2 kV.
Figure 10:
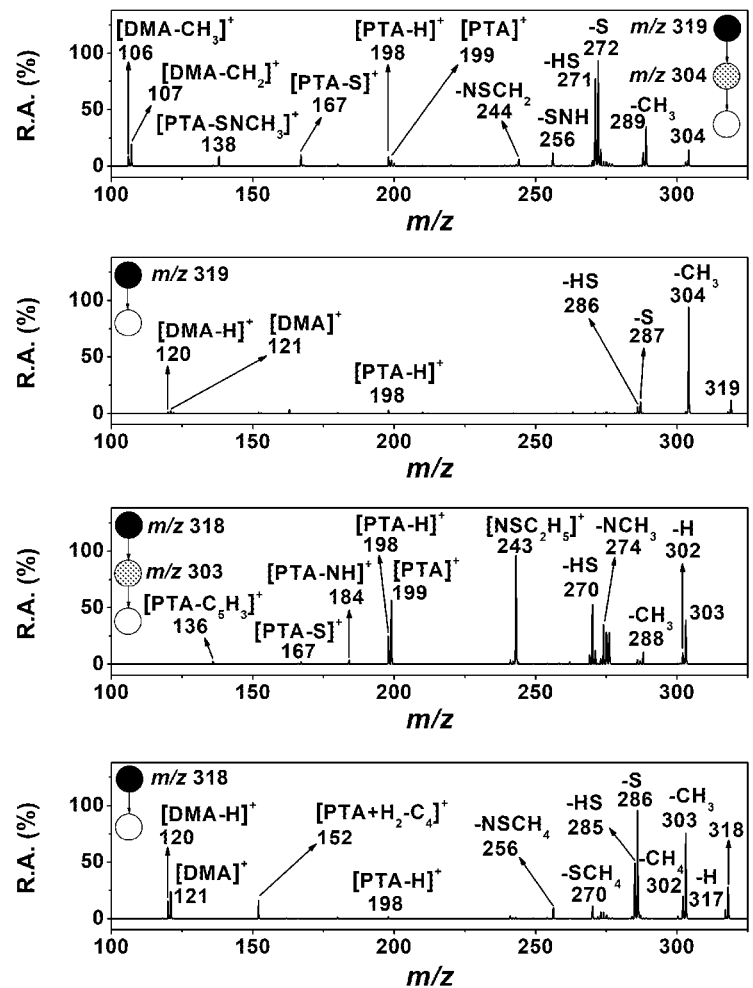
FIG. 10 shows tandem mass spectra of the oxidative coupling product of PTA with DMA at m/z 318 and 319 in the interfacial microreactor. R.A: relative abundance.
Figure 11:
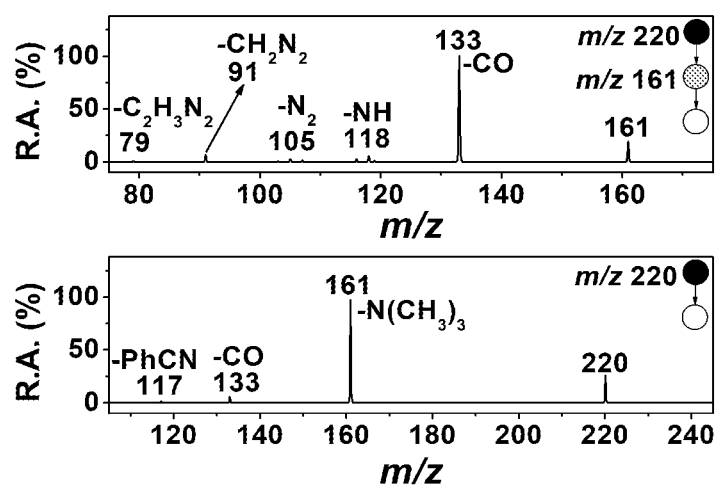
FIG. 11 shows tandem mass spectra of the derivatization product of benzyl alcohol with GT at m/z 220. R.A: relative abundance.
Figure 29:
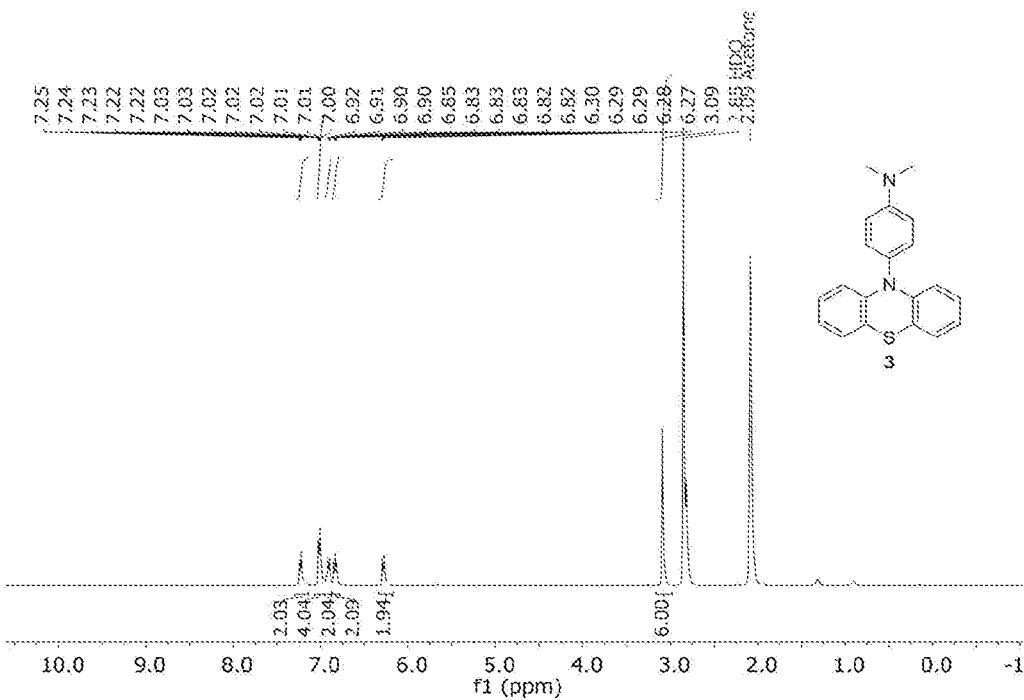
FIG. 29 shows $^1$H NMR spectra (acetone-d$_6$, 400 MHz) of N,N-dimethyl-4-(10H-phenothiazin-10-yl)aniline 3 synthesized from the palladium-catalyzed bulk coupling of PTA with 4-bromo-N, N-dimethylaniline.
Figure 30:
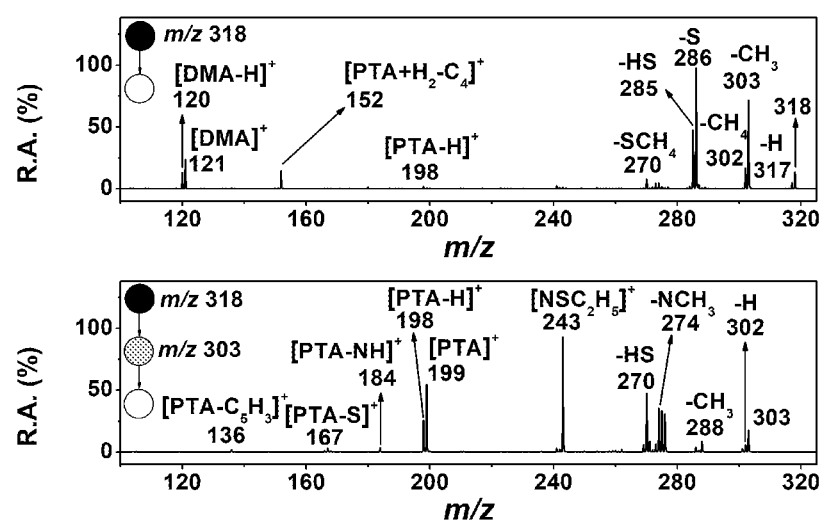
FIG. 30 shows tandem mass spectra of the coupling product 3 at m/z 318 synthesized by the bulk Pd-catalyzed coupling of PTA and 4-bromo-N,N-dimethylaniline R.A: relative abundance.
Figure 31:
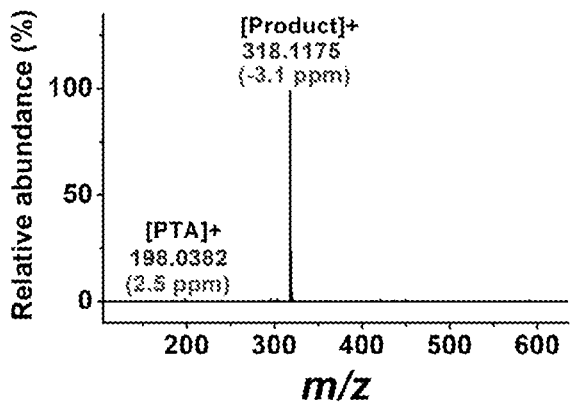
FIG. 31 shows a high resolution mass spectrum of the product 3 synthesized by the bulk Pd-catalyzed coupling of PTA and 4-bromo-N,N-dimethylaniline.

Example 15—Identification of Product 3 Formed in the Electro-Oxidative Coupling of PTA with DMA We have synthesized and purified the product 3 using a reported method (L. Mayer, L. May, T. J. J. Müller, *Organic Chemistry Frontiers* 2020, 7, 1206-1217). The new C—N bond in the product as well as the other structure moiety were confirmed by $^1$H NMR (FIG. 29). The standard product shows the same tandem mass spectra (FIG. 30) and high-resolution mass spectrum (FIG. 31) as the reaction product 3 of DMA and PTA in the interfacial microreactor (FIG. 9 and FIG. 10).

Examples Related to On-Demand Electrochemical Epoxidation in Nano-Electrospray Ionization Mass Spectrometry to Locate Carbon-Carbon Double Bonds

Reagent and Materials

Figure 38:
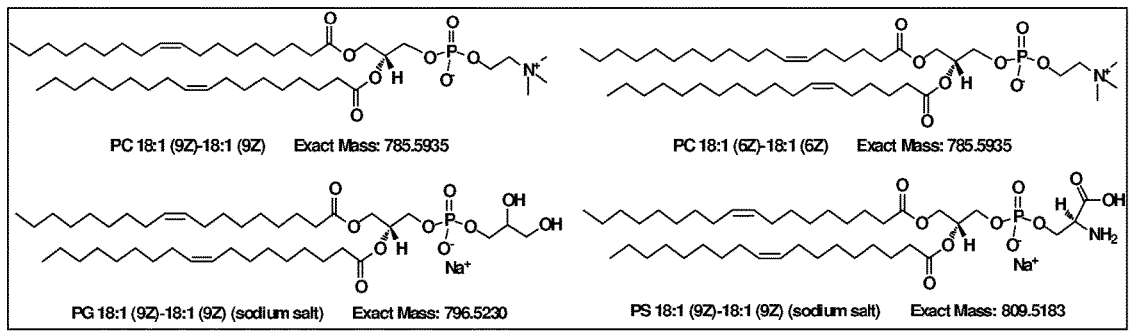
FIG. 38 shows chemical structures of phospholipid standards.
Figure 39:
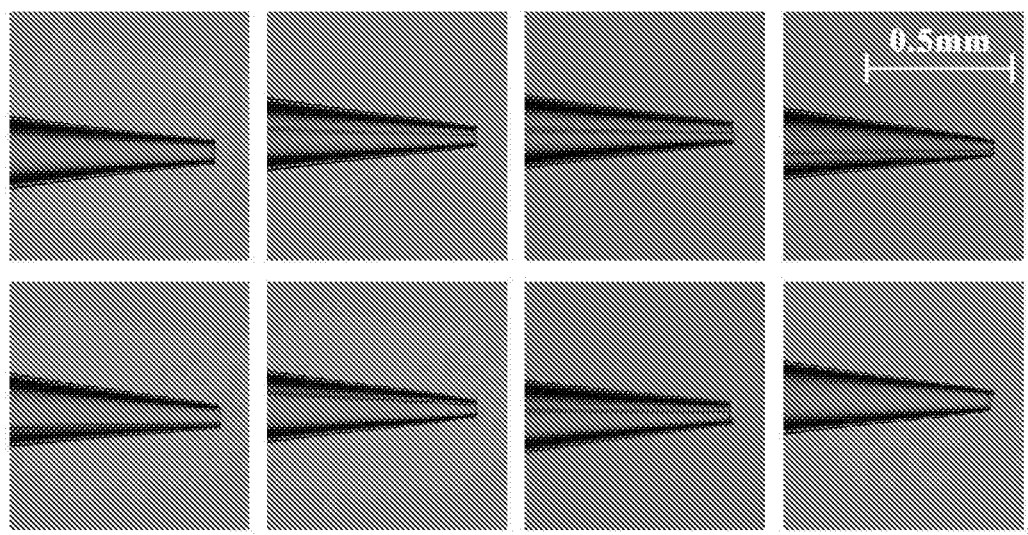
FIG. 39 shows images of the nanoESI tips workable for electro-epoxidation reaction. The orifice size of the tip is 75.0±9.4 µm owing to instrument errors.

The phosphatidylcholine (PC), phosphatidylglycerol (PG) and phosphatidylserine (PS) standards as well as the natural egg PCs extract (CAS: 97281-44-2) were purchased from Avanti Polar Lipids (AL, USA). The structures of the four lipid standards, PC 18:1 (6Z)-18:1 (6Z), PC 18:1 (9Z)-18:1 (9Z), PG 18:1 (9Z)-18:1 (9Z) (sodium salt), and PS 18:1 (9Z)-18:1 (9Z) (sodium salt) are listed in FIG. 38. Acetonitrile, chloroform, water, hydrochloride acid, oleic acid, formic acid and ammonia chloride were purchased from Sigma-Aldrich (St. Louis, MO, USA).

Example 16—Experimental Setup for Performing On-Demand Electro-Epoxidation Reactions The nanoESI tips were pulled from borosilicate glass capillaries (1.5 mm o.d. and 0.86 mm i.d., purchased from World Precision Instruments, Sarasota, FL, USA) using P-1000 micropipette puller (Sutter Instrument, Novato, CA). A platinum wire was inserted into the tip to provide efficient electrical contact with the solution and to initiate the electrospray as well as the electro-epoxidation. The nanoESI tip was mounted in front of the MS inlet at a distance of 8 mm. To initiate the electro-epoxidation, the spray voltage was set at 1.0 kV and increased consecutively by 0.05 kV until the epoxidized product was observed in MS. In general, the electro-epoxidation occurs when the applied voltage is between 1.5 and 2.0 kV. The epoxidation is switched off when the voltage is between 2.5 and 3.0 kV. Due to the slight variations in orifice sizes of different nanoESI tips, the optimal voltages may vary within 200 V from these values.

For fabricating nanoESI emitter with large tips around 75 µm diameter, the HEAT value is often set 5-10° C. higher than the ramp value of the glass capillaries. PULL value is commonly set at 0 and the VELOCITY value is below 12 with TIME 250 and PRESSURE 500. A typical program for pulling the large tips used in this work is: Ramp 539; HEAT 545; PULL 0; VELOCITY 10; TIME 250; PRESSURE 500.

Example 17—Experimental Conditions

The unsaturated PC lipid standards including PC 18:1 (6)-18:1(6) and PC 18:1 (9)-18:1 (9) were separately dissolved in a mixed solvent of acetonitrile (ACN) and water (80/20, v/v, trace chloroform) to achieve concentrations of 20 µM with 10 mM hydrochloric acid (HCl). The prepared solutions (10 µL) were loaded into individual nanoESI emitters for the experiments discussed in the main text of the Detailed Description.

A solution of 10 µL natural lipid extract from egg yolk was prepared (0.2 µg/µL lipids, 10 mM HCl) in the ACN and water (80/20) solvent, and loaded into a nanoESI emitter for real sample analysis.

Example 17A—Mass Spectrometry

All the experiments were performed on Orbitrap Velos Pro (Thermo Fisher Scientific). The following MS parameters were used for data acquisitions. Samples were ionized and epoxidized in the positive ion mode with the applied spray voltage from 1.5-3.0 kV. S-lens RF level was set to be 67.9%, and capillary temperature was set at 200° C. Full MS scans were acquired at m/z 100-2000 with resolving power of 60000. Maximum injection time of 500 ms and 1 microscan were used for full MS scans. MS/MS and MS/MS/MS acquisitions were performed upon CID. The CID energy used for fragmentation was around 30 manufactural units.

Example 18—Effect of Reagents on Electro-Epoxidation Efficiency

Both $H^+$ and $Cl^-$ ions play important roles in the electrochemical epoxidation process. This is shown by a series of experiments using different reagents in the reaction mixtures.

Figure 40:
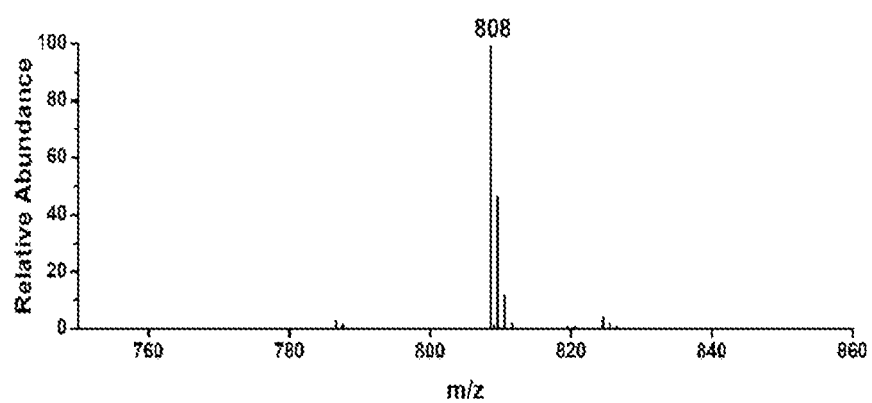
FIG. 40 shows a mass spectrum of PC 18:1 (9)-18:1 (9) (20 µM) in the ACN/H$_2$O (80/20, v/v) system collected at electrospray voltage of 1800 V. Ion at m/z 808 represents the sodium adduct ion of PC 18:1 (9)-18:1 (9).
Figure 41:
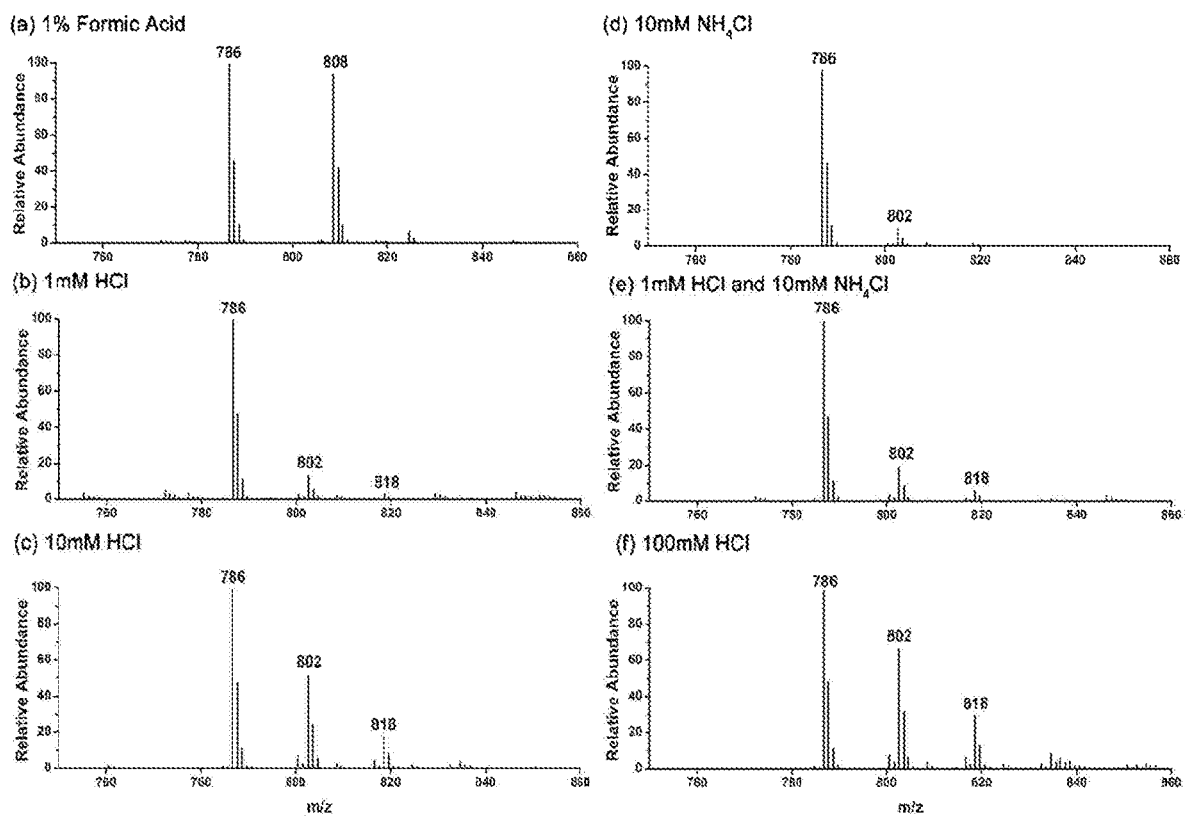
FIG. 41 shows mass spectra of the electro-epoxidation of PC 18:1(9)-18:1(9) with (a) 1% formic acid; (b) 1 mM HCl; (c) 10 mM HCl; (d) 10 mM NH$_4$Cl; (e) 1 mM HCl and 10 mM NH$_4$Cl; and (f) 100 mM HCl. Peaks at m/z 786 and 808 correspond to the protonated and sodiated ions of PC 18:1(9)-18:1(9), whereas peaks at m/z 802 and 818 are assigned to the protonated mono-epoxidized and di-epoxidized products of PC 18:1(9)-18:1(9), respectively.

FIG. 40 shows the mass spectrum of pure PC 18:1 (9)-18:1 (9) standard (20 µM in ACN/$H_2O$ (80/80, v/v)) without adding HCl. Ion at m/z 808 represents the sodium adduct of PC 18:1 (9)-18:1 (9). When formic acid was used without chloride, no epoxidation was observed (FIG. 41*a*). When formic acid was replaced with $NH_4Cl$ solution, the epoxidation product was observed at a low intensity (FIG. 41*d*). When $NH_4Cl$ solution was combined with HCl, an increase of epoxidation product was observed (FIG. 41*e*).

The concentration of HCl may influence electro-epoxidation efficiency. FIGS. 41*b*, 41*c*, and 41*f* and FIG. 42*b* show that the epoxidation yield may be enhanced with increased concentrations of HCl. The concentration of HCl may also affect the MS signals. The absolute MS intensity indicated in FIG. 42*a* shows that higher concentrations of HCl may reduce the MS signals. Considering both aspects, 10 mM of HCl was found to be the optimal concentration, and this was used for subsequent experiments.

Example 19—Effect of Spray Voltage on Electro-Epoxidation Efficiency

PC 18:1 (9)-18:1 (9) (20 µM) dissolved in the mixed solvent of ACN/$H_2O$ (80/20, v/v) with 10 mM HCl was used in the experiments.

Figure 43:
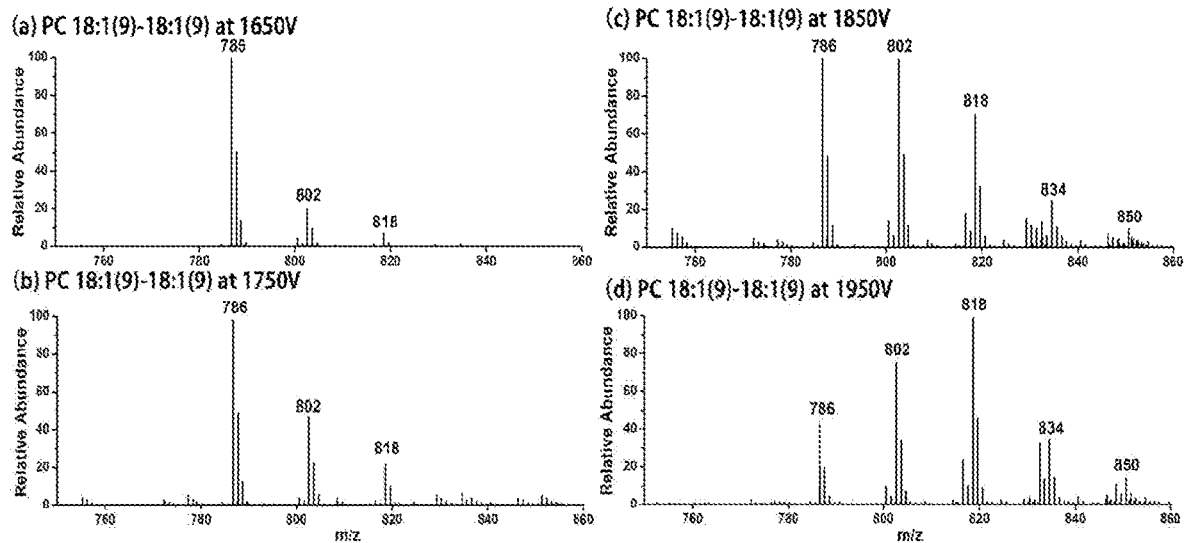
FIG. 43 shows how the electrochemical epoxidation efficiency of PC 18:1(9)-18:1(9) may be improved by changing the spray voltage ranging from (a) 1650 V; (b) 1750 V; (c) 1850 V to (d) 1950 V. Ion at m/z 786 represents the protonated ion of PC 18:1(9)-18:1(9), whereas peaks at m/z 802 and 818 correspond to the mono- and di-epoxidized PC 18:1(9)-18:1(9), respectively. Peaks at m/z 834 and 850 come from the over-oxidized products of 18:1(9)-18:1(9).

The electro-epoxidation efficiency of PC 18:1(9)-18:1(9) may be enhanced by increasing the spray voltage from 1.65 to 1.95 kV (FIG. 43).

Example 20—Analysis of the +14 Da Species

FIG. 43 shows how the electrochemical epoxidation efficiency of PC 18:1(9)-18:1(9) may be improved by changing the spray voltage ranging from (a) 1650 V; (b) 1750 V; (c) 1850 V; to (d) 1950 V.

Figure 44:
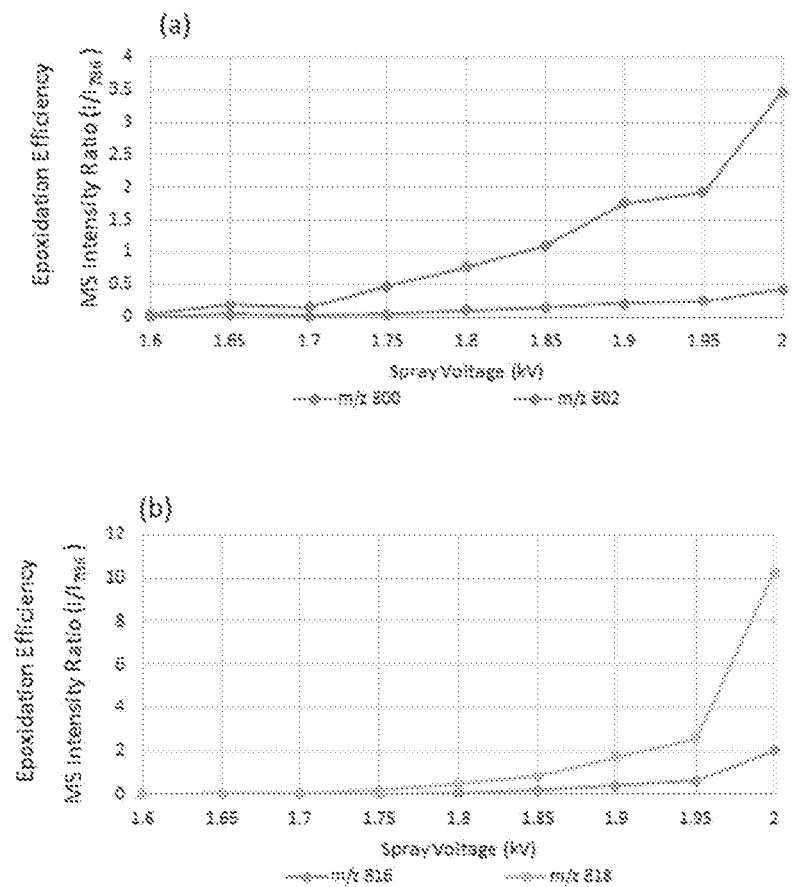
FIG. 44 shows (a) the MS intensity ratios of mono-epoxide at m/z 802 and +14 Da species at m/z 800 to PC 18:1(9)-18:1(9) at m/z 786 with 10 mM HCl at different spray voltages; and (b) the MS intensity ratios of di-epoxide at m/z 818 and +14 Da species at m/z 816 to PC 18:1(9)-18:1(9) at m/z 786 with 10 mM HCl at different spray voltages.

When PC 18:1 (9)-18:1 (9) was analyzed, the byproduct peaks at m/z 800 and 816 (+14 Da and +O+14 Da) were observed at relatively low intensities (2-10%) with the formation of lipid epoxides at an applied voltage of 1.60-2.00 kV. The relative intensities of +14 Da peaks are positively correlative with the spray voltage (FIG. 44). The byproducts may be reduced by using relatively low voltages (e.g. 1.80 kV).

From the accurate mass measurements, the difference between the +14 Da species and the +16 Da species is 2.0151±0.0005 Da, which is exactly the mass of two hydrogen atoms (2.0157 Da). The MS2 spectrum (FIG. 45) shows the +14 Da species were the dehydrogenated products of the corresponding +16 Da species.

Example 21—Limit of Detection

The detection limit of this method was evaluated using PC 18:1 (9)-18:1 (9) and PC 18:1 (6)-18:1 (6). When the concentrations were reduced to 10 nM, the peaks of the epoxides could still be observed with acceptable signal/noise (FIGS. 46 and 47). The obtained detection limit by this method were comparable to those by plasma-based (100 nM for oleic acid) [X. Zhao, Y. Zhao, L. Zhang, X. Ma, S. Zhang, X. Zhang, *Anal. Chem.* 2018, 90, 2070-2078.] and mCPBA-based (12.9 nM for PC 16:0-18:1 (9)) [Y. Feng, B. Chen, Q. Yu, L. Li, *Anal. Chem.* 2019, 91, 1791-1795.] epoxidation methods.

Figure 48:
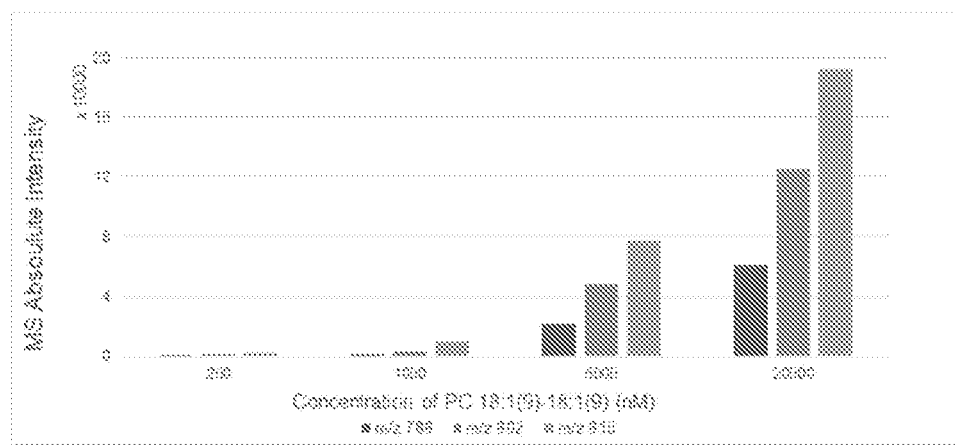
FIG. 48 shows a plot of the effect of PC 18:1(9)-18:1(9) concentration on epoxidation efficiency. The absolute intensities of protonated PC 18:1(9)-18:1(9) at m/z 786, mono-epoxide at m/z 802, and di-epoxide at m/z 818 were increased proportionally with increased PC 18:1(9)-18:1(9) concentrations.

FIG. 48 shows a plot of the effect of PC 18:1(9)-18:1(9) concentration on epoxidation efficiency.

Example 22—Analysis of PC Standard Mixtures

Figure 49:
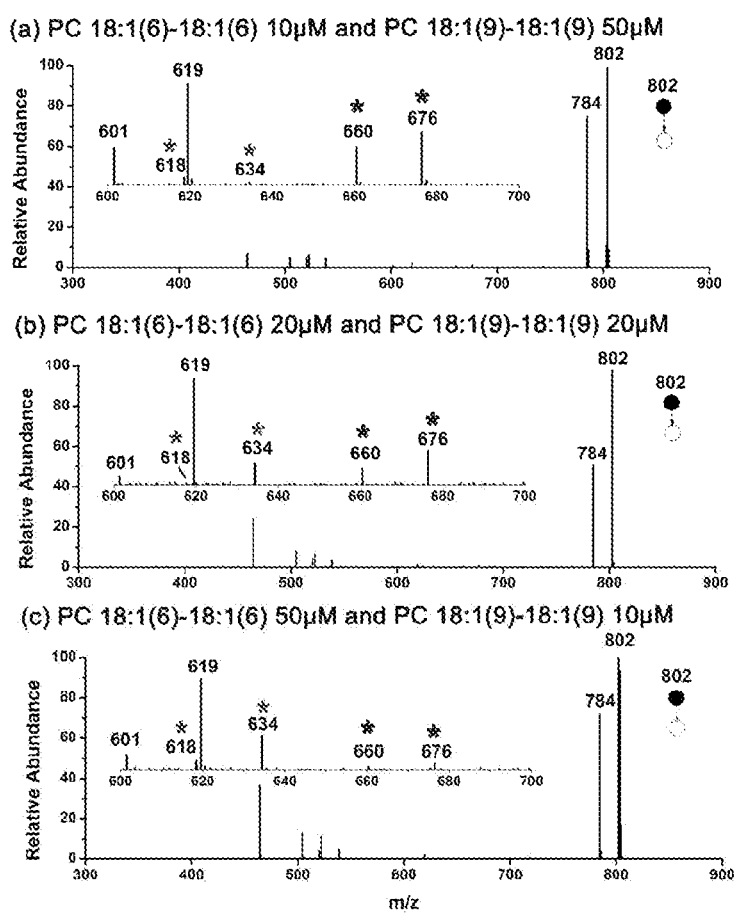
FIG. 49 shows MS/MS spectra of ions at m/z 802, which correspond to the mono-epoxidized products from the mixed solution of PC 18:1 (6)-18:1 (6) and PC 18:1 (9)-18:1 (9): (a) PC 18:1 (6)-18:1 (6) (10 µM) and PC 18:1 (9)-18:1 (9) (50 µM); (b) PC 18:1 (6)-18:1 (6) (20 µM) and PC 18:1 (9)-18:1 (9) (20 µM); (c) PC 18:1 (6)-18:1 (6) (50 µM) and PC 18:1 (9)-18:1 (9) (10 µM). The stars indicate two groups of diagnostic ions (618 and 634; 660 and 676). Peaks at m/z 618 and 634 are assigned to the diagnostic ions of PC 18:1 (6)-18:1 (6), whereas peaks at m/z 660 and 676 correspond to the diagnostic ions of PC 18:1 (9)-18:1 (9).

A series of standard mixtures of PC 18:1(6)-18:1(6) and PC 18:1(9)-18:1(9) isomers were tested (FIG. 49). The ion intensities of each group of diagnostic ions [e.g., ions at m/z 618 and 634 for PC 18:1(6)-18:1(6) and ions at m/z 660 and 676 for PC 18:1(9)-18:1(9)] are shown in the insets of FIG. 49. The ratios of the total diagnostic ion intensities [$I_6/I_9$, $I_6$ and $I_9$ refer to the total intensities of diagnostic ions of PC 18:1(6)-18:1(6) and PC 18:1(9)-18:1(9)] are plotted against their corresponding concentration ratios. Good linearity ($R^2$=0.9968) was obtained (FIG. 50).

Example 23—Analysis of PG Standard

PG 18:1 (9)-18:1 (9) (sodium salt) (20 µM) dissolved in the mixed solvent of ACN/$H_2O$ (80/20, v/v) with 10 mM HCl was used in the experiments.

The full mass spectra of lipid PG 18:1 (9)-18:1 (9) (sodium salt) before and after electro-epoxidation are shown in FIG. 51. The sodium adducts and epoxides were observed as well as the protonated forms. In addition, the losses of phosphate and glycerol may be obtained by in-source dissociation.

The fragmentation of mono-epoxidized PG 18:1 (9)-18:1 (9) (sodium salt) ([PG+O+H]$^+$, m/z 813.5332) generates two diagnostic ions at m/z 671.3961 and 687.3909 (FIG. 52). CID fragment ions at m/z 619.5358 produced the corresponding olefin and aldehyde fragments (m/z 477.3981 and 493.3931) to indicate the double bond positions (FIG. 52). Additionally, fragmentation of the di-epoxidation products also occurred (FIG. 53). The cleavage of complete epoxidation product follows the same fragmentation rule as that in mono-epoxidized products. Thus, the additional 15.9949 Da is added to each diagnostic ion of the mono-epoxide, owing to the addition of an oxygen atom at the non-cleaved double bond. PG 18:1 (9)-18:1 (9) at m/z 829.5276 generated the diagnostic ions of m/z 687.3906 and 703.3862.

In general, the cleavage of complete epoxidation product follows the same fragmentation rule as that in mono-epoxidized products. Thus, the additional 15.9949 Da is added to each diagnostic ion of the mono-epoxide, owing to the addition of an oxygen atom at the non-cleaved double bond.

Example 24—Analysis of PS Standard

PS 18:1 (9)-18:1 (9) (sodium salt) (20 µM) dissolved in the mixed solvent of ACN/H$_2$O (80/20, v/v) with 10 mM HCl was used in the experiments.

The full mass spectra of lipid PS 18:1 (9)-18:1 (9) (sodium salt) before and after electro-epoxidation are shown in FIG. 54. The sodium adducts and epoxides were observed as well as the protonated forms. In addition, the losses of phosphate and glycerol may be obtained by in-source dissociation.

The fragmentation of mono-epoxidized PS 18:1 (9)-18:1 (9) (sodium salt) ([PS+O+2H−Na]$^+$, m/z 804.5478) generates two diagnostic ions at m/z 662.4105 and 678.4057 (FIG. 55). CID fragment ions at m/z 619.5358 produced the corresponding olefin and aldehyde fragments (m/z 477.3981 and 493.3931) to indicate the double bond positions (FIG. 55). Additionally, fragmentation of the di-epoxidation products also occurred (FIG. 56). PS 18:1 (9)-18:1 (9) at m/z 820.6169 generated the diagnostic ions of m/z 678.4049 and 694.5466.

Example 25—Analysis of Oleic Acid (18:1)

A solution of oleic acid (100 µM), HCl (10 mM) and LiCl (10 mM) were loaded into the nanoESI emitter. By switching voltage between 1.80 and 3.00 kV, mass spectra of oleic acid before and after epoxidation (FIG. 57) were collected. After fragmenting the epoxidation product at m/z 305.2657 by tandem MS (FIG. 58), the diagnostic ions at m/z 163.1302 and 179.1251 indicate the position of double bond in oleic acid. The structures of the two diagnostic ions are listed in FIG. 59. LiCl was used to convert fatty acid to lithiated oleic acid, which may be oxidized by the cathode of electrospray and detected in the positive mode of MS in a single event.

Example 26—Analysis of Natural Lipid Extract

The egg lipid extract (0.2 µg/µL) was dissolved in the mixed solution of ACN/water (80/20, v/v, trace chloroform) with 10 mM hydrochloric acid.

Table 2 shows a list of unsaturated lipids from egg lipid extract.

TABLE 2

List of 13 Unsaturated Lipids from Egg Lipid Extract.

| | Identified PCs | Theoretical Diagnostic Mass | Experimental Diagnostic Mass |
|---|---|---|---|
| PC (34:3) | PC 16:0_18:3 (6, 9, 12) | 592.3973 & 608.3922 | 592.4041 & 608.3991 |
| | | 632.4286 & 648.4235 | 632.4366 & 648.4304 |
| | | 672.4599 & 688.4548 | 672.4671 & 688.4619 |
| | PC 16:0_18:3 (9, 12, 15) | 634.4442 & 650.4391 | 634.4511 & 650.4463 |
| | | 674.4755 & 690.4704 | 674.4831 & 690.4785 |
| | | 714.5068 & 730.5017 | 714.5144 & 730.5087 |
| | PC 16:1 (9)_18:2 (9, 12) | 632.4286 & 648.4235 | 632.4366 & 648.4304 |
| | | 658.4442 & 674.4391 | 658.4513 & 674.4471 |
| | | 672.4599 & 688.4548 | 672.4671 & 688.4619 |
| PC (34:2) | PC 16:0_18:2 (9, 12) | 634.4442 & 650.4391 | 634.4512 & 650.4461 |
| | | 674.4755 & 690.4704 | 674.4827 & 690.4771 |
| PC (34:1) | PC 16:0_18:1 (9) | 634.4442 & 650.4391 | 634.4509 & 650.4459 |
| PC (36:4) | PC 16:0_20:4 (5, 8, 11, 14) | 578.3816 & 594.3765 | 578.3885 & 594.3837 |
| | | 618.4129 & 634.4078 | 618.4200 & 634.4149 |
| | | 658.4442 & 674.4391 | 658.4523 & 674.4377 |
| | | 698.4755 & 714.4704 | 698.4838 & 714.4786 |
| PC (36:3) | PC 18:1 (9)_18:2 (9, 12) | 658.4442 & 674.4391 | 658.4524 & 674.4360 |
| | | 660.4599 & 676.4548 | 660.4673 & 676.4528 |
| | | 700.4912 & 716.4861 | 700.4990 & 716.4943 |
| PC (36:2) | PC 18:0_18:2 (9, 12) | 662.4755 & 678.4704 | 662.4835 & 678.4788 |
| | | 702.5068 & 718.5017 | 702.5141 & 718.5094 |
| | PC 18:1 (9)_18:1 (9) | 660.4599 & 676.4548 | 660.4653 & 676.4621 |
| | PC 16:0_20:2 (11, 14) | 662.4755 & 678.4704 | 662.4835 & 678.4788 |
| | | 702.5068 & 718.5017 | 702.5141 & 718.5094 |
| PC (36:1) | PC 18:0_18:1 (9) | 662.4755 & 678.4704 | 662.4825 & 678.4775 |
| | PC 16:0_20:1 (11) | 662.4755 & 678.4704 | 662.4825 & 678.4775 |
| PC (38:4) | PC 18:0_20:4 (5, 8, 11, 14) | 606.4129 & 622.4078 | 606.4185 & 622.4133 |
| | | 646.4442 & 662.4391 | 646.4498 & 662.4450 |
| | | 686.4755 & 702.4704 | 686.4816 & 702.4776 |
| | | 726.5068 & 742.5017 | 726.5135 & 742.5084 |

Example 27—Structural Elucidation of PC (34:1)

CID fragmentation of PC lipid causes the loss of acyl chain, which was validated by observing the same behavior in the PC standard. The fragments provide the information for identification of acyl chains in PCs.

For the lipid PC (34:1), the CID fragmentation of its protonated ion at m/z 760.5888 (FIG. 60) leads to 59 Da and 183 Da neutral losses, which are specific to PCs. The structures of these fragments are also listed in FIG. 61. The remaining fragment ions with acyl chain loss giving ions at m/z 478.3340, 496.3449, 504.3501, and 522.3608 indicate that the two acyl chains originated from FA (16:0) and FA (18:1). Using the diagnostic ions at m/z 634.4509 and 650.4459, the double bonds were identified between $C_9$ and $C_{10}$ for the unsaturated acyl chain. The structures of the two diagnostic ions are listed in FIG. 62. With all the information above, the structure of PC (34:1) could be elucidated as PC 16:0_18:1 (9).

Example 28—Structural Elucidation of PC (34:3)

Determination of saturation degree of acyl chains in lipids: The CID fragment ions at m/z 476/494, 478/496, 500/518 and 502/520 of protonated PC (34:3) at m/z 756 in FIG. 63a suggest that the acyl chains are 16:1, 16:0, 18:3 and 18:2. In other words, the detected PC (34:3) should be the mixture of PC 16:0_18:3 and PC 16:1_18:2.

Determination of double bond positions using electro-epoxidation data: The mono-epoxidized PC (34:3) was fragmented (FIG. 63b). The diagnostic ions at m/z 592/608, 632/648 and 672/688 identify PC 16:0_18:3 (6, 9, 12); the diagnostic ions at m/z 634/650, 674/690 and 714/730 characterize PC 16:0_18:3 (9, 12, 15); and the diagnostic ions at m/z 632/648, 672/688 and 674/658 show the existence of PC 16:1 (9)_18:2 (9, 12).

Example 29—Structural Elucidation of Other PCs

FIG. 64 shows the MS/MS spectra of (a) PC (34:2) and (b) its mono-epoxidized product. The lipid PC (34:2) was determined to be PC 16:0_18:2. The two groups of diagnostic ions at m/z 634/650 and 677/690 indicate that it is PC 16:0_18:2 (9,12).

FIG. 65 shows the MS/MS spectra of the (a) PC (36:4) and (b) its mono-epoxidized product. The lipid PC (36:4) was determined to be PC 16:0_20:4. The four groups of diagnostic ions at m/z 578/594, 618/634, 658/674 and 698/714 indicate that it is PC 16:0_20:4 (5, 8, 11, 14).

FIG. 66 shows the MS/MS spectra of the (a) PC (36:3) and (b) its mono-epoxidized product. The lipid PC (36:3) was determined to be PC 18:1_18:2. The three groups of diagnostic ions at m/z 658/674, 660/676 and 700/716 indicate that it is PC 18:1 (9)_18:2 (9, 12).

FIG. 67 shows the MS/MS spectra of (a) PC (36:2) and (b) its mono-epoxidized product. The lipid PC (36:2) was determined to be a mixture of PC 18:0_18:2, PC 16:0_20:2 and PC 18:1_18:1. The two diagnostic ions at m/z 660/676 indicate the existence of PC 18:1 (9)_18:1 (9), while the diagnostic ions at m/z 662/678 and 702/718 show that the mixture has PC 18:0_18:2 (9,12) and PC 16:0_20:2 (11,14).

FIG. 68 shows the MS/MS spectra of (a) PC (36:1) and (b) its mono-epoxidized product. The lipid PC (36:1) was determined to be a mixture of PC 16:0_20:1 and PC 18:0_18:1. The two diagnostic ions at m/z 662/678 indicate the presence of PC 18:1_18:1 (9) and PC 16:0_20:1 (11).

FIG. 69 shows the MS/MS spectra of (a) PC (38:4) and (b) its mono-epoxidized product. The lipid PC (38:4) was determined to be PC 18:0_20:4. The four groups of diagnostic ions at m/z 606/622, 646/662, 686/702 and 726/742 indicate that it is PC 18:0_20:4 (5, 8, 11, 14).

When more complex samples are analyzed, it may be expected that more overlapped lipid peaks will be observed in the full mass spectra, which may complicate interpretation. Coupling the methods in accordance with the present teachings with high performance liquid chromatography or other separation methods will provide another dimension of separation and may simplify the mass spectra.

Examples Related to Simultaneous Characterization of Lipid sn-Positional and Double Bond Positional Isomers Using On-Demand Electrochemical Mass Spectrometry Reagent and Materials The phosphatidylcholine (PC) lipids used in this work were purchased from Avanti Polar Lipids (AL, USA). Acetonitrile, chloroform, water, hydrochloric acid, oleic acid, formic acid, and ammonia chloride were purchased from Sigma-Aldrich (St. Louis, MO, USA). All reagents were used without additional purification.

Example 30—Mass Spectrometry

An Orbitrap Velos Pro mass spectrometer (Thermo Fisher Scientific) was used for ESI-MS/MS analysis. The following MS parameters were used for data acquisition. Samples were ionized and epoxidized in the positive ion mode with the applied spray voltage from 1.5-3.0 kV. S-lens RF level was set at 67.9%, and capillary temperature was set at 200° C. Full MS scans were acquired over m/z 100-2000 with resolving power of 60000. A maximum injection time of 500 ms and 1 micro-scan were used for full MS scans. MS/MS and MS/MS/MS were performed upon CID. The CID energy used for fragmentation was around 30 manufactural units.

Example 31—Experimental Setup for Performing On-Demand Electro-Epoxidation Reactions The regular nanoESI tips were pulled from borosilicate glass capillaries (1.5 mm o.d. and 0.86 mm i.d., purchased from World Precision Instruments, Sarasota, FL, USA) using P-1000 micropipette puller (Sutter Instrument, Novato, CA). A cobalt wire was inserted into the tip to provide efficient electrical contact with the solution and to initiate the electrospray as well as electrochemical reactions. The nanoESI tip was mounted in front of the MS inlet at a distance of 8 mm.

For fabricating LO-ESI emitters with large tips around 75 μm diameter, the HEAT value is often set 5-10° C. higher than the ramp value of the glass capillaries. PULL value is commonly set at 0 and the VELOCITY value is below 12 with TIME 250 and PRESSURE 500. A typical program for pulling the large tips used in this work is: Ramp 539; HEAT 545; PULL 0; VELOCITY 10; TIME 250; PRESSURE 500.

Example 32—Electrolysis of Co Electrode in LO-ESI Emitters

FIG. 74 shows full mass spectra collected (a) at 3 sec with Co electrode positioned in the middle of a regular nanoESI emitter; (b) at 10 sec with Co electrode positioned in the middle of a regular nanoESI emitter; (c) at 3 sec with Co electrode positioned at the end of a regular nanoESI emitter; and (d) at 9 min with Co electrode positioned at the end of a regular nanoESI emitter when the applied spray voltage is 1.5 kV.

FIG. 75 shows full mass spectra collected (a) at 3 sec with Co electrode positioned in the middle of a LO-ESI emitter; (b) at 10 sec with Co electrode positioned in the middle of a LO-ESI emitter; (c) at 3 sec with Co electrode positioned at the end of a modified LO-ESI emitter; and (d) at 3 min with Co electrode positioned at the end of a modified nanoESI emitter when the applied spray voltage is 1.5 kV.

Example 33—Analysis of Lipid Double Bond Positional Isomers

FIG. 76 shows full mass spectra of (a) epoxidized PC 18:1 (9)-18:1 (9) and (b) Co-adducted PC 18:1 (9)-18:1 (9); and tandem spectra of (c) [PC 18:1 (9)-18:1 (9)+Co]$^{2+}$ ions (m/z 409.26) and (d) [PC 18:1 (9)-18:1 (9)+Co]$^{2+}$ ions (m/z 409.26).

Example 34—Limit of Detection

FIG. 77 shows tandem spectra of [PC 18:1 (9)-16:0+Co]$^{2+}$ ions (m/z 409.26) when the concentration of PC 18:1 (9)-16:0 is decreasing from (a) 100 nM; (b) 50 nM; to (c) 10 nM in the presence of 10 mM HCl. Peaks in (a) at 314.17, 340.17, 478.34, and 504.34, peaks in (b) at 314.09, 340.17, 478.34, and 504.34, and peaks in (c) at 314.09, 340.17, 478.34, and 504.34 are assigned to the two pairs of diagnostic ions indicating the sn-positions of lipids.

FIG. 78 shows tandem spectra of [PC 16:0-18:1 (9)+Co]$^{2+}$ ions (m/z 409.26) when the concentration of PC 16:0-18:1 (9) is decreasing from (a) 100 nM; (b) 50 nM; to (c) 10 nM in the presence of 10 mM HCl. Peaks in (a) at 314.09, 340.17, 478.34, and 504.34, peaks in (b) at 314.17, 340.17, 478.34, and 504.34, and peaks in (c) at 314.09, 340.17, 478.34, and 504.34 are assigned to the two pairs of diagnostic ions indicating the sn-positions of lipids.

FIG. 79 shows tandem spectra of [PC 18:1 (9)-16:0+O]$^+$ ions (epoxidized products, m/z 776.58) when the concentration of PC 18:1 (9)-16:0 is decreasing from (a) 1 µM; (b) 100 nM; to (c) 50 nM in the presence of 10 mM HCl. Peaks in (a) at 634.42 and 650.42, peaks in (b) at 634.34 and 650.50, and peaks in (c) at 634.42 and 650.50 are assigned to the diagnostic ions which indicate lipids double bond positions.

FIG. 80 shows tandem spectra of [PC 16:0-18:1 (9)+O]$^+$ ions (epoxidized products, m/z 776.58) when the concentration of PC 16:0-18:1 (9) is decreasing from (a) 100 nM; (b) 50 nM; to (c) 10 nM in the presence of 10 mM HCl. Peaks in (a) at 634.42 and 650.42, peaks in (b) at 634.42 and 650.42, and peaks in (c) at 634.42 are assigned to the diagnostic ions which indicate lipids double bond positions.

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a structural feature," "a voltage-controlled electrochemical reaction," "a derivatized lipid," "a diagnostic ion," etc.) does not exclude the presence, in some embodiments, of a plurality of such elements.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

What is claimed is:

1. A method for identifying a sn-position of a lipid, the method comprising:
   conducting a first voltage-controlled electrochemical reaction that converts the lipid to a first derivatized lipid of the lipid, wherein the first voltage-controlled electrochemical reaction comprises producing in situ a Co$^{2+}$ ion by anodic corrosion of an electrospray ionization (ESI) electrode and complexing the Co$^{2+}$ ion to the lipid; and
   fragmenting the first derivatized lipid to generate a first diagnostic ion, wherein the first diagnostic ion identifies the sn-position of the lipid.

2. The method of claim 1, wherein the first voltage-controlled electrochemical reaction is performed in an interfacial microreactor coupled with nano-electrospray ionization (nanoESI) mass spectrometry.

3. The method of claim 1, wherein the method further first voltage-controlled electrochemical reaction comprises applying a first voltage to a nanoESI working electrode to convert the lipid to the first derivatized lipid.

4. The method of claim 1, wherein the fragmenting of the first derivatized lipid to generate the first diagnostic ion is achieved via tandem mass spectrometry (MS/MS).

5. The method of claim 1, wherein the method further comprises:
   conducting a second voltage-controlled electrochemical reaction to form a second derivatized lipid of the lipid; and
   fragmenting the second derivatized lipid to generate a second diagnostic ion of the lipid, wherein the second diagnostic ion identifies a sn-position of the lipid.

6. The method of claim 5, wherein the second voltage-controlled electrochemical reaction comprises producing in situ a Co$^{2+}$ ion by anodic corrosion of an electrospray ionization (ESI) electrode and complexing the Co$^{2+}$ ion to the lipid.

7. The method of claim 5, wherein the first voltage-controlled electrochemical reaction comprises an epoxidation reaction, and wherein the second voltage-controlled electrochemical reaction comprises in situ production of a Co$^{2+}$ ion and formation of a Co$^{2+}$-lipid complex.

8. The method of claim 7, wherein the first voltage-controlled electrochemical reaction comprises applying a first voltage to a nanoESI working electrode to initiate the epoxidation reaction, and wherein the first voltage ranges from about 1.5 kV to about 2.3 kV.

9. The method of claim 8, wherein the second voltage-controlled electrochemical reaction comprises applying a second voltage to the nanoESI working electrode to initiate the in situ production of the $Co^{2+}$ ion and the formation of the $Co^{2+}$-lipid complex, and wherein the second voltage ranges from about 2.5 kV to about 3.0 kV.

10. A method for identifying an sn-position of a lipid, the method comprising:
  conducting a voltage-controlled anodic corrosion of an electrospray ionization (ESI) electrode to produce $Co^{2+}$ ion in situ;
  complexing the in situ-produced $Co^{2+}$ ion to the lipid at one or a plurality of sn-positions to form a $Co^{2+}$-lipid complex; and
  fragmenting the $Co^{2+}$-lipid complex via tandem mass spectrometry (MS/MS) to generate at least one diagnostic ion of the lipid, wherein the diagnostic ion identifies the sn-position of the lipid.

11. The method of claim 10 wherein the anodic corrosion and the complexing are performed in an interfacial microreactor formed at an interface of a Taylor cone in an electrospray emitter, wherein the interfacial microreactor is coupled with a nano-electrospray ionization (nanoESI) mass spectrometer comprising an electrospray ionization (ESI) electrode, wherein the ESI electrode comprises a cobalt wire, and wherein the electrospray emitter has an orifice of at least about 60 µm.

12. The method of claim 10 wherein the method further comprises applying a voltage ranging from about 2.5 kV to about 3.0 kV to a nanoESI working electrode, wherein the voltage is configured to initiate the anodic corrosion and to generate an electrospray comprising the $Co^{2+}$-lipid complex.

13. The method of claim 10 wherein the fragmenting comprises collision-induced dissociation (CID).

14. A method for identifying an sn-position of a double bond-containing lipid, the method comprising:
  conducting a voltage-controlled electrochemical epoxidation reaction that converts the double bond-containing lipid to an epoxide-containing lipid;
  fragmenting the epoxide-containing lipid via tandem mass spectrometry (MS/MS) to generate a first diagnostic ion that identifies a positional isomer of at least one double bond of the double bond-containing lipid;
  conducting a voltage-controlled anodic corrosion of an electrospray ionization (ESI) electrode to produce $Co^{2+}$ ion in situ;
  complexing the in situ-produced $Co^{2+}$ ion to the lipid at one or a plurality of sn-positions to form a $Co^{2+}$-lipid complex; and
  fragmenting the $Co^{2+}$-lipid complex via tandem mass spectrometry (MS/MS) to generate a second diagnostic ion that identifies the sn-position of the double bond-containing lipid.

15. The method of claim 14 wherein the electrochemical epoxidation is performed in an interfacial microreactor formed at an interface of a Taylor cone in an electrospray emitter, wherein the interfacial microreactor is coupled with a nano-electrospray ionization (nanoESI) mass spectrometer, and wherein the electrospray emitter has an orifice of at least about 60 µm.

16. The method of claim 14 wherein the method further comprises applying a voltage ranging from about 1.5 kV to about 2.3 kV to a nanoESI working electrode, wherein the voltage is configured to initiate the electrochemical epoxidation reaction and to generate an electrospray comprising the epoxide-containing lipid.

17. The method of claim 14 wherein the anodic corrosion and the complexing are performed in an interfacial microreactor formed at an interface of a Taylor cone in an electrospray emitter, wherein the interfacial microreactor is coupled with a nano-electrospray ionization (nanoESI) mass spectrometer comprising an electrospray ionization (ESI) electrode, wherein the ESI electrode comprises a cobalt wire, and wherein the electrospray emitter has an orifice of at least about 60 µm.

18. The method of claim 14 wherein the method further comprises applying a voltage ranging from about 2.5 kV to about 3.0 kV to a nanoESI working electrode, wherein the voltage is configured to initiate the anodic corrosion and to generate an electrospray comprising the $Co^{2+}$-lipid complex.

19. The method of claim 14 wherein the electrochemical epoxidation reaction occurs prior to the anodic corrosion and formation of the $Co^{2+}$-lipid complex.

\* \* \* \* \*